(12) United States Patent
Cheon et al.

(10) Patent No.: US 11,550,528 B2
(45) Date of Patent: Jan. 10, 2023

(54) ELECTRONIC DEVICE AND METHOD FOR CONTROLLING OPERATION OF ACCESSORY-MOUNTABLE ROBOT

(71) Applicant: Samsung Electronics Co., Ltd., Suwon-si (KR)

(72) Inventors: Kawon Cheon, Suwon-si (KR); Hyunjoo Kang, Suwon-si (KR); Yeojun Yoon, Suwon-si (KR); Jaeyeon Rho, Suwon-si (KR); Raekyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 16/720,368

(22) Filed: Dec. 19, 2019

(65) Prior Publication Data
US 2020/0198153 A1 Jun. 25, 2020

(30) Foreign Application Priority Data
Dec. 19, 2018 (KR) .......................... 10-2018-0164896

(51) Int. Cl.
*G09B 5/00* (2006.01)
*A63F 9/24* (2006.01)
(Continued)

(52) U.S. Cl.
CPC .............. *G06F 3/14* (2013.01); *B25J 13/006* (2013.01); *B25J 13/025* (2013.01); *G06F 3/165* (2013.01); *G06N 20/00* (2019.01); *G08B 7/06* (2013.01)

(58) Field of Classification Search
CPC ................................................. G06F 16/9535
See application file for complete search history.

(56) References Cited

U.S. PATENT DOCUMENTS

2004/0214642 A1\* 10/2004 Beck .................... A63H 3/28
463/40
2008/0014830 A1 1/2008 Sosnovskiy et al.
(Continued)

FOREIGN PATENT DOCUMENTS

JP 2012-239557 A 12/2012
KR 10-0467861 B1 1/2005
(Continued)

OTHER PUBLICATIONS

International Search Report with Written Opinion dated Apr. 1, 2020; International Appln. No. PCT/KR2019/018075.

*Primary Examiner* — Nan-Ying Yang
(74) *Attorney, Agent, or Firm* — Jefferson IP Law, LLP

(57) ABSTRACT

An electronic device such as an accessory-mountable robot is provided. The electronic device changes functional properties thereof in accordance with a mounted accessory. In an embodiment, the electronic device detects mounting of at least one accessory and identifies accessory characteristics associated with the at least one accessory. Then, the electronic device determines properties of the electronic device associated with the at least one accessory, based on the accessory characteristics, and changes the properties of the electronic device, based on the determined properties. Also, the electronic device outputs at least one of a visual element, an auditory element, or a tactile element associated with the at least one accessory, based on the changed properties.

16 Claims, 32 Drawing Sheets

(51) Int. Cl.
    *G06F 3/14*     (2006.01)
    *B25J 13/02*    (2006.01)
    *G06F 3/16*     (2006.01)
    *G06N 20/00*    (2019.01)
    *G08B 7/06*     (2006.01)
    *B25J 13/00*    (2006.01)

(56) References Cited

U.S. PATENT DOCUMENTS

| 2010/0028842 | A1* | 2/2010 | Chiu ........................ A63H 3/28 |
| | | | 446/297 |
| 2014/0273717 | A1* | 9/2014 | Judkins .................... A63H 3/28 |
| | | | 446/175 |
| 2015/0258435 | A1 | 9/2015 | Zhang et al. |

FOREIGN PATENT DOCUMENTS

| KR | 10-2009-0069944 A | 7/2009 |
| KR | 10-1628881 B1 | 6/2016 |
| WO | 2016/036101 A1 | 3/2016 |

\* cited by examiner

ELECTRONIC DEVICE AND METHOD FOR CONTROLLING OPERATION OF ACCESSORY-MOUNTABLE ROBOT

CROSS-REFERENCE TO RELATED APPLICATION(S)

This application is based on and claims priority under 35 U.S.C. § 119(a) of a Korean patent application number 10-2018-0164896, filed on Dec. 19, 2018, in the Korean Intellectual Property Office, the disclosure of which is incorporated by reference herein in its entirety.

BACKGROUND

1. Field

The disclosure relates to an accessory-mountable robot and, more particularly, to an electronic device and control method for changing a functional property of a robot in accordance with a mounted accessory.

2. Description of Related Art

With the growths of related technologies, common robots (or robot devices) as well as industrial robots are actively studied and developed, and people's interest in common robots is also increasing. A robot is a mechanical artifact that has a certain outward form and is capable of performing mechanical movements and actions. For example, a robot may mean a device having the ability to work on its own.

Recently, intelligent robots that recognize their environments and thereby control and determine their own behaviors have been introduced. The intelligent robots can provide various kinds of services to users through active execution suitable for environments. For example, the intelligent robots may be classified into pet robots, silver robots, secretary robots, guide robots, and the like according to their specific properties (or roles, services, etc.), and may provide particular services based on the specific properties to users.

These various kinds of robots always have unvaried their shapes. In addition, when operating (or providing a service), each robot merely repeats a given motion, action, sound, etc. in accordance with its inherent property. Therefore, the user using the robot may easily feel tired of the robot and have a limitation on the use of the robot.

Accordingly, there is an increasing need for differentiated robots to meet various demands of users.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an accessory-mountable robot (or robot device or electronic device) that allows various accessories to be selectively mounted thereon. In addition, various embodiments of the disclosure provide an electronic device and control method for changing a functional property of the accessory-mountable robot in accordance with a mounted accessory.

Another aspect of the disclosure is to provide an electronic device and method for controlling an operation of an accessory-mountable robot by changing a functional property or state (e.g., default property, function, and/or UX attribute) of the robot, depending on accessory-related characteristics (e.g., types, positions, and/or number of mounted accessories).

Another aspect of the disclosure is to provide an electronic device and method for controlling an operation of an accessory-mountable robot by determining accessory characteristics through a combination of the types, positions, and/or number of accessories mounted on the robot and, based on the determined accessory characteristics, changing a functional property of the robot.

Another aspect of the disclosure is to provide an electronic device and method for controlling an operation of an accessory-mountable robot by changing a functional property of the robot through a combination of a first characteristic, such as the types, positions, or number of accessories mounted on the robot, and a second characteristic, such as an operating time or place of the robot.

Additional aspects will be set forth in part in the description which follows and, in part, will be apparent from the description, or may be learned by practice of the presented embodiments.

In accordance with an aspect of the disclosure, an electronic device is provided. The electronic device includes a housing, at least one sensor circuit disposed in the housing and configured to detect mounting of at least one accessory, at least one communication circuit disposed in the housing and configured to communicate with the at least one accessory, a display device disposed in the housing and configured to display visual information associated with the at least one accessory, and at least one processor disposed in the housing and operatively connected to the sensor circuit, the communication circuit, and the display device.

In accordance with another aspect of the disclosure, the at least one processor may be configured to detect the mounting of the at least one accessory, identify accessory characteristics associated with the at least one accessory, determine properties of the electronic device associated with the at least one accessory, based on the accessory characteristics, change the properties of the electronic device, based on the determined properties, and output as feedback at least one of a visual element, an auditory element, or a tactile element associated with the at least one accessory, based on the changed properties.

In accordance with another aspect of the disclosure, an operating method of an electronic device is provided. The operating method includes detecting mounting of at least one accessory, identifying accessory characteristics associated with the at least one accessory, determining properties of the electronic device associated with the at least one accessory, based on the accessory characteristics, changing the properties of the electronic device, based on the determined properties, and outputting as feedback at least one element of a visual element, an auditory element, or a tactile element associated with the at least one accessory, based on the changed properties.

According to various embodiments of the disclosure, a non-transitory computer-readable recording medium having recorded thereon a program for executing the above method on a processor may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
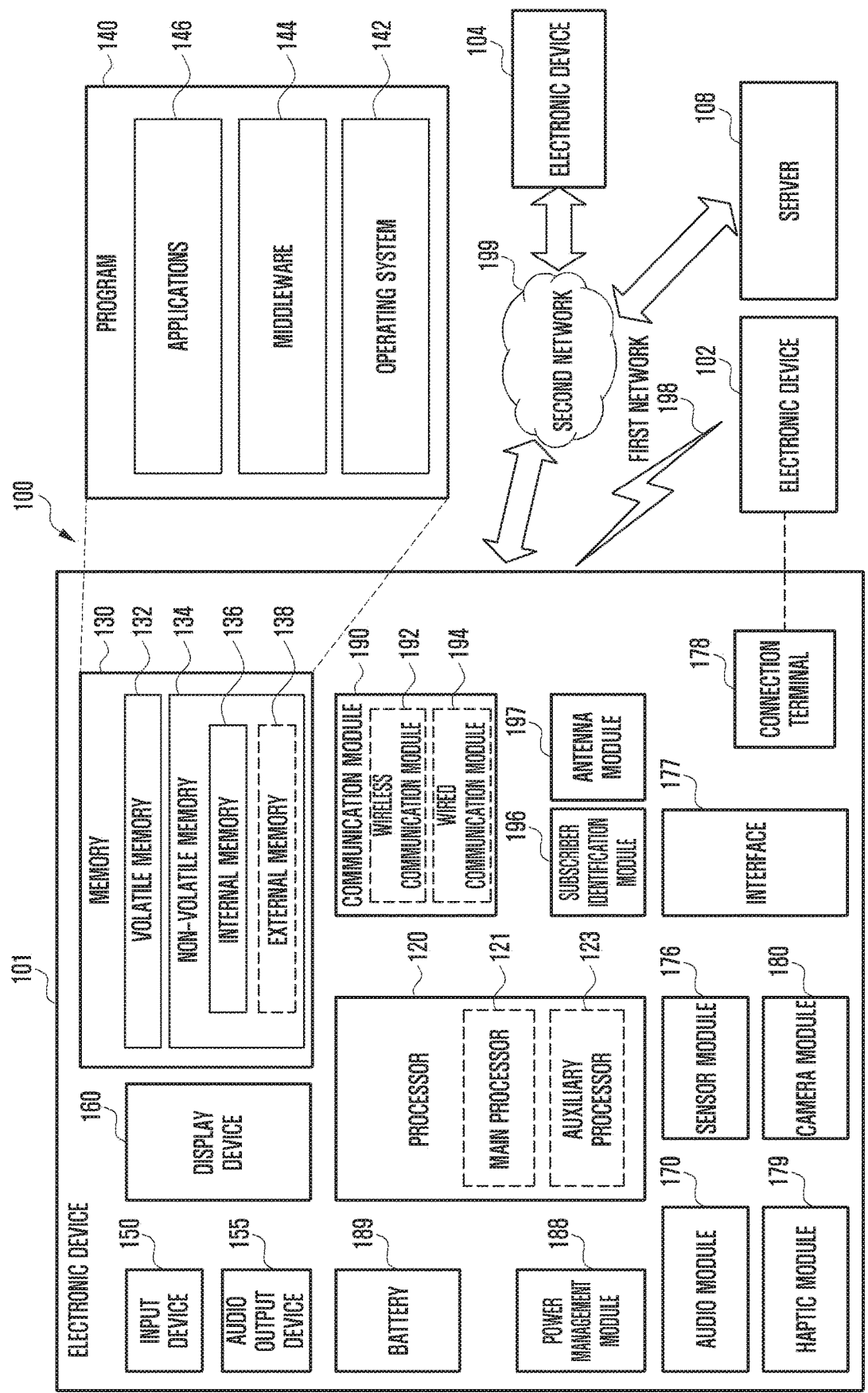
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At the outset, an integrated intelligence system to which embodiments of the disclosure can be applied will be described hereinafter.

Figure 2:
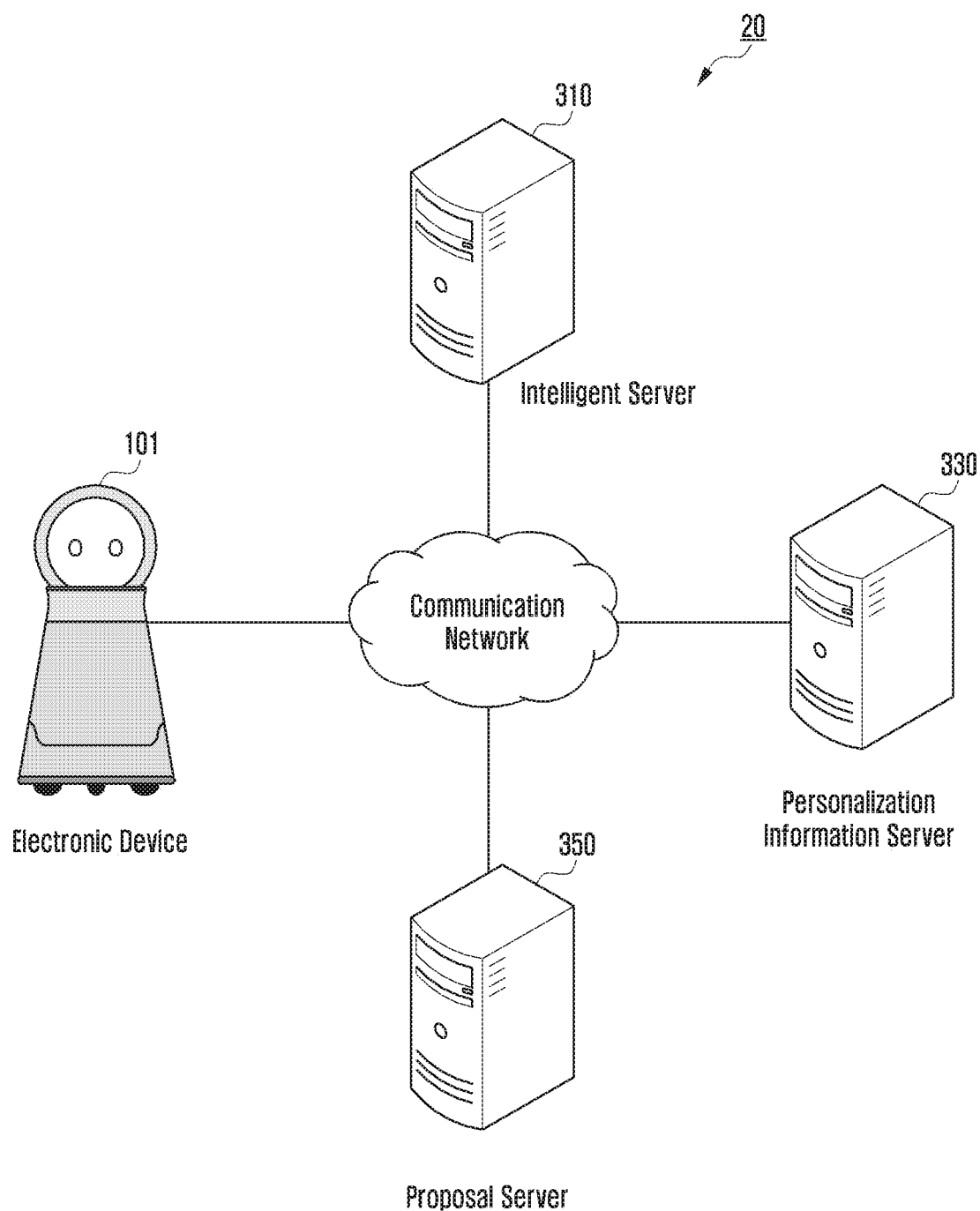
FIG. 2 is a diagram illustrating an integrated intelligence system according to an embodiment of the disclosure.

FIG. 2 is a diagram illustrating an integrated intelligence system according to an embodiment of the disclosure.

Referring to FIG. 2, an integrated intelligence system 20 may include an embodied electronic device 101, an intelligent server 310, a personalization information server 330, and a proposal server 350.

The electronic device 101 may provide a particular service to a user through an application (or an application program, hereinafter referred to as 'app', e.g., an alarm app, a message app, a photo (or gallery) app, etc.) installed therein. For example, the electronic device 101 may execute and operate a desired app through an intelligent app (or a context awareness app or a voice recognition app) installed therein. Also, the electronic device 101 may receive a user input for executing and operating a desired app through the intelligent app. This user input may be received, for example, via an accessory, a physical button, a touch pad, a voice input, a remote input, or the like. According to embodiments, the electronic device 101 may be a robot, a mobile phone, a smart phone, a laptop computer, a notebook computer, a personal digital assistant (PDA), or any other terminal device (or electronic device) capable of connecting to the Internet.

According to an embodiment, the electronic device 101 may receive a user's speech as a user input. Upon receiving the user's speech, the electronic device 101 may generate a command to operate a particular app, based on the user's speech, and operate the app in accordance with the command. According to another embodiment, the electronic device 101 may detect mounting of an accessory, recognize it as a user input, generate a command to operate a particular app, and operate the app in accordance with the command.

The intelligent server 310 may receive a user voice input from the electronic device 101 through a communication network and change it into relevant data (e.g., text data) for context awareness. In an embodiment, the intelligent server 310 may receive information (e.g., accessory characteristics) about the mounted accessory from the electronic device 101 through the communication network and change the received information into relevant data for context awareness. In another embodiment, the intelligent server 310 may generate (or select) a path rule, based on text data. The path rule may include information about actions (or operations) for performing a function of an app or information about parameters required for executing the action. In addition, the path rule may include a sequence of actions or operations of the app. The electronic device 101 may receive the path rule, select an app according to the received path rule, and execute actions or operations defined in the path rule in the selected app.

In the disclosure, the term "path rule" generally refers to, but is not limited to, a sequence of states for the electronic device 101 to perform a task requested by a user or a context-aware task according to the mounting of an accessory. That is, the path rule may include information about the sequence of states. The task may be, for example, any action that an intelligent app can provide. The task may include expressing (or feeding back) characteristics corresponding to the accessory, generating a schedule, sending a photo to a desired party, or providing weather information. The electronic device 101 may perform the task according to the sequence of at least one state (e.g., an operating state of the electronic device 101).

According to an embodiment, the path rule may be provided or generated by an artificial intelligent (AI) system. The AI system may be a rule-based system, a neural network-based system (e.g., a feedforward neural network (FNN), a recurrent neural network (RNN)), a combination of such systems, or any other AI system. In an embodiment, the path rule may be selected from a set of predefined path rules or generated in real time in response to a user request. For example, the AI system may select at least one of a plurality of predefined path rules or generate the path rule dynamically (or in real time). In addition, the electronic device 101 may use a hybrid system to provide the path rule.

According to an embodiment, the electronic device 101 may execute an action and display a screen corresponding to the state thereof on a display (e.g., the display device 160 in FIG. 1). However, even though executing an action, the electronic device 101 may not display a result of executing the action on the display. In another embodiment, the electronic device 101 may execute a plurality of actions and display only a part of results of the plurality of actions on the display. In still another embodiment, the electronic device 101 may display only a result of executing the last action on the display. In yet another embodiment, the electronic device 101 may display on the display only a result of executing an action by receiving a user input.

The personalization information server 330 may include a database (not shown) that stores various kinds of information about the electronic device 101, accessories mountable on the electronic device 101, and/or a user of the electronic device 101. For example, the personalization information server 330 may receive user information (e.g., accessory information, context information, app execution information, etc.) from the electronic device 101 and store it in the database. The intelligent server 310 may receive various kinds of information from the personalization information server 330 through the communication network and use the received information in generating the path rule with respect to a user input and/or mounting an accessory on the electronic device 101. In an embodiment, the electronic device 101 may receive various kinds of information from the personalization information server 330 through the communication network and use the received information in managing the database.

The proposal server 350 may include a database (not shown) that stores information about functions to be provided to the electronic device 101. For example, the proposal server 350 may receive user information (or device information) of the electronic device 101 from the personalization information server 330 and correlate the user information with functions that the user can use through the electronic device 101. The electronic device 101 may receive information about a function, to be provided, from the proposal server 350 through the communication network and offer the received information to the user.

Figure 3:
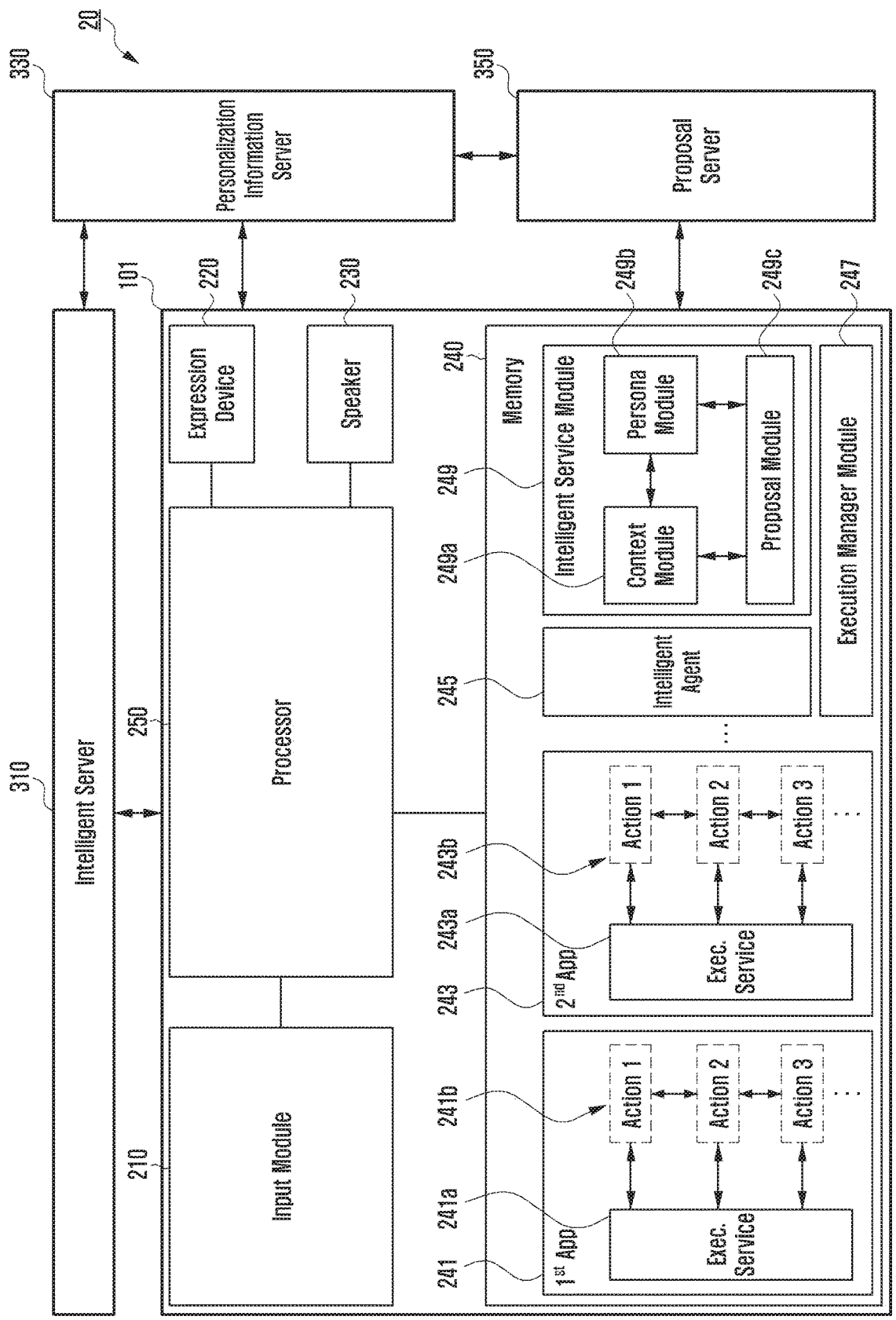
FIG. 3 is a block diagram illustrating an electronic device of an integrated intelligence system according to an embodiment of the disclosure.

FIG. 3 is a block diagram illustrating an electronic device of an integrated intelligence system according to an embodiment of the disclosure.

Referring to FIG. 3, the electronic device 101 may include an input module 210 (e.g., the input device 150 in FIG. 1), an expression device 220 (e.g., the display device 160 in FIG. 1), a speaker 230 (e.g., the sound output device 155 in FIG. 1), a memory 240 (e.g., the memory 130 in FIG. 1), and a processor 250 (e.g., the processor 120 in FIG. 1). The electronic device 101 may further include a housing (not shown), and the above-listed components of the electronic device 101 may be disposed in or on the housing. The electronic device 101 may further include a communication circuit (e.g., the communication module 190 in FIG. 1) disposed in the housing and is capable of transmitting/receiving data (or information) to/from an external server (e.g., the intelligent server 310) through the communication circuit.

According to an embodiment, the input module 210 may receive a user input from a user. For example, the input module 210 may receive the user input from a connected external device (e.g., a keyboard, a headset, a tablet PC, a projector). In another example, the input module 210 may include a touch screen (or a touch screen display) combined with a display in the expression device 220 for expressing an emotion (e.g., a facial expression). In still another example, the input module 210 may include a hardware key (or a physical key) disposed on the electronic device 101 (or on the housing of the electronic device 101). In yet another example, the input module 210 may include at least one distance sensor (e.g., an infrared sensor, an ultrasonic sensor) disposed in the electronic device 101 (or in the housing of the electronic device 101). For example, the input module 210 may include one or more sensors capable of receiving a user's contact (e.g., a touch, a hug, a stroke) as a gesture signal.

According to an embodiment, the input module 210 may include a microphone capable of receiving a user's speech as a voice signal. For example, the input module 210 may include a speech input system and receive a user's speech as a voice signal through the speech input system. The microphone may be exposed through a portion (e.g., a first portion) of the housing.

According to an embodiment, the expression device 220 may include a device capable of expressing an emotion and a facial expression. For example, the expression device 220 may include a device capable of expressing a facial expression corresponding to an emotion to be expressed by the electronic device 101 (e.g., a robot). In an embodiment, the expression device 220 may include various devices capable of expressing a facial expression such as an eyebrow, a pupil, a nose, a cheek, and a lip, as well as a display that generates a graphic of a facial expression. In an embodiment, the expression device 220 may include a device that implements a facial movement such as moving eyes (e.g., wink) or moving lips (e.g., biting or pursing lips) and thereby expresses a happy, sad, pleasant, smiling, angry, embarrassing, or dissatisfied facial expression.

According to an embodiment, when the expression device 220 is a display, it can display an image, a video, and/or an execution screen (e.g., a graphic element) of an application. For example, the expression device 220 (e.g., the display) may display a graphic user interface (GUI) of an app. In an embodiment, the expression device 220 may be exposed through a portion (e.g., a second portion) of the housing. In an embodiment, the expression device 220 may display various expressions as images or animations by interacting with (or including) a device (e.g., a unity engine) capable of expressing a face (or facial expression graphic) corresponding to an accessory.

According to an embodiment, the speaker 230 may output various sound signals (e.g., voice, music, sound effect, natural sound, etc.). For example, the speaker 230 may output a voice signal or a sound effect signal, generated in the electronic device 101, to the outside. In an embodiment, the speaker 230 may be exposed through a portion (e.g., a third portion) of the housing.

According to an embodiment, the memory 240 may store a plurality of apps (or application programs) (e.g., a first app 241 and a second app 243). Each of the plurality of apps 241 and 243 may be, for example, a program for performing a function corresponding to mounting of an accessory (e.g., a function of an emotion expression such as a facial expression change, a sound change, or a motion change, a function of extending existing functions, a function of interworking existing functions) or a program for performing a function corresponding to a user input. In an embodiment, the memory 240 may store an intelligent agent 245, an execution manager module 247, and/or an intelligent service module 249, each of which may be, for example, a framework (or an application framework) for processing a received user input (e.g., a user speech, mounting of an accessory).

According to an embodiment, the memory 240 may include a database that stores information necessary for recognizing a user input (e.g., a user speech, mounting of an accessory). For example, the memory 240 may include a log database for storing log information. For example, the memory 240 may include a persona database for storing information about a user and/or an accessory.

According to an embodiment, the plurality of apps 241 and 243 stored in the memory 240 may be loaded and operated by, for example, the execution manager module 247. The plurality of apps 241 and 243 may include execution service modules 241a and 243a to perform a function. In an embodiment, the plurality of apps 241 and 243 may execute a plurality of actions (e.g., the sequence of states) 241b and 243b through the execution service modules 241a and 243a to perform a function. That is, the execution service modules 241a and 243a may be activated by the execution manager module 247 and execute the plurality of actions 241b and 243b.

According to an embodiment, when the actions 241b and 243b of the apps 241 and 243 are executed, an execution status screen resulting from the execution of the actions 241b and 243b may be displayed on the expression device 220 (e.g., a display). The execution status screen may be, for example, a screen that shows a status where the actions 241b and 243b are completed. In another example, the execution status screen may be a screen that shows a status (also referred to as partial landing) where the execution of the actions 241b and 243b is stopped (e.g., when a parameter required for the actions 241b and 243b is not input).

According to an embodiment, the execution service modules 241a or 243a may execute the actions 241b and 243b in accordance with the path rule. For example, the execution service modules 241a and 243a may be activated by the execution manager module 247, receive an execution request from the execution manager module 247 in accordance with the path rule, and perform the functions of the apps 241 and 243 by executing the actions 241b and 243b in response to the execution request. When the execution of the actions 241b and 243b is completed, the execution service modules 241a and 243a may deliver completion information to the execution manager module 247.

According to an embodiment, when the plurality of actions 241b and 243b are executed in the apps 241 and 243, these actions 241b and 243b may be sequentially executed. That is, when the execution of one action (e.g., action 1 of the first app 241, action 1 of the second app 243) is completed, the execution service modules 241a and 243a may open the next action (e.g., action 2 of the first app 241, action 2 of the second app 243) and send the completion information to the execution manager module 247. Here, opening any action may refer to changing (or switching) such an action to an executable state or preparing to execute such an action. In other words, if any action is not open, that action cannot be executed. When the completion information is received, the execution manager module 247 may deliver an execution request for the next action (e.g., action 2 of the first app 241, action 2 of the second app 243) to the execution service modules 241a and 243a. In an embodiment, the plurality of apps 241 and 243 as well may be sequentially executed. For example, when the execution of the last action of the first app 241 (e.g., action 3 of the first app 241) is completed and thereby the completion information is received, the execution manager module 247 may send an execution request for the first action of the second app 243 (e.g., action 1 of the second app 243) to the execution service module 243a.

According to an embodiment, when the plurality of actions 241b and 243b are executed in the apps 241 and 243, the screen resulting from the execution of each of the actions 241b and 243b may be displayed on the expression device 220. In an embodiment, only a part of screens resulting from the execution of the actions 241b and 243b may be displayed on the expression device 220.

According to an embodiment, the memory 240 may store an intelligent app (e.g., a voice recognition app, a context awareness app) linked to the intelligent agent 245. This app linked to the intelligent agent 245 may receive and process a user's speech as a voice signal. In an embodiment, the app linked to the intelligent agent 245 may receive and process a signal of detecting (or connecting) the mounting of an accessory. In an embodiment, the app linked to the intelligent agent 245 may be operated in response to a specific input entered through the input module 210 (e.g., an input through a hardware key, an input through a touch screen, a specific voice input, an input through a sensor).

According to an embodiment, the intelligent agent 245, the execution manager module 247, and/or the intelligent service module 249 stored in the memory 240 may be executed by the processor 250. That is, the functions of the intelligent agent 245, the execution manager module 247, and/or the intelligent service module 249 may be implemented by the processor 250. In various embodiments disclosed herein, the functions of the intelligent agent 245, the execution manager module 247, and the intelligent service module 249 will be described as operations of the processor 250 (e.g., the processor 120 in FIG. 1). In an embodiment, the intelligent agent 245, the execution manager module 247, and/or the intelligent service module 249 stored in the memory 240 may be implemented in hardware as well as software.

According to an embodiment, the processor 250 may control overall operations of the electronic device 101. For example, the processor 250 may detect the mounting of an accessory, identify the characteristics of the accessory (e.g., an accessory type, an accessory mounting position, the number of mounted accessories) in response to the detection of the accessory, and output a corresponding feedback based on the characteristics of the accessory. The processor 250 may control the input module 210 to receive a user input. The processor 250 may control the expression device 220 to display an image. The processor 250 may control the speaker 230 to output various sound signals (e.g., a voice signal, a sound effect signal). The processor 250 may control the memory 240 to execute a program and retrieve or store necessary information.

According to an embodiment, the processor 250 may execute the intelligent agent 245, the execution manager module 247, and the intelligent service module 249 stored in the memory 240. Therefore, the processor 250 may implement the functions of the intelligent agent 245, the execution manager module 247, and the intelligent service module 249.

According to an embodiment, the processor 250 may execute the intelligent agent 245 to generate an instruction for operating an app, based on a detection signal received through the mounting of an accessory. In an embodiment, the processor 250 may execute the intelligent agent 245 to generate an instruction for operating an app, based on a voice signal received through a user input. In an embodiment, the processor 250 may execute the execution manager module 247 to execute the apps 241 and 243 stored in the memory 240 in accordance with the generated instruction. In an embodiment, the processor 250 may execute the intelligent service module 249 to manage information of the accessory and process a function for a user input (e.g., the mounting of the accessory) by using the information of the accessory. In an embodiment, the processor 250 may execute the intelligent service module 249 to manage user information and process a function for a user input (e.g., a user speech) by using the user information.

The processor 250 may execute the intelligent agent 245 to transmit, to the intelligent server 310, information about a user input (e.g., a user speech, the mounting of an accessory) received through the input module 210 such that the intelligent server 310 can process the user input.

According to an embodiment, the processor 250 may execute the intelligent agent 245 to preprocess the user input before transmitting the user input to the intelligent server 310. In an embodiment, for preprocessing of the user input, the intelligent agent 245 may include an adaptive echo canceller (AEC) module, a noise suppression (NS) module, an end-point detection (EPD) module, or an automatic gain control (AGC) module. The AEC module is capable of removing echoes from the user input. The NS module is capable of suppressing background noise contained in the user input. The EPD module is capable of detecting the end point of a user voice contained in the user input and thereby finding a user voice existing region. The AGC module is capable of recognizing the user input and adjusting the volume of the user input to be suitable for processing. In one embodiment, the processor 250 may execute all of the preprocessing modules to realize excellent performance. In another embodiment, the processor 250 may execute only some of the preprocessing modules to reduce power consumption.

According to an embodiment, the intelligent agent 245 may execute a wakeup recognition module stored in the memory 240 to recognize a user's call. Therefore, the processor 250 may recognize a user's wakeup command through the wakeup recognition module and, when the wakeup command is received, execute the intelligent agent 245 for receiving a user input. The wakeup recognition module may be implemented as a low-power processor (e.g., a processor included in an audio codec, or an accessory mounting detection sensor). In an embodiment, the processor 250 may execute the intelligent agent 245 when receiving a user input through a hardware key. When the intelligent agent 245 is executed, an intelligent app (e.g., a voice recognition app) linked to the intelligent agent 245 may be executed.

According to an embodiment, the intelligent agent 245 may include a speech recognition module. Through the voice recognition module, the processor 250 may recognize a user input for executing an action in an app. For example, the processor 250 may recognize, through the voice recognition module, a user input for executing an action such as a wakeup command in the apps 241 and 243 (e.g., a user speech such as "click" for executing a shooting action in a camera app). Through the voice recognition module, the processor 250 may rapidly recognize and process a user command and thereby assist the intelligent server 310. In an embodiment, the voice recognition module of the intelligent agent 245 may be implemented in an app processor. In an embodiment, the intelligent agent 245 may include a context awareness module for executing a function according to the accessory mounting. Through the context awareness module, the processor 250 may recognize the mounting of an accessory. For example, through the context awareness module, the processor 250 may recognize context regarding an accessory such as the type of a mounted accessory, the number of mounted accessories, the position of a mounted accessory, the time or time zone of mounting an accessory, or a place where the mounting of an accessory is made. Through the context awareness module, the processor 250 may rapidly recognize and process the accessory being mounted on the electronic device 101 and thereby assist the intelligent server 310.

According to an embodiment, a recognition module of the intelligent agent 245 (e.g., the voice recognition module, the context awareness module, the wakeup module) is capable of recognizing a user input by using a suitable algorithm for recognizing voice and/or context. This algorithm may be, for example, at least one of a hidden Markov model (HMM) algorithm, an artificial neural network (ANN) algorithm, or a dynamic time warping (DTW) algorithm.

According to an embodiment, the processor 250 may execute the intelligent agent 245 to convert a user's voice input into text data. For example, the processor 250 may transmit a user voice to the intelligent server 310 through the intelligent agent 245 and receive text data corresponding to the user voice from the intelligent server 310. Then, the processor 250 may display the received text data on the expression device 220. In an embodiment, the processor 250 may execute the intelligent agent 245 to convert an input resulting from the mounting of an accessory into data. For example, the processor 250 may transmit information of the accessory to the intelligent server 310 through the intelligent agent 245 and receive data (e.g., emotion expression data or facial expression data) corresponding to the accessory information from the intelligent server 310. Then, the processor 250 may display the received data on the expression device 220.

According to an embodiment, the processor 250 may execute the intelligent agent 245 to receive a path rule from the intelligent server 310. In an embodiment, the processor 250 may deliver the path rule to the execution manager module 247 through the intelligent agent 245.

According to an embodiment, the processor 250 may deliver an execution result log generated in accordance with the path rule, received from the intelligent server 310, to the intelligence service module 249. The execution result log may be accumulated and managed in user's preference information of the persona module 249b.

According to an embodiment, the processor 250 may execute the execution manager module 247 to receive the path rule from the intelligent agent 245 and execute the apps 241 and 243 such that the apps 241 and 243 execute the actions 241b and 243b contained in the path rule. For example, the processor 250 may transmit command information (e.g., path rule information) for executing the actions 241b and 243b to the apps 241 and 243 through the execution manager module 247 and receive completion information of the actions 241b and 243b from the apps 241 and 243.

According to an embodiment, the processor 250 may execute the execution manager module 247 to deliver the command information (e.g., path rule information) for executing the actions 241b and 243b of the apps 241 and 243 between the intelligent agent 245 and the apps 241 and 243. The processor 250 may bind the apps 241 and 243 to be executed in accordance with the path rule through the execution manager module 247, and deliver the command information (e.g., path rule information) of the actions 241b and 243b included in the path rule to the apps 241 and 243. For example, the processor 250 may sequentially deliver the actions 241b and 243b included in the path rule to the apps 241 and 243 through the execution manager module 247 and thereby sequentially execute the actions 241b and 243b of the apps 241 and 243 in accordance with the path rule.

According to an embodiment, the processor 250 may execute the execution manager module 247 to manage execution statuses of the actions 241b and 243b of the apps 241 and 243. For example, the processor 250 may receive information about the execution statuses of the actions 241b and 243b from the apps 241 and 243 through the execution manager module 247.

For example, when the execution status of the actions 241b and 243b is a stopped status (i.e., partial landing, e.g., when a parameter required for the actions 241b and 243b is not entered), the processor 250 may deliver information about the stopped status to the intelligent agent 245 through the execution manager module 247. The processor 250 may request an input of necessary information (e.g., parameter information) from the user by using information received through the intelligent agent 245.

In another example, when the execution status of the actions 241b and 243b is an operating status, the processor 250 may receive a speech from the user or detect the mounting of an accessory through the intelligent agent 245. The processor 250 may deliver, to the intelligent agent 245, information about the apps 241 and 243 (or actions) being executed through the execution manager module 247 and information about the execution status of the apps 241 and 243 (or actions). The processor 250 may transmit information about a user's speech or the mounting of an accessory to the intelligent server 310 through the intelligent agent 245. The processor 250 may receive parameter information about a user's speech or the mounting of an accessory from the intelligent server 310 through the intelligent agent 245. The processor 250 may deliver the received parameter information to the execution manager module 247. The execution manager module 247 may change parameters of the actions 241b and 243b to new parameters by using the received parameter information.

According to an embodiment, the processor 250 may execute the execution manager module 247 to deliver the parameter information included in the path rule to the apps 241 and 243. When the apps 241 and 243 are sequentially executed in accordance with the path rule, the execution manager module 247 may deliver the parameter information included in the path rule from one app to another app.

According to an embodiment, the processor 250 may execute the execution manager module 247 to receive a plurality of path rules. The processor 250 may select the plurality of path rules, based on a user's speech through the execution manager module 247. For example, when the user's speech specifies one app 241 for executing some actions 241a and fails to specify the other app 243 for executing other actions 243b, the processor 250 may receive, through the execution manager module 247, different path rules for the specified app 241 (e.g., a gallery app) to execute the actions 241a and for non-specified app 243 (e.g., a message app, a telegram app) to execute the actions 243b. In an embodiment, the processor 250 may select the plurality of path rules, based on the mounting of an accessory through the execution manager module 247. For example, when the accessory mounting specifies one app 241 for executing some actions 241a and fails to specify the other app 243 for executing other actions 243b, the processor 250 may receive, through the execution manager module 247, different path rules for the specified app 241 (e.g., a facial expression processing app) to execute the actions 241a and for non-specified app 243 (e.g., a motion processing app, a sound processing app) to execute the actions 243b. The processor 250 may execute, for example, the corresponding actions 241b and 243b (e.g., successive actions 241b and 243b) of the plurality of path rules through the execution manager module 247. Thereafter, the processor 250 may display, on the expression device 220, a status screen for selecting different apps 241 and 243 included in the plurality of path rules.

According to an embodiment, the intelligent service module 249 may include a context module 249a, a persona module 249b, and/or a proposal module 249c.

The processor 250 may execute the context module 249a to collect current states of the apps 241 and 243 from the apps 241 and 243. For example, the processor 250 may execute the context module 249a to receive context information indicating the current states of the apps 241 and 243 and collect the current states of the apps 241 and 243 through the received context information. The processor 250 may execute the context module 249a to collect a current state of an accessory (e.g., the number of mounted accessories, an accessory mounting position) and also collect a current environmental state (e.g., a time, a time zone, a place, a location). For example, the processor 250 may execute the context module 249a to receive context information indicating the current state of the accessory and collect the current state of the accessory through the received context information. In addition, the processor 250 may execute the context module 249a to receive context information indicating the current environmental state and collect the current environmental state through the received context information.

The processor 250 may execute the persona module 249b to manage personal information (e.g., including accessory information) of a user who uses the electronic device 101. For example, the processor 250 may execute the persona module 249b to collect usage information and execution results of the electronic device 101 and thereby manage user's personal information.

The processor 250 may execute the proposal module 249c to predict a user's intention and thereby recommend a command to the user. For example, the processor 250 may execute the proposal module 249c to recommend a command to the user according to a user's current state (e.g., a time, a place, a situation, an app, accessory characteristics).

Figure 4:
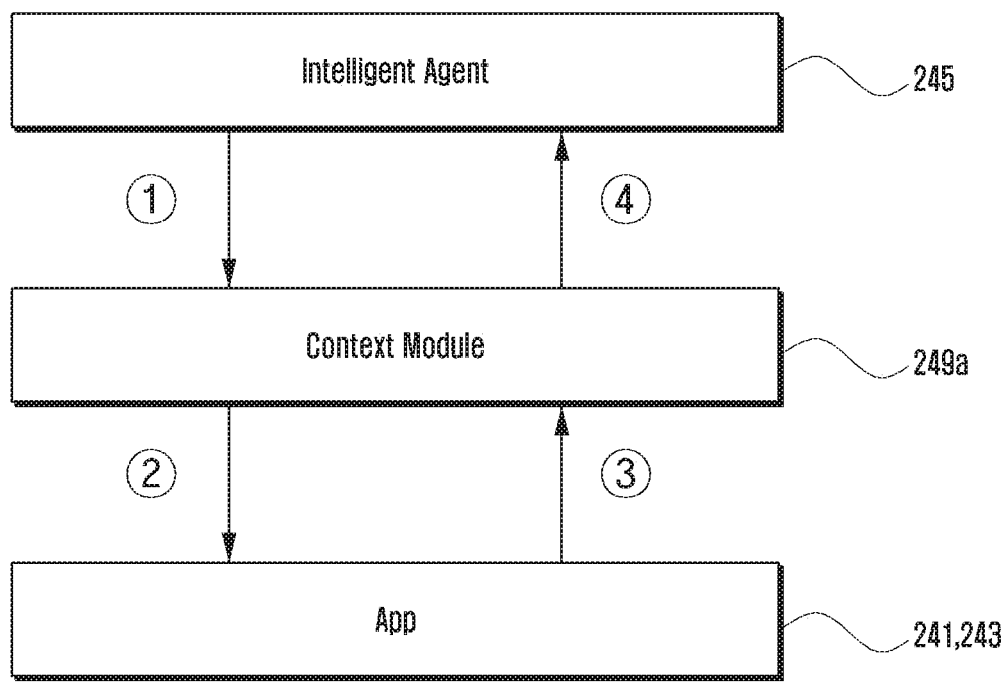
FIG. 4 is a diagram illustrating a process of collecting a current state at an intelligent service module according to an embodiment of the disclosure.

FIG. 4 is a diagram illustrating a process of collecting a current state at an intelligent service module according to an embodiment of the disclosure.

Referring to FIG. 4, when a context request is received from the intelligent agent 245 (as indicated by ①), the processor 250 may request context information indicating the current states of the apps 241 and 243 through the context module 249a (as indicated by ②). Then, the processor 250 may receive the context information from the apps 241 and 243 through the context module 249a (as indicated by ③) and transmit the received context information to the intelligent agent 245 (as indicated by ④).

According to an embodiment, the processor 250 may receive a plurality of kinds of context information from the apps 241 and 243 through the context module 249a. The context information may be, for example, information about the most recently executed app (or the most recently mounted accessory). In another example, the context information may be information about the current state in the apps 241 and 243 (e.g., information about a photo when viewing the photo in a gallery app, information on the type of an accessory, information about the number of accessories mounted, information about a mounting position of an accessory).

According to an embodiment, the processor 250 may receive context information indicating the current state of the electronic device 101 from a device platform as well as the apps 241 and 243 through the context module 249a. This type context information may include general context information, user context information, and/or device context information.

The general context information may include general information of the electronic device 101. The general context information may be obtained through an internal algorithm by receiving data through a sensor hub of a device platform. For example, the general context information may include information about the current space and time, i.e., about a current time and a current location of the electronic device 101. Information about the current time may be obtained through a time in the electronic device 101, and information about the current location may be obtained through a global positioning system (GPS). In another example, the general context information may include information about a physical motion including, for example, walking, running, driving, and the like. The physical motion information may be obtained through a motion sensor. Driving-related information may also be obtained through Bluetooth connection in a vehicle. In still another example, the general context information may include information about a user activity including, for example, content viewing, going to school, commute to work, shopping, travel, and the like. The user activity information may be obtained using information on content or place registered by the user or the app in a database.

The user context information may include information about the user. For example, the user context information may include information about an emotional state of the user. The emotional state information may include, for example, information about happiness, sadness, anger, and the like. In another example, the user context information may include information about a current state of the user. The current state information may include, for example, information about interest, intention, and the like (e.g., play).

The device context information may include device information about the state of the electronic device 101. For example, the device context information may include information about a path rule executed by the execution manager module 247. In another example, the device context information may include information about the battery such as a charging or discharging state of the battery. In still another example, the device context information may include information about a connected device (e.g., an accessory) and a connected network. The connected device information may be obtained via a communication interface to which the accessory is connected.

Now, terms used in various embodiments of the disclosure will be described.

In various embodiments, the characteristics of an accessory are attributes of the accessory (or assigned to the accessory) and may include, for example, animal, dinosaur, plant, insect, occupation (or role playing occupation, e.g., police, doctor, scientist, firefighter, sports athlete), character (e.g., cartoon character, angel, demon), linked device function, and the like. In an embodiment, the characteristics of an accessory may be identified, based on the type, number, and/or position of the accessory mounted on the electronic device 101 (e.g., a robot, hereinafter referred to as a robot) and may be classified according to stages (e.g., first stage, second stage, or third stage). In an embodiment, such stages for classifying the characteristics of the accessory may be determined, for example, based on the number and/or positions of mounted accessories. In an embodiment, when the type of a mounted accessory is determined, the robot may determine a modeling rule (e.g., a face element (e.g., a bear face, a rabbit face, a cartoon character face, a dinosaur face) associated with a specific character assigned to the accessory) corresponding to the accessory type and provide a change in facial expression stage by stage, based on the modeling rule depending on the number of mounted accessories.

According to an embodiment, the type of an accessory is one factor for determining the characteristics of the accessory and may include, for example, a character type (e.g., animal, dinosaur, plant, insect, occupation, cartoon character, angel, demon, etc.), an event type (or a role type, e.g., occupation), and a function-connected type (or an external device type, e.g., projector, tablet PC, speaker, Internet of thing (IoT) device, lighting device, camera, etc.).

According to an embodiment, the number of mounted accessories may indicate the number of accessories mounted on each part of the robot. For example, one or more accessories may be mounted on a head part (A) and a body part (B). Depending on user's intention, accessories having the same characteristic or a combination of accessories having different characteristics (e.g., the first characteristic and the second characteristic) may be mounted on the robot. For example, the user may mount ears, arms, and a tail having the first characteristic (e.g., a rabbit) on the head part (A) and the body part (B) of the robot. In another example, the user may mount ears having the first characteristic (e.g., a rabbit) on the head part (A) of the robot, mount a tail having second characteristic (e.g., a cartoon character) on a first portion (e.g., a tail mountable portion) of the body part (B), and mount arms having the first, second, or third characteristic on a second portion (e.g., an arm mountable portion) of the body part (B).

According to an embodiment, the mounting position of an accessory may indicate, for example, portions of each of the head part (A) and the body part (B) of the robot. In case of the head part (A), the mounting position may indicate a first portion where an ear-shaped accessory is mounted, a second portion where a head-wearable accessory (e.g., hat, helmet, hood, headband, head lantern) is mounted, or a third portion where a face-wearable accessory (e.g. glasses, sunglasses, goggles, mask) is mounted. The first, second, and third portions of the head part (A) may be partly overlapped with or different from each other. In case of the body part (B), the mounting position may indicate a first portion where an arm-shaped accessory is mounted, a second portion where a tail-shaped accessory is mounted, a third portion where a neck-wearable accessory (e.g., tie, scarf, necklace, stethoscope) is mounted, a fourth portion where a back-wearable accessory (e.g., cloak, backpack, tabula of dinosaur) is mounted, and a fifth portion where an external device is mounted. The first, second, third, fourth, and fifth portions of the body part (B) may be partly overlapped with or different from each other.

In various embodiments, the characteristics of an accessory may be defined, for example, in the form of a lookup table as exemplarily shown in Table 1 below. The lookup table may be stored in at least one of a robot, an accessory, or a server and used in identifying the characteristics of an accessory mounted on the robot.

TABLE 1

Accessory Characteristics

| Type (Category) | Mounting Number | Mounting Position | Classification |
|---|---|---|---|
| Unique ID | 1$^{st}$ stage: single 2$^{nd}$ stage: from two to N − 1 3$^{rd}$ stage: N | Priority | Characteristic information |

As shown in Table 1, the characteristics of an accessory may be determined based on, for example, the accessory type, the mounting number, and/or the mounting position.

In an embodiment, the type of an accessory may be identified through a unique identifier (ID) assigned to each accessory. For example, a primary class of unique identifier may be defined as a character type, an event type, or a function-connected type, and a secondary class of unique identifier may be further defined according to unique characteristic (feature) information of each accessory.

In an embodiment, the mounting number of an accessory may be a factor for determining the details (or levels) of the accessory characteristics. For example, even if a single characteristic is identified, a feedback level may be differentially provided according to the details of the identified characteristic depending on the mounting number of the accessory.

In an embodiment, the mounting position of an accessory may be a factor for determining the priority for applying the accessory characteristics. For example, when applying a facial expression based on the accessory characteristics, the characteristics of an accessory mounted on the head part (A) of the robot may be applied with the first priority.

According to an embodiment, the robot may identify the characteristics of an accessory, based on the lookup table as shown in Table 1. For example, the robot may identify characteristic information corresponding to the type, mounting number, and mounting position of the accessory from the lookup table and, based on the identified characteristic information, determine the characteristics of the accessory.

Figure 5:
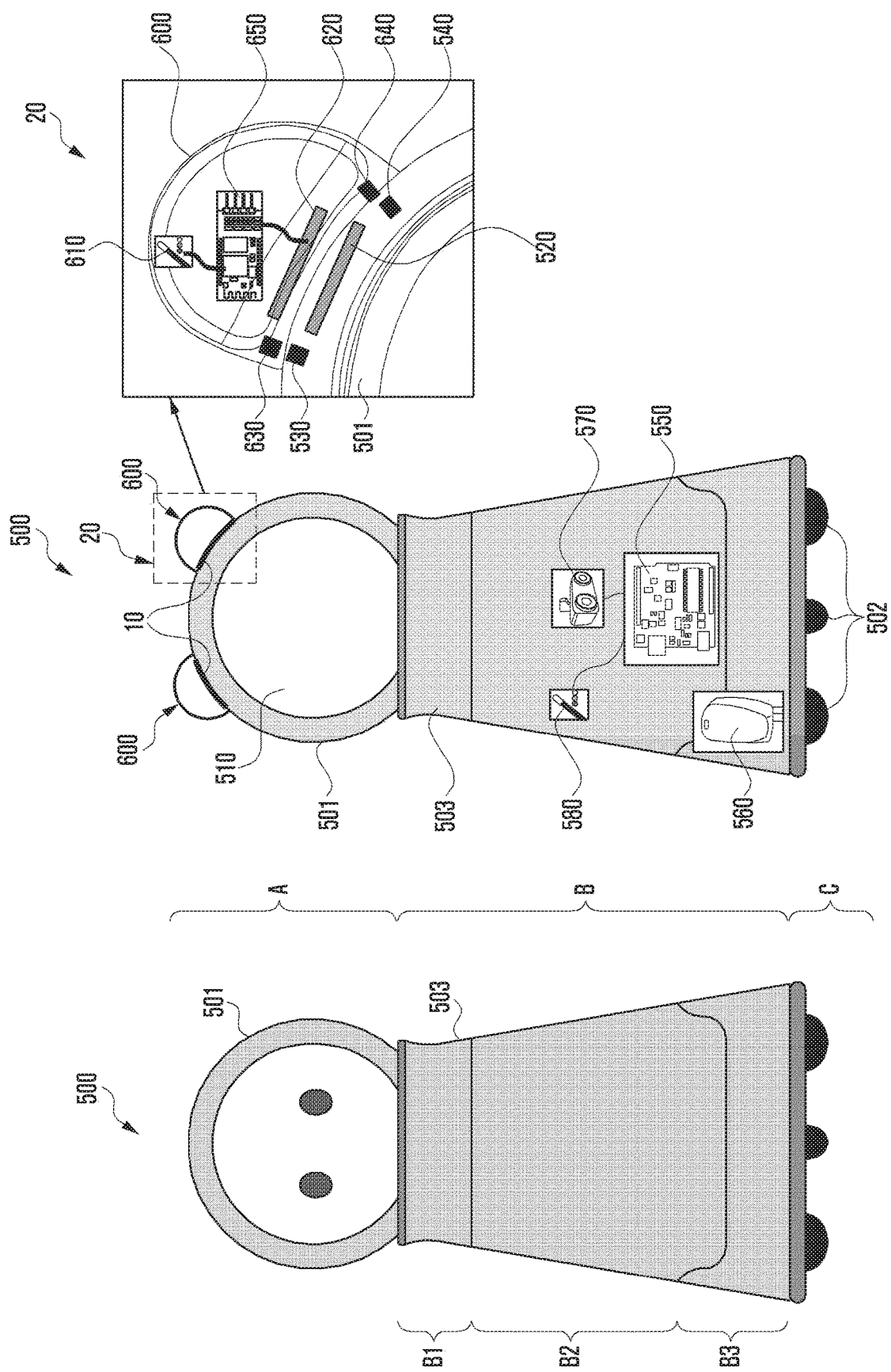
FIG. 5 is a diagram illustrating an example of an electronic device according to an embodiment of the disclosure.

FIG. 5 is a diagram illustrating an example of an electronic device according to an embodiment of the disclosure.

As shown in FIG. 5, an electronic device (e.g., the electronic device 101 in FIG. 1, 2, or 3) according to various embodiments may be implemented as a robot (or a robot device). Hereinafter, the electronic device 101 will be referred to as a robot 500.

Referring to FIG. 5, the robot 500 may include a head part (A), a body part (B), and a movable part (C).

According to various embodiments, the head part (A) generally has a spherical shape like a head shape (alternatively a square shape, an oval shape, a diamond shape, or any other shape), and the front surface of the head part (A) may include an expression device 510 mounted through a first housing 501. In an embodiment, the head part (A) may be implemented to have, at a portion 10 of the first housing 501, a mounting member (e.g., magnet, rubber magnet, iron) for allowing an accessory 600 to be magnetically mounted. In an embodiment, the head part (A) may include therein at least one circuit for detecting the accessory and/or communicating with the accessory. This circuit may include sensor circuitry for detecting whether the accessory is mounted or detached, sensor circuitry for detecting the mounting position of the accessory, and/or communication circuitry for communicating with the mounted accessory.

According to an embodiment, as seen from an enlarged view indicated by reference numeral 20 in FIG. 5, the accessory 600 may include an output device 610, a communication module 620, sensor modules 630 and 640, and a control circuit 650. In addition, the accessory 600 may further include a housing, and the above-listed components of the accessory 600 may be disposed in or on the housing.

According to an embodiment, the output device 610 of the accessory 600 may visually provide information to the outside (e.g., the user, the air) of the accessory 600. For example, the output device 610 may include a light emitting device (e.g., light emitting diode (LED), laser diode (LD)) and/or a hologram device. In an embodiment, the output device 610 of the accessory 600 may tactilely provide information to the outside of the accessory 600. For example, the output device 610 may include a haptic device.

According to an embodiment, the communication module 620 of the accessory 600 may operate, for example, as a contactless communication module for contactless communication of the accessory 600. For example, the contactless communication may be implemented with at least one contactless proximity communication technique such as near field communication (NFC), radio frequency identification (RFID) communication, or magnetic secure transmission (MST) communication. In an embodiment, the accessory 600 and the robot 500 may communicate with each other through any other wireless communication (e.g., Wi-Fi, Bluetooth communication) in addition to the contactless communication, and thus the communication module 620 may further include a suitable communication module for supporting such wireless communication. In an embodiment, the communication module 620 of the accessory 600 may be implemented with an NFC tag. For example, the accessory 600 may input and store information about the accessory (e.g., an accessory unique identifier) in the NFC tag, and the robot 500 may include a communication circuit 520 (e.g., NFC module) capable of reading information stored in the NFC tag of the accessory 600.

According to an embodiment, the sensor modules 630 and 640 of the accessory 600 may include, for example, a module that generates a signal for detecting a mounting position of the accessory 600 in the robot 500. For example, the sensor modules 630 and 640 may include a magnetic object (e.g., a magnet or a rubber magnet) that affects current. In an embodiment, the sensor modules 630 and 640 may operate as mounting members. For example, when the sensor modules 630 and 640 are implemented as magnets (or rubber magnets), they may be magnetically attached to the mounting member (e.g., iron) provided on the housing of the robot 500.

In various embodiments, the expression device 510 (e.g., the display device 160 in FIG. 1 or the expression device 220 in FIG. 3) of the head part (A) may be exposed through a portion (e.g., front surface) of the first housing 501. In an embodiment, the expression device 510 may visually provide a facial expression based on a face-related object (e.g., graphical elements such as eyes, nose, mouth, or teeth) or visually provide an object (e.g., image, video, or text) related to a function (or service) of the robot 500. In various embodiments, when no accessory is mounted on the robot 500, the expression device 510 may implement and display a default face (or facial expression) corresponding to default characteristics set in the robot 500. Then, in response to an interaction with the user, the default face or facial expression may be changed and displayed. In various embodiments, in order to express the characteristics of an accessory mounted on the robot 500, the expression device 510 may characterize at least one related object (e.g., a face shape) corresponding to the characteristics. For example, the expression device 510 may differently display the shape, number, and/or arrangement of at least one face-related object (e.g., eyes, nose, mouth, teeth) so as to express the characteristics of the mounted accessory. In an embodiment, with respect to the characterized object (e.g., a face) corresponding to the characteristics of the accessory, the expression device 510 may visually provide a change in the facial expression in response to an interaction with the user. For example, the expression device 510 may visually provide various changes in the facial expression, such as a smiling face, a crying face, an angry face, a sad face, an expressionless face, a surprised face, a frowning face, or a thinking face, based on the characterized object having the corresponding characteristics.

According to an embodiment, the expression device 510 may fully express a face of the head part (A) through the display, or express only some objects of a face (e.g., eyes, pupils, eyebrows, nose, mouth) through the display and express the other objects (e.g., skin) through a specific material (e.g., silicone or rubber). In an embodiment, the expression device 510 may express only a portion corresponding to pupils through the display and express other portions such as eyebrows, nose, and mouth through a motion device or an actuator for expressing an actual motion. In an embodiment, the expression device 510 may basically include the housing of a specific material (e.g., silicone or rubber) and further include both the display for visually offering a facial expression and the motion device (or actuator) for actually offering a motion-based facial expression. In an embodiment, a face of the head part (A) may be formed of a specific material (e.g., silicone or rubber), and some holes may be formed at points corresponding to face-related objects (e.g., eyes, eyebrows, nose, mouth) so as to accommodate respective expression devices 510. For example, left and right eyes of the robot may be implemented through respective individual expression devices or a single expression device.

According to various embodiments, the body part (B) may have a generally torso shape. The body part (B) may be implemented to have, at a portion of a second housing 503, a mounting member (e.g., magnet, iron) for allowing an accessory to be magnetically mounted. In an embodiment, the body part (B) may include therein at least one circuit for detecting the accessory and/or communicating with the accessory. This circuit may include sensor circuitry for detecting whether the accessory is mounted or detached, sensor circuitry for detecting the mounting position of the accessory, and/or communication circuitry for communicating with the mounted accessory.

According to an embodiment, as seen from the enlarged view 20 in FIG. 5, the robot 500 may detect the magnetic field formed by the sensor modules 630 and 640 of the accessory 600 through first sensor circuits 530 and 540 (e.g., a hall sensor, or a Hall Effect sensor). In an embodiment, the first sensor circuits 530 and 540 may include various sensors for contactless position detection using the Hall Effect. In an embodiment, a processor 550 of the robot 500 may identify the first sensor circuits 530 and 540 detecting the magnetic field and thereby identify the mounting position of the accessory 600.

According to various embodiments, the robot 500 may acquire information about the accessory 600 (e.g., an accessory unique identifier or ID) by communicating with the communication module 620 (e.g., an NFC tag) of the accessory 600 via the communication circuit 520, and the processor 550 may identify the type of the accessory 600 mounted on the robot 500 based on the acquired information about the accessory 600. In various embodiments, the first sensor circuits 530 and 540 and the communication circuit 520 of the robot 500 may be installed at each of respective portions of the head part (A) and the body part (B) where accessories are mounted. The mounting positions where the accessories can be mounted on the robot 500 will be described below with reference to FIG. 6.

According to an embodiment, the body part (B) may include a mounting member (e.g. a magnet or iron) at each accessory-mountable portion on front, rear, left and/or right surfaces of the second housing 503. In an embodiment, the body part (B) may include various components inside the second housing 503, such as the processor 550, a speaker 560, a second sensor circuit 570 (e.g., a distance sensor), and/or a light emitting device 580 (e.g., LED, LD, or hologram device). The body part (B) may further include various additional components (e.g., some components of the electronic device 101 in FIG. 1 or 3). In an embodiment, the body part (B) may have a microphone (not shown) and the speaker 560 disposed in the second housing 503, and holes corresponding to the microphone and the speaker 560 may be formed on the second housing 503 (e.g., the front surface of the body part (B)) to facilitate a sound input into the microphone and a sound output from the speaker 560.

According to an embodiment, the body part (B) may be divided, for example, into a first body part (B1) corresponding to the neck, a second body part (B2) corresponding to the chest and/or the abdomen, and a third body part (B3) corresponding to the lower body. The second body part (B2) may be interposed between and supported by the first body part (B1) and the third body part (B3). In an embodiment, the first body part (B1) and the third body part (B3) may be implemented in a hard form, and the second body part (B2) may be implemented in a soft form. For example, the first body part (B1) and the third body part (B3) may be formed of a hard material (e.g., aluminum, aluminum alloy, iron, or the like) to allow fixed mounting of accessories. In addition, the second body part (B2) may be formed of a soft, elastic, and shock-absorbable material (e.g., silicone, thermoplastic poly urethane (TPU), thermoplastic elastomer (TPE), or the like).

According to an embodiment, the body part (B) may include at least one second sensor circuit 570 (e.g., a distance sensor such as an infrared sensor or an ultrasonic sensor) inside the second housing 503. In an embodiment, for sensing in N directions (where N is a natural number) of the second body part (B2), the second sensor circuit 570 may be implemented with N sensors. For example, the second sensor circuit 570 may be composed of four distance sensors for sensing in four directions on the front, rear, left, and right surfaces. In another example, the second sensor circuit 570 may be composed of two distance sensors for sensing in two directions on the left and right surfaces or front and rear surfaces. In an embodiment, the second sensor circuit 570 may include one or more sensors capable of detecting (or receiving) a user input (e.g., a touch, a hug, a stroke) as a gesture signal through the body part (B). In an embodiment, the second sensor circuit 570 of the second body part (B2) may measure a distance between at least two points by including a triangulation-based sensor (e.g., using infrared light or natural light) or an ultrasonic sensor. For example, this sensor may transmit a signal (e.g., an infrared ray or an ultrasonic wave) and measure a return time of the signal reflected by a measurement target. Then, the processor 550 may receive the measured distance from the second sensor circuit 570, detect a user input for the second body part (B2), and process a relevant feedback (e.g., a motion of the second body part (B2), an expression through the expression device 510, a sound output through the speaker 560).

According to various embodiments, the processor 550 may detect the mounting of the accessory 600, identify a type of the mounted accessory, a mounting position of the accessory, and/or the number of mounted accessories, identify the characteristics of the accessory based on the identified type, position, and/or number, and provide various feedbacks about the accessory 600 to the user according to the characteristics of the accessory. In an embodiment, the processor 550 may provide such feedbacks stage by stage in response to the mounting of the accessory 600 and in response to an interaction between the user and the robot 500. The feedbacks may include, for example, expressions based on changes in display theme, facial expression, sound, motion (or behavior, appearance), haptic, lighting, and/or color of the robot 500. Various feedbacks about the accessory 600 will be described below with reference to figures.

According to an embodiment, the first body part (B1) and the third body part (B3) may be implemented in a hard form such that the accessory 600 can be mounted. In addition, the second body part (B2) may be implemented in a soft form so as to provide feedbacks (e.g., twisting, bending, or shaking the body) related to interactions with the user. In an embodiment, the robot 500 may include various components (not shown, e.g., a motor, a driving circuit such as a motion controller, a motion sensor, a driver, and/or the like) necessary for driving the robot 500 inside the first housing 501 and/or the second housing 503.

According to various embodiments, the movable part (C) may be formed with wheels 502 under the body part (B) and enable the movement (e.g., driving, walking) of the robot 500. In various embodiments, the movable part (C) may be designed to improve the movement stability and steerability of the robot 500.

Figure 6:
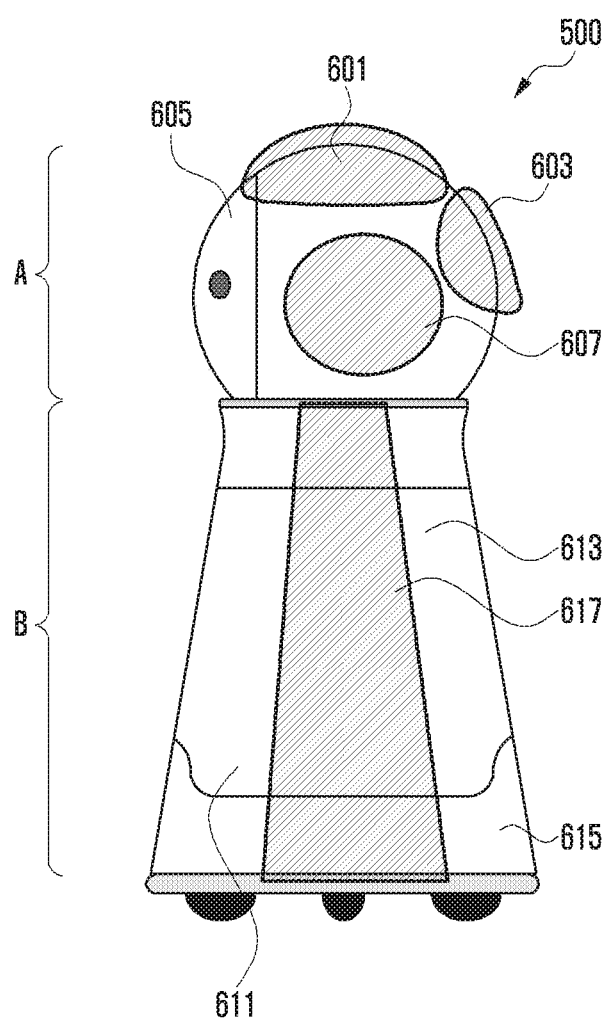
FIG. 6 is a diagram illustrating mountable positions of an accessory on a robot according to an embodiment of the disclosure.

FIG. 6 is a diagram illustrating mountable positions of an accessory on a robot according to an embodiment of the disclosure.

Referring to FIG. 6, the robot 500 may allow an accessory to be mounted on the head part (A) and the body part (B). In an embodiment, each of the head part (A) and the body part (B) may be divided into regions (or portions) where accessories can be mounted. These regions or portions are or include mountable positions of accessories.

According to an embodiment, the head part (A) may include a top portion 601, a back portion 603, a face (or front) portion 605, and/or a side portion 607. The side portion 607 of the head part (A) may be divided into a head-left portion and a head-right portion.

According to an embodiment, the body part (B) may include a front portion 611, a back portion 613, a hip portion 615, and/or a side portion 617. The side portion 617 of the body part (B) may be divided into a body-left portion and a body-right portion.

Various embodiments of the disclosure are not limited to the above divisions shown in FIG. 6.

In case of the head part (A), the mountable positions of accessories may include a first portion where an ear-shaped accessory is mounted, a second portion where a head-wearable accessory (e.g., hat, helmet, hood, headband, head lantern) is mounted, and/or a third portion where a face-wearable accessory (e.g. glasses, sunglasses, goggles, mask) is mounted. The first, second, and third portions of the head part (A) may be partly overlapped with or different from each other.

In case of the body part (B), the mountable positions of accessories may include a first portion where an arm-shaped accessory is mounted, a second portion where a tail-shaped accessory is mounted, a third portion where a neck-wearable accessory (e.g., tie, scarf, necklace, stethoscope) is mounted, a fourth portion where a back-wearable accessory (e.g., cloak, backpack, tabula of dinosaur) is mounted, and a fifth portion where an external device is mounted. The first, second, third, fourth, and fifth portions of the body part (B) may be partly overlapped with or different from each other.

According to an embodiment, the mountable positions of character-type accessories may be differentiated according to characters. For example, an accessory may be mounted on at least one corresponding portion suitable for applying the characteristics of each character, and such positions may be different according to characters.

For example, in case of accessories of a rabbit character, left and right ear accessories may be mounted on the top portion 601 of the head part (A), and a tail accessory may be mounted on the hip portion 615 of the body part (B). In case of accessories of a bear character, left and right ear accessories may be mounted on the top portion 601 of the head part (A), a tail accessory may be mounted on the hip portion 615 of the body part (B), and an abdomen accessory may be mounted on the front portion 611 of the body part (B). In case of accessories of a kangaroo character, left and right ear accessories may be mounted on the top portion 601 of the head part (A), a tail accessory may be mounted on the hip portion 615 of the body part (B), and a pocket accessory may be mounted on the front portion 611 of the body part (B). In case of accessories of a dinosaur character, left and right ear accessories may be mounted on the top portion 601 of the head part (A), a teeth accessory may be mounted on the front portion 605 of the head part (A), a horn accessory may be mounted on the back portion 603 of the head part (A), a tabula accessory may be mounted on the back portion 613 of the body part (B), and a tail accessory may be mounted on the hip portion 615 of the body part (B).

According to various embodiments, a combination of accessories having particular characteristics may be variously configured according to an accessory design or a user's choice, such as a combination of ears and tail, a combination of ears, arms, and tail, or a combination of ears, horns, arms, abdomen, and tail.

Figure 7:
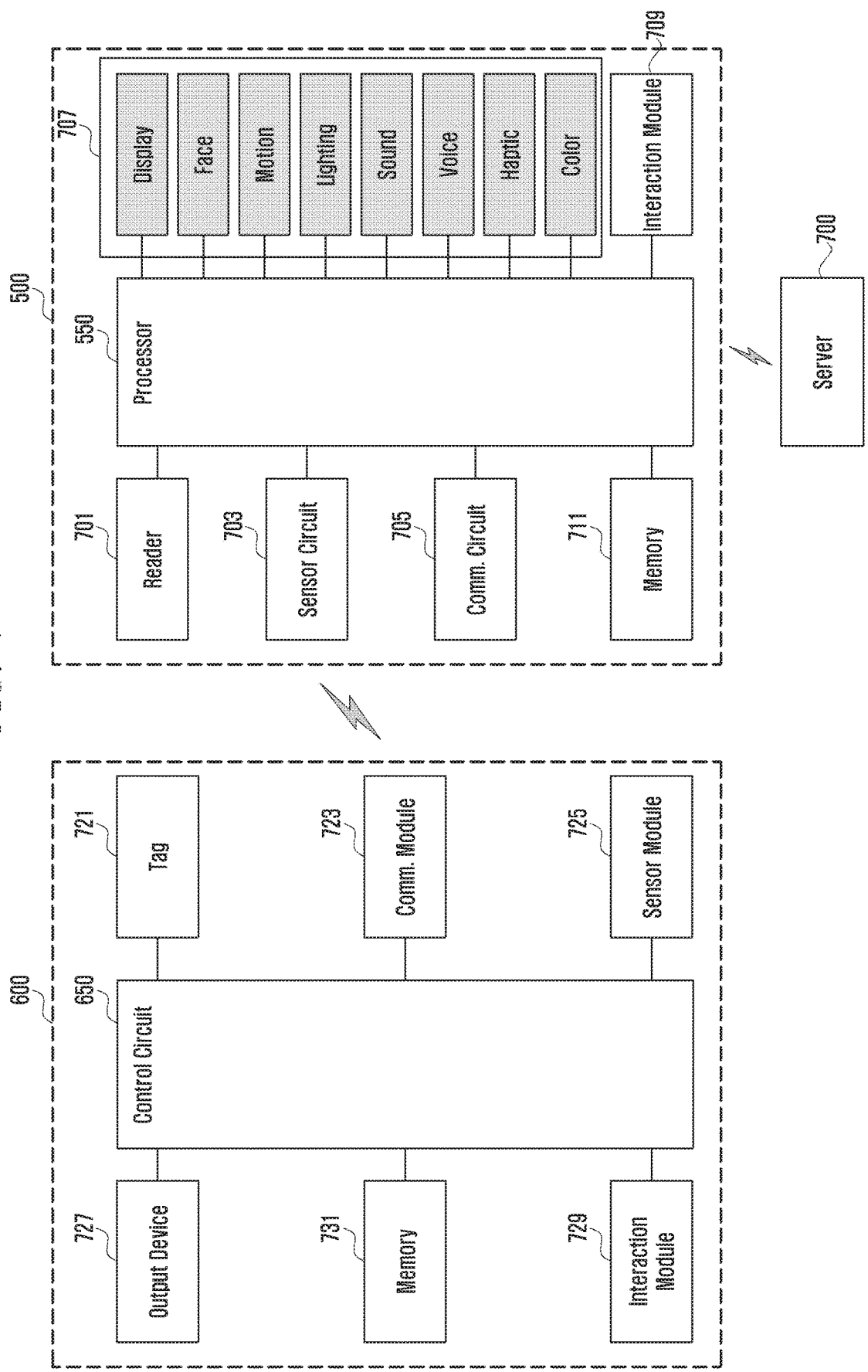
FIG. 7 is a block diagram illustrating a robot and an accessory according to an embodiment of the disclosure.

FIG. 7 is a block diagram illustrating a robot and an accessory according to an embodiment of the disclosure.

Referring to FIG. 7, the robot 500 according to an embodiment may include the processor 550, a reader 701, a sensor circuit 703, a communication circuit 705, an output module 707, an interaction module 709, and a memory 711.

Although FIG. 7 schematically illustrates the robot 500, the robot 500 according to various embodiments may include some or all of the components of the electronic device 101 illustrated in FIG. 1 or 5. For example, the robot 500 may be the same type device as or a different type device from the electronic device 101 shown in FIG. 1 or 5. According to an embodiment, the processor 550, the reader 701, the sensor circuit 703, the communication circuit 705, the output module 707, the interaction module 709, and the memory 711 of the robot 500 may perform all or some of operations of corresponding components of the electronic device 101 shown in FIG. 1 or 5.

According to an embodiment, the processor 550 may be operatively connected to the above components of the robot 500. In an embodiment, the processor 550 may execute software to control any other component (e.g., hardware or software component) of the robot 500 connected thereto and perform data processing. For example, the processor 550 may receive instructions or data from any other component (e.g., the reader 701, the sensor circuit 703, or the communication circuit 705), load the received instructions or data in the memory 711 for processing, and store resultant data in the memory 711.

According to various embodiments, the processor 550 may control overall operations of the robot 500. For example, the processor 550 may detect the mounting of an accessory 600, identify the characteristics of the accessory 600 (e.g., an accessory type, an accessory mounting position, the number of mounted accessories) in response to the detection of the accessory 600, and output a corresponding feedback based on the characteristics of the accessory 600. In an embodiment, the processor 550 may control the output module 707 to display an image (e.g., a face or a facial expression) or output various sound signals (e.g., a voice signal, a sound effect signal). In an embodiment, the processor 550 may control the memory 711 to execute a program and retrieve or store necessary information.

According to various embodiments, the processor 550 may detect the mounting of at least one accessory 600, identify accessory characteristics associated with the at least one accessory 600, determine properties of the robot 500 associated with the at least one accessory 600 based on the accessory characteristics, change the properties of the robot 500 based on the determined properties, and output at least one of a visual element, an auditory element, or a tactile element associated with the at least one accessory 600 based on the changed properties.

According to various embodiments, the processor 550 may identify the characteristics of the accessory 600 by using a learning model trained through an artificial intelligence (AI) algorithm. In an embodiment, the AI algorithm may include, for example, a machine learning algorithm, a neural network algorithm, a genetic algorithm, a deep learning algorithm, or a classification algorithm. In an embodiment, the processor 550 may receive a result of identifying the characteristics of the mounted accessory 600 from a server 700. For example, the processor 550 may transmit characteristic information (e.g., an accessory ID, the number of mounted accessories, and a mounting position) about the mounted accessory 600 to the server 700 and then receive, from the server 700, information about the accessory characteristics identified based on the transmitted information.

According to an embodiment, the reader 701 may operate as a contactless communication module for contactless communication of the robot 500. For example, the contactless communication may be implemented with at least one contactless proximity communication technique such as near field communication (NFC), radio frequency identification (RFID) communication, or magnetic secure transmission (MST) communication. In an embodiment, the reader 701 may be implemented as, for example, an NFC reader (or NFC module). For example, the reader 701 may read information (e.g., a unique identifier or ID) about the accessory 600 stored in a tag 721 (e.g., NFC tag) of the accessory 600.

According to an embodiment, the sensor circuit 703 may include at least one of circuitry for detecting whether the accessory 600 is mounted or detached, circuitry for detecting the mounting position of the accessory 600, or circuitry for detecting a user input. In an embodiment, the sensor circuit 703 may include a first sensor circuit (e.g., a hall sensor, or a Hall Effect sensor) for detecting the mounting of the accessory 600 and/or the mounting position, and a second sensor circuit (e.g., a distance sensor such as an infrared sensor or an ultrasonic sensor) for detecting (or receiving) a user input (e.g., touch, hug, stroke) through the robot 500 (e.g., the head part (A) and the body part (B)).

According to an embodiment, for sensing in N directions (where N is a natural number) of the robot 500, the second sensor circuit may be implemented with N sensors. For example, the second sensor circuit may be composed of four distance sensors for sensing in four directions on the front, rear, left, and right surfaces of the robot 500. In another example, the second sensor circuit may be composed of two distance sensors for sensing in two directions on the left and right surfaces or front and rear surfaces.

According to an embodiment, the communication circuit 705 may establish a wireless communication channel between the robot 500 and the accessory 600 or between the robot 500 and the server 700 (e.g., a cloud server, a manufacturer server) and perform wireless communication through the established communication channel. In an embodiment, the communication circuit 705 may communicate with a communication module 723 of the accessory 600 to acquire (or receive) information about the accessory 600 (e.g., a unique identifier or ID of the accessory).

According to an embodiment, the output module 707 may visually provide (or display or output) information to the outside (e.g., a user) of the robot 500. In an embodiment, the output module 707 may include one or more modules capable of outputting user experience (UX) features of the robot 500 (e.g., display (or display theme), face, motion, lighting, sound, voice, haptic, and/or color) according to the characteristics of the accessory 600. For example, the output module 707 may include a display device, a haptic device, a motion device, a sound output device, a lighting device, and/or a color material or color control device.

According to an embodiment, the interaction module 709 may perform an interaction between the robot 500 and the accessory 600 or between the robot 500 and the user. In an embodiment, the interaction module 709 may be included in the processor 550. In an embodiment, the interaction module 709 may provide a feedback as a dynamic (or immediate) response to the interaction with the user to improve the emotional usability of the robot 500.

According to an embodiment, the memory 711 may store various data used by at least one component of the robot 500 (e.g., the processor 550). Such data may include, for example, software (e.g., the program 140 in FIG. 1) and input/output data for related instructions. The memory 711 may include a volatile memory and/or a nonvolatile memory. In an embodiment, the memory 711 may store a module for performing processes or functions according to various embodiments, and the module stored in the memory 711 may be executed by the processor 550. In an embodiment, the memory 711 may store a lookup table relating to accessory characteristics as shown in Table 1 above.

The accessory 600 according to an embodiment may include the control circuit 650, the tag 721, the communication module 723, a sensor module 725, an output device 727, an interaction module 729, and a memory 731.

According to an embodiment, the control circuit 650 may be operatively connected to the above components of the accessory 600. In an embodiment, the control circuit 650 may execute software to control any other component (e.g., hardware or software component) of the accessory 600 connected thereto and perform data processing. According to various embodiments, the control circuit 650 may control the overall operation of the accessory 600. For example, the control circuit 650 may receive a control command from the robot 500 and output a feedback corresponding to the control command. In an embodiment, the control circuit 650 may control the output device 727 to output various sound signals (e.g., a voice signal, a sound effect signal), haptic signals, or lighting. In an embodiment, the control circuit 650 may control the memory 711 to execute a program and retrieve or store necessary information.

According to an embodiment, the tag 721 may operate as a contactless communication module for contactless communication of the accessory 600. For example, the contactless communication may be implemented with at least one contactless proximity communication technique such as NFC, RFID communication, or MST communication. In an embodiment, the tag 721 may be implemented as an NFC tag. For example, the accessory 600 may enter and store information (e.g., a unique identifier or ID) about the accessory in the NFC tag.

According to an embodiment, the communication module 723 may include a wireless communication module for supporting wireless communication with the robot 500. In an embodiment, the communication module 723 may establish a wireless communication channel between the accessory 600 and the robot 500 and perform wireless communication through the established communication channel. In an embodiment, the communication module 723 may communicate with the communication circuit 705 of the robot 500 to acquire (or receive) control information (or control command or feedback information) about the control of the accessory 600.

According to an embodiment, the sensor module 725 may include a module for generating a signal for detecting the mounting position of the accessory 600 in the robot 500. For example, the sensor module 725 may include a magnetic object (e.g., a magnet or a rubber magnet) that affects current. In an embodiment, the sensor module 725 may operate as a mounting member. For example, when the sensor module 725 is implemented as a magnet (or rubber magnet), it may be magnetically attached to the mounting member (e.g., iron) provided at an accessory-mountable position on the housing of the robot 500.

According to an embodiment, the output device 727 may visually and/or tactilely provide information to the outside (e.g., the user) of the accessory 600. For example, the output device 727 may include a light emitting device (e.g., LED, LD), a hologram device, or a haptic device.

According to an embodiment, the interaction module 729 may perform an interaction between the accessory 600 and the robot 500 or between the accessory 600 and the user. In an embodiment, the interaction module 729 may be included in the control circuit 650. In an embodiment, the interaction module 729 may provide a feedback as a dynamic (or immediate) response to the interaction with the user to improve the emotional usability of the accessory 600.

According to an embodiment, the memory 731 may store various data used by at least one component of the accessory 600 (e.g., the control circuit 650). Such data may include, for example, software (e.g., the program 140 in FIG. 1) and input/output data for related instructions. The memory 731 may include a volatile memory and/or a nonvolatile memory. In an embodiment, the memory 731 may store a module for performing processes or functions according to various embodiments, and the module stored in the memory 731 may be executed by the control circuit 650. In an embodiment, the memory 731 may store a lookup table relating to accessory characteristics as shown in Table 1 above.

According to an embodiment, the server 700 may include an external server such as a cloud server, a manufacturer server, or a content providing server. In an embodiment, the server 700 (e.g., a cloud server) may store and manage information about various accessories being mountable on the robot 500. In an embodiment, the server 700 may interoperate with the robot 500 to store or manage information received from the robot 500 and provide the robot 500 with information requested by the robot 500. In an embodiment, information about accessories may include, for example, characteristics of each accessory and be recorded in a lookup table as shown in Table 1 above.

According to an embodiment, the server 700 may receive characteristic information (e.g., an accessory ID, the number of mounted accessories, and a mounting position) about the mounted accessory 600 from the robot 500, identify the accessory characteristics based on the received characteristic information, and provide information about the identified accessory characteristic to the robot 500. In an embodiment, the server 700 may provide relevant resources (e.g., information or big data about the accessory) to the robot 500, based on virtualization and distributed processing.

In an embodiment, the robot 500 and/or the accessory 600 may not include at least one of the above-described components (e.g., the memory 711 or 731, and/or a certain circuit) or may further include any other non-described component. In an embodiment, some of the above-described components may be implemented in one integrated circuit. In an embodiment, the server 700 may not be used, or one or more additional servers may be used.

According to various embodiments of the disclosure, an electronic device may include a housing, at least one sensor circuit disposed in the housing and configured to detect mounting of at least one accessory, at least one communication circuit disposed in the housing and configured to communicate with the at least one accessory, a display device disposed in the housing and configured to display visual information associated with the at least one accessory, and a processor disposed in the housing and operatively connected to the sensor circuit, the communication circuit, and the display device. In particular, the processor may be configured to detect the mounting of the at least one accessory, to identify accessory characteristics associated with the at least one accessory, to determine properties of the electronic device associated with the at least one accessory, based on the accessory characteristics, to change the properties of the electronic device, based on the determined properties, and to output at least one of a visual element, an auditory element, or a tactile element associated with the at least one accessory, based on the changed properties.

According to various embodiments, the processor may be further configured to acquire accessory information from the at least one accessory through the communication circuit when the mounting of the at least one accessory is detected through the communication circuit, and to identify the accessory characteristics, based on the accessory information.

According to various embodiments, the processor may be further configured to identify the accessory characteristics, based on at least one of a type of accessory, the number of mounted accessories, or a mounting position of accessory, or a combination thereof.

According to various embodiments, the processor may be further configured to identify the number of mounted accessories, and to provide a feedback by realizing an intention corresponding to the identified number of mounted accessories.

According to various embodiments, the processor may be further configured to determine the properties of the electronic device with different degrees of completion depending on the identified number of mounted accessories.

According to various embodiments, the processor may be further configured to classify the accessory characteristics stage by stage depending on the identified number of mounted accessories.

According to various embodiments, the processor may be further configured to determine a modeling rule corresponding to the type of accessory, and to provide a feedback based on the modeling rule stage by stage depending on the identified number of mounted accessories.

According to various embodiments, the processor may be further configured to provide a feedback associated with the mounting of the at least one accessory, based on the electronic device or the at least one accessory.

According to various embodiments, the processor may be further configured to determine a modeling rule corresponding to the accessory characteristics, and to provide a feedback as an immediate response to an interaction with a user, based on the modeling rule.

According to various embodiments, the processor may be further configured to identify the accessory characteristic by using a learning model trained through an artificial intelligence algorithm.

Now, an operating scenario of the robot 500 which corresponds to the electronic device 101 will be described. Although it will be described that the operations of the robot 500 are controlled by the processor 550 shown in FIG. 5 or 7, the processor 550 may include all or part of the processor 120 shown in FIG. 1 or the processor 250 shown in FIG. 2. In some embodiments, the processor 550 may be referred to as at least one processor or control circuit that includes processing circuitry, or referred to as instructions that are stored in a memory and cause, when executed, the processor 550 to operate.

Figure 8:
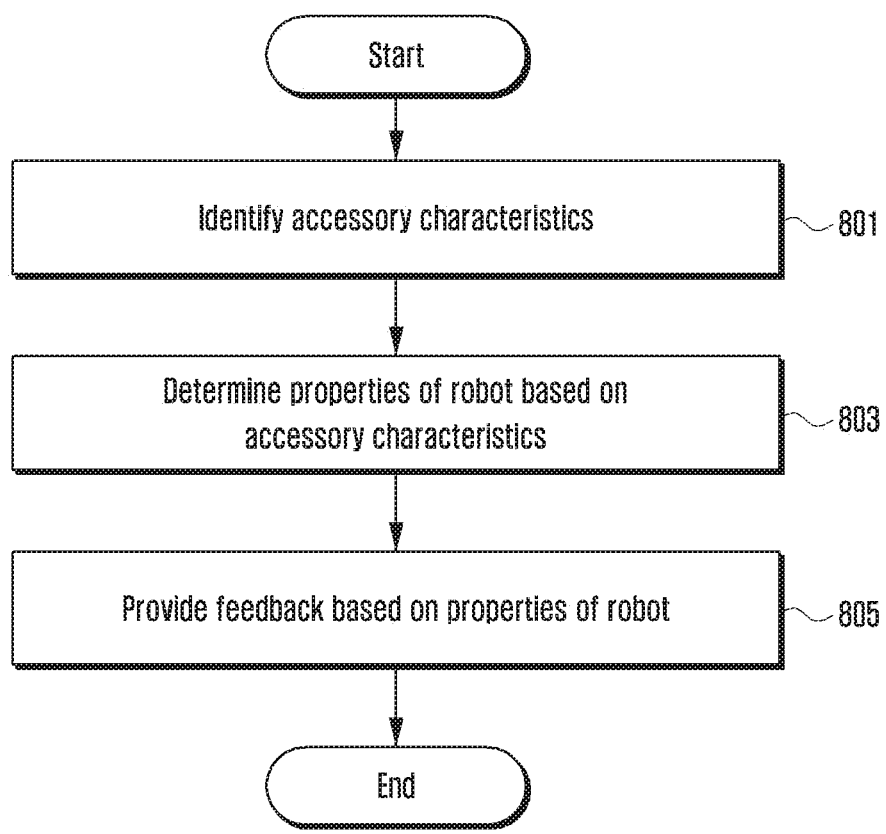
FIG. 8 is a flow diagram illustrating a method for operating a robot according to an embodiment of the disclosure.

FIG. 8 is a flow diagram illustrating a method for operating a robot according to an embodiment of the disclosure.

Referring to FIG. 8, at operation 801, the processor 550 of the robot 500 may identify characteristics of an accessory. According to an embodiment, when the mounting of the accessory is detected, the processor 550 may identify the type of the mounted accessory, the number of the mounted accessories, and the position of the mounted accessory. A detailed operation will be described below with reference to FIG. 9.

According to an embodiment, the processor 550 may identify accessory characteristics by using a lookup table as shown in Table 1. In an embodiment, the lookup table may be stored, for example, in the robot 500, an accessory (e.g., the accessory 600 in FIG. 7), or an external server (e.g., the server 700 in FIG. 7). When the robot 500 stores a lookup table, the processor 550 may identify the characteristics of the accessory through the lookup table by using information (e.g., a unique identifier or ID) obtained from the accessory. When the server 700 stores a lookup table, the processor 550 may provide the server 700 with information (e.g., a unique identifier or ID) obtained from the accessory, and receive information about the characteristics of the accessory from the server 700. When the accessory stores a lookup table, the processor 550 may receive information about the characteristics of the accessory from the accessory.

In various embodiments, the characteristics of an accessory are attributes of the accessory (or assigned to the accessory) and may include, for example, animal, dinosaur, plant, insect, occupation (or role playing occupation, e.g., police, doctor, scientist, firefighter, sports athlete), character (e.g., cartoon character, angel, demon), linked device function, and the like. In an embodiment, the characteristics of an accessory may be identified, based on the type, number, and/or position of the accessory mounted on the robot 500.

According to an embodiment, the type of an accessory is one of factors for determining the characteristics of the accessory and may include, for example, a character type (e.g., animal, dinosaur, plant, insect, occupation, cartoon character, angel, demon, etc.), an event type (or a role type, e.g., occupation), and a function-connected type (or an external device type, e.g., projector, tablet PC, speaker, Internet of thing (IoT) device, lighting device, camera, etc.).

According to an embodiment, the number of mounted accessories may indicate the number of accessories mounted on each part of the robot 500. For example, one or more accessories may be mounted on a head part (A) and a body part (B). Depending on user's intention, accessories having the same characteristic or a combination of accessories having different characteristics (e.g., the first characteristic and the second characteristic) may be mounted on the robot.

According to an embodiment, the mounting position of an accessory may indicate, for example, portions of each of the head part (A) and the body part (B) of the robot. In case of the head part (A), the mounting position may indicate a first portion where an ear-shaped accessory is mounted, a second portion where a head-wearable accessory is mounted, or a third portion where a face-wearable accessory is mounted. The first, second, and third portions of the head part (A) may be partly overlapped with or different from each other. In case of the body part (B), the mounting position may indicate a first portion where an arm-shaped accessory is mounted, a second portion where a tail-shaped accessory is mounted, a third portion where a neck-wearable accessory is mounted, a fourth portion where a back-wearable accessory is mounted, and a fifth portion where an external device is mounted. The first, second, third, fourth, and fifth portions of the body part (B) may be partly overlapped with or different from each other.

At operation 803, the processor 550 may determine the properties of the robot 500, based on the accessory characteristics. In an embodiment, the processor 550 may determine the properties of the robot 500 as the characteristics of the accessory, for example, animal, dinosaur, plant, insect, occupation (e.g., police, doctor, scientist, firefighter, sports athlete), character (e.g., cartoon character, angel, demon), linked device function, and the like.

At operation 805, the processor 550 may provide feedback, based on the properties of the robot 500. In an embodiment, the processor 550 may control at least one component to output the feedback in accordance with the determined properties of the robot 500. For example, depending on the properties of the robot 500, the processor 550 may provide at least one feedback (e.g., a change in facial expression, a change in motion, a change in sound (or voice), lighting, and/or the like) to the user through an output module (e.g., the output module 707 in FIG. 7). The feedback may be selected according to suitable components of the robot 500.

Figure 9:
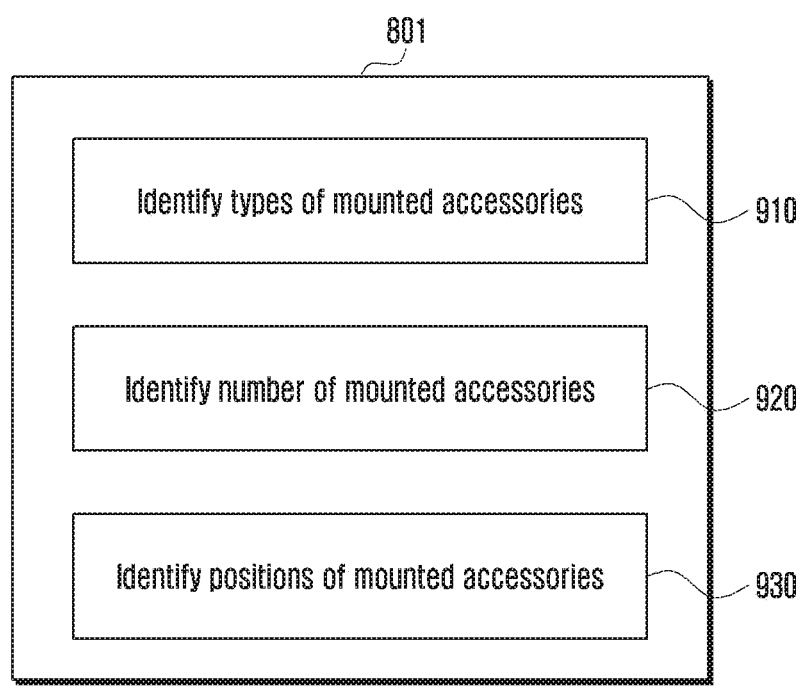
FIG. 9 is a diagram illustrating a method for identifying characteristics of an accessory at a robot according to an embodiment of the disclosure.

FIG. 9 is a diagram illustrating a method for identifying characteristics of an accessory at a robot according to an embodiment of the disclosure.

FIG. 9 illustrates operation 801 where the processor 550 of the robot 500 may identify characteristics of an accessory. Referring to FIG. 9, when the mounting of an accessory is detected, the processor 550 of the robot 500 may identify the characteristics of the accessory by identifying the type of the mounted accessory at operation 910, identifying the number of the mounted accessories at operation 920, and identifying the position of the mounted accessory at operation 930. In various embodiments, such operations 910, 920, and 930 may be performed sequentially as shown in FIG. 9 or in another order, or in parallel. At least one such operation may be omitted, or any additional operation may be further performed.

According to various embodiments, based on the accessory type, the accessory mounting number, and/or the accessory mounting position, the processor 550 may apply each corresponding characteristic or provide a relevant feedback. In an embodiment, the processor 550 may identify the accessory type and provide a feedback by applying characteristics and functions corresponding to the identified accessory type. In an embodiment, the processor 550 may identify the accessory mounting number and provide a feedback by realizing the intention corresponding to the identified mounting number. In an embodiment, the processor 550 may determine the properties of the robot with different degrees of completion depending on the identified number of mounted accessories. In an embodiment, the processor 550 may identify the accessory mounting position and provide a feedback corresponding to the identified mounting position. In an embodiment, the processor 550 may determine whether the accessory is mounted at a correct position or a wrong position, and thus provide a relevant feedback.

According to various embodiments, at operation 910, the processor 550 may identify the type of the mounted accessory, as follows.

In an embodiment, when the mounting of a certain accessory is detected, the processor 550 may identify the type of the detected (i.e., currently mounted) accessory. At this time, the processor 550 may identify the accessory type in consideration of the detected (i.e., currently mounted) accessory and the previously mounted accessory. For example, the processor 550 may identify the first type of the detected accessory and determine whether the identified first type is identical to the second type of the previously mounted accessory. If the first and second types are identical, the processor 550 may determine that the same type accessory is mounted.

If it is determined that another type of accessory is currently mounted, the processor 550 may provide a relevant feedback predefined according to setting. For example, the processor 550 may provide the user with visual, audio, and/or tactile information informing that the detected accessory is of a different type. In another example, the processor 550 may provide a combined feedback by combining a feature of the first type of the currently detected accessory with a feature (e.g., UX feature or sound) of the second type of the previously mounted accessory.

According to various embodiments, as shown in Table 2 below, various types of accessories may be classified into some categories (or classes) according to a certain criterion, and relevant feedbacks may be predefined.

TABLE 2

| Category Criterion | 1st Category Character Type | 2nd Category Event Type | 3rd Category Function-Connected Type |
|---|---|---|---|
| Feedback | 1st Style Feedback | 2nd Style Feedback | 3rd Style Feedback |

Referring to Table 2, the first category may contain character-type accessories that represent user-friendly characters such as, for example, animal, dinosaur, plant, insect, occupation (or role, e.g., police, doctor, scientist, firefighter, sports athlete), cartoon character, game character, angel, demon, and the like.

The second category may contain event-type accessories (e.g. hat, clothing, cloak, tie, necklace, glasses, stethoscope, etc.) associated with a particular event (e.g., Christmas, Halloween, birthday, country-specific costume, specific effect (e.g., color variation, pattern variation, material change), etc.) or accessories for convenience (e.g., cup holders, storage boxes, etc.).

The third category may contain function-connected accessories for extending the functionality of the robot 500 by combining (or functionally connecting) an external device (for providing specific content and/or service) such as a projector, a tablet PC, a speaker, an internet of thing (IoT) device, a lighting device, or a camera.

According to an embodiment, the processor 550 may provide a first style feedback in case of accessories of the first category. For example, for the accessories of the first category, the processor 550 may provide a feedback by changing default properties (e.g., facial expression, sound (e.g., voice), etc.) of the robot 500 to correspond to the accessory characteristics.

According to an embodiment, the processor 550 may provide a second style feedback in case of accessories of the second category. For example, for the accessories of the second category, the processor 550 may provide a feedback by adding an event-related expression and sound while maintaining the default properties of the robot 500 or the properties changed according to the accessories of the first category.

According to an embodiment, the processor 550 may provide a third style feedback in case of accessories of the third category. For example, for the accessories of the third category, the processor 550 may provide a feedback by adding or expanding a function while maintaining the default properties of the robot 500 or the properties changed according to the accessories of the first category.

According to an embodiment, different-type accessories may be mounted on the robot 500 in combination. In an embodiment, when different-type accessories are mounted in combination, the processor 550 may apply an expression according to the characteristics of one accessory mounted on the head part (A), and also apply a motion according to the characteristics of another accessory mounted on the body part (B). In an embodiment, when different-type accessories are mounted together in the same region (e.g., the head part (A) or the body part (B)), the processor 550 may preferentially apply the characteristics of the accessory firstly mounted on that region. In an embodiment, when different-type accessories are mounted together in one region (e.g., the body part (B)), the processor 550 may apply in combination the respective characteristics of the different-type accessories. In this case, the priorities of applying the characteristics of the different-type accessories may be set by the user (e.g., first priority: first category, second priority: third category, and third priority: second category, or first priority: first character (e.g., cartoon character), second priority: second character (e.g., bear), and third priority: third character (e.g., a dinosaur)).

According to an embodiment, when the accessory of the second category or the accessory of the third category is mounted after the characteristics of the accessory of the first category is applied, the characteristics of the accessory of the second or third category may be applied while a portion changed by applying the characteristics of the accessory of the first category is maintained as it is.

According to an embodiment, when the accessory of the third category is mounted after the accessories of the first and second categories are applied, the characteristics of the accessory of the third category may be applied while portions changed by applying the characteristics of the accessories of the first and second categories are maintained as they are.

According to various embodiments, at operation 920, the processor 550 may identify the number of the mounted accessories, as follows.

In an embodiment, when the mounting of a certain accessory is detected, the processor 550 may identify the number of mounted accessories in consideration of the detected (i.e., currently mounted) accessory and the previously mounted accessory(s). The mounting number of accessories may indicate the number of mounting portions on the robot 500. For example, one or more accessories may be mounted on each of the head part (A) and the body part (B) of the robot 500.

In various embodiments, the processor 550 may classify the characteristics of accessories into stages (e.g., first stage, second stage, and third stage). In an embodiment, such stages for classifying the characteristics of the accessories may be determined, for example, based on the number and/or positions of mounted accessories. In an embodiment, when the type of a mounted accessory is determined, the robot 500 may determine a modeling rule (e.g., a face element (e.g., a bear face, a rabbit face, a cartoon character face, a dinosaur face) associated with to a specific character assigned to the accessory) corresponding to the accessory type and provide a change in facial expression stage by stage, based on the modeling rule depending on the number of mounted accessories.

According to an embodiment, as shown in Table 3 below, the characteristics of accessories may be classified according to the number of mounted accessories into a first stage (e.g., single), a second stage (e.g., from two to N−1), and a third stage (e.g., N).

TABLE 3

| Stage | Mounting number | $1^{st}$ category | $2^{nd}$ category | $3^{rd}$ category |
|---|---|---|---|---|
| $1^{st}$ | 1 | Change robot properties at minimum level | Provide additional event-related robot properties | Provide connected function |
| $2^{nd}$ | From 2 to N − 1 | Change robot properties at intermediate level | Provide deepen event-related robot properties | Provide connected functions in |
| $3^{rd}$ | N | Change robot properties at maximum level | | combination or independently |

In an embodiment, the characteristics of accessories may be differentially provided stage by stage (e.g., first, second, and third stages) and differently applied according to the categories of the accessories (e.g., first, second, and third categories). For example, the accessories of the first category may be classified into the first, second, and third stages according to the mounting number, and the accessories of the second or third category may be classified into the first and second stages according to the mounting number. This classification is exemplary only.

As shown in Table 3, the accessories of the first category may be differently applied to change the properties of the robot 500, depending on the mounting number thereof.

When a single accessory of the first category is mounted (i.e., first stage), this accessory may be applied to change some properties (e.g., facial expressions, sounds, etc.) of the robot 500 at the minimum level. That is, the default properties of the robot 500 may be changed according to a low degree of completion of the accessory characteristics (e.g., a neutral expression or happy expression and a related sound).

When two or more (smaller than N) accessories of the first category are mounted (i.e., second stage), these accessories may be applied to change much more properties (e.g., facial expressions, sounds, motions, lighting, etc.) of the robot 500 at the intermediate level. That is, the default properties and previously changed properties of the robot 500 may be changed according to a middle degree of completion of the accessory characteristics.

When all mountable accessories of the first category are mounted (i.e., third stage), these accessories may be applied to change whole properties (e.g., facial expressions, sounds, motions, lighting, UX features, skin color/patterns, personality, etc.) of the robot 500 at the maximum level. That is, the default properties and previously changed properties of the robot 500 may be changed according to a high degree of completion of the accessory characteristics.

As shown in Table 3, the accessories of the second category may be differently applied to change the properties of the robot 500, depending on the mounting number thereof.

When a single accessory of the second category is mounted (i.e., first stage), this accessory may be applied to provide additional event-related properties (e.g., facial expressions, sounds, etc.) of the robot 500. That is, in addition to the default properties of the robot 500, additional robot properties associated with the event of the accessory may be provided. For example, if the event of the accessory is Christmas, a Christmas carol may be additionally provided to the properties of the robot 500.

When two or more (equal to or smaller than N) accessories of the second category are mounted (i.e., second or third stage), these accessories may be applied to provide deepen event-related properties (e.g., facial expressions, sounds, motions, lighting, UX features, skin color/patterns, personality, etc.) of the robot 500. That is, in addition to the default properties of the robot 500 and previously added properties, deepen (or detailed) robot properties associated with the event of the accessory may be further provided. For example, in addition to providing a Christmas carol, a facial expression of a snowman, a sound-related motion (e.g., dancing), and lighting (e.g., twinkle lighting to a carol song) may be further provided.

As shown in Table 3, the accessories of the third category may be differently applied to change the properties of the robot 500, depending on the mounting number thereof.

When a single accessory of the third category is mounted (i.e., first stage), this accessory may be applied to provide a connected function to the robot 500. That is, in addition to the default properties of the robot 500, a function of the accessory may be provided as an additional robot function. For example, if the mounted accessory is a projector, an image output function of the projector may be added to the robot 500.

When two or more (equal to or smaller than N) accessories of the third category are mounted (i.e., second or third stage), these accessories may be applied to provide connected functions in combination or independently to the robot 500. That is, in addition to the default properties of the robot 500 and previously added functions, additional or extended functions of the accessories may be further provided. For example, in addition to the image output function of the projector, a content output function of a tablet PC and a function of outputting related information (e.g., motion, sound, gesture, reaction, etc.) synchronized with the content may be added to the robot 500.

According an embodiment, in connection with Table 3, the maximum number of mountable accessories may be varied according to the type of accessories. For example, when the accessory type is a rabbit, up to three accessories such as ear, tail, and arm may be mounted. In another example, when the accessory type is a dinosaur, up to four accessories such as horn, teeth, tabula, and tail may be mounted.

According to an embodiment, applying the above-mentioned stages may be varied according to the total number (N) of mountable accessories. For example, if the total number of mountable accessories (in case of character-type accessories) is four, the third stage may be applied when four accessories are mounted as shown in Table 3. However, if the total number of mountable accessories (in case of character-type accessories) is two, the third stage may be applied even if only two accessories are mounted.

According to embodiments, as shown in Tables 1, 2, and 3, different UX features (e.g., display theme, face, sound, voice, motion, haptic, lighting, color, etc.) may be changeably applied depending on the types and number of mounted accessories. In an embodiment, such UX features expressible through the robot 500 may be also selectively applied according to the available components of the robot 500. In an embodiment, for example, expressible sounds may include inherent sounds of the accessory (e.g., character-specific or role-specific sound such as police) and feedback sounds corresponding to a user input (e.g., touch, hug, stroke, etc.) for interacting with the robot 500.

According to various embodiments, at operation 930, the processor 550 may identify the mounting position of the accessory, as follows.

In an embodiment, when the mounting of a certain accessory is detected, the processor 550 may identify the mounting position of the detected (i.e., currently mounted) accessory. At this time, the processor 550 may identify the mounting positions in consideration of all of the currently mounted accessory and previously mounted accessories. The mounting positions of accessories may be variously distributed over the head part (A) and the body part (B) as described above with reference to FIG. 6. When identifying the mounting position of the accessory, the processor 550 may determine whether the accessory is mounted at a correct position or a wrong position, and thus provide a relevant feedback.

Figure 10:
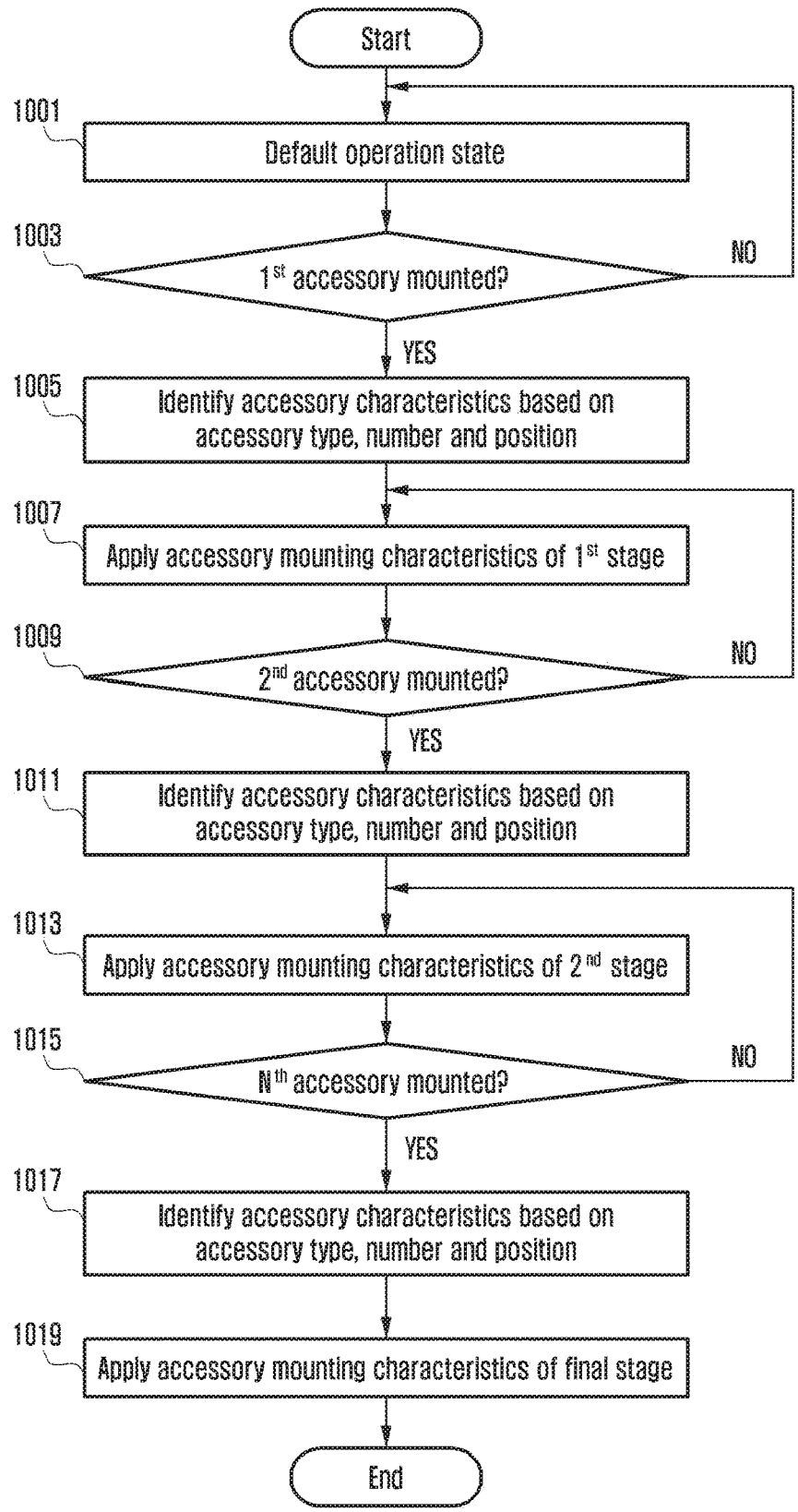
FIG. 10 is a flow diagram illustrating a method for operating a robot according to an embodiment of the disclosure.

FIG. 10 is a flow diagram illustrating a method for operating a robot according to an embodiment of the disclosure.

Referring to FIG. 10, at operation 1001, the processor 550 of the robot 500 may process actions corresponding to a default operation state of the robot 500. In an embodiment, the processor 550 may express a facial expression of the robot 500 or output a sound of the robot 500, based on default properties which have been set in advance in the robot 500. The default operation state may refer to a state where no accessory is mounted on the robot 500.

At operation 1003, the processor 550 may determine (or monitor) whether mounting of a first accessory is detected in the default operation state of the robot 500. In an embodiment, the first accessory may be a certain single accessory or a certain pair of accessories (e.g., ears).

When the mounting of the first accessory is not detected at the operation 1003, the processor 550 may return to the operation 1001.

When the mounting of the first accessory is detected at the operation 1003, the processor 550 may identify the accessory characteristics of the first accessory at operation 1005, based on the type, number, and/or position of the first accessory(s). That is, when the mounting of the first accessory(s) is detected, the processor 550 may identify the type of the first accessory(s), the number of the first accessory(s), and/or the mounting position of the first accessory(s).

At operation 1007, the processor 550 may apply the accessory mounting characteristics of a first stage. In an embodiment, the processor 550 may apply the identified accessory characteristics to the default properties of the robot 500 as described above in Table 3 and then provide a corresponding feedback with expressiveness of the first stage. In an embodiment, when the mounting position of the first accessory is not proper, that is, when the first accessory is mounted at a wrong position (e.g., when a tail accessory is mounted at an ear-mountable position), the processor 550 may provide a relevant feedback (e.g., an alert of mounting error).

Then, at operation 1009, the processor 550 may determine (or monitor) whether mounting of a second accessory is detected. In an embodiment, the second accessory may be a certain single accessory or a certain pair of accessories (e.g., arms). The type of the second accessory(s) may be identical to or different from that of the first accessory(s) mounted previously.

When the mounting of the second accessory is not detected at the operation 1009, the processor 550 may return to the operation 1007. In an embodiment, after a certain accessory is mounted, the processor 550 may determine (or monitor) whether the mounted accessory is detached. If so, the processor 550 may offer a relevant feedback.

When the mounting of the second accessory is detected at the operation 1009, the processor 550 may identify the accessory characteristics of the second accessory at operation 1011, based on the type, number, and/or position of the second accessory(s). That is, when the mounting of the second accessory(s) is detected, the processor 550 may identify the type of the second accessory(s), the number of the second accessory(s), and/or the mounting position of the second accessory(s).

At operation 1013, the processor 550 may apply the accessory mounting characteristics of a second stage. In an embodiment, the processor 550 may apply the identified accessory characteristics to the properties of the robot 500 to which the accessory characteristics of the first stage have been applied as described above in Table 3, and provide a corresponding feedback with expressiveness of the second stage. In an embodiment, when the type of the second accessory is different from that of the first accessory mounted previously (e.g., when a rabbit ear accessory is mounted after a bear tail accessory has been mounted), the processor 550 may provide a relevant feedback.

Then, at operation 1015, the processor 550 may determine (or monitor) whether mounting of an N-th accessory is detected. In an embodiment, the N-th accessory may be a third accessory or the last accessory among all mountable accessories.

When the mounting of the N-th accessory is not detected at the operation 1015, the processor 550 may return to the operation 1013. In an embodiment, after a certain accessory is mounted, the processor 550 may determine (or monitor) whether the mounted accessory is detached. If so, the processor 550 may offer a relevant feedback.

When the mounting of the N-th accessory is detected at the operation 1015, the processor 550 may identify the accessory characteristics of the N-th accessory at operation 1017, based on the type, number, and/or position of the N-th accessory(s). That is, when the mounting of the N-th accessory(s) is detected, the processor 550 may identify the type of the N-th accessory(s), the number of the N-th accessory(s), and/or the mounting position of the N-th accessory(s).

At operation 1019, the processor 550 may apply the accessory mounting characteristics of a third stage. In an embodiment, the processor 550 may apply the identified accessory characteristics to the properties of the robot 500 to which the accessory characteristics of the first and second stages have been applied as described above in Table 3, and provide a corresponding feedback with expressiveness of the third stage.

According to an embodiment, whenever any accessory is mounted, the processor 550 may determine whether the mounted accessory is the last mountable accessory. This may be required because the maximum number of mountable accessories may be varied according to the type of accessories as described above. For example, when the accessory type is a rabbit, up to three accessories such as ear, tail, and arm may be mounted. In another example, when the accessory type is a dinosaur, up to four accessories such as horn, teeth, tabula, and tail may be mounted.

According to an embodiment, applying the above-mentioned stages may be varied according to the total number (N) of mountable accessories. For example, if the total number of mountable accessories (in case of character-type accessories) is four, the third stage may be applied when four accessories are mounted as shown in Table 3. However, if the total number of mountable accessories (in case of character-type accessories) is two, the third stage may be applied even if only two accessories are mounted.

Figure 11:
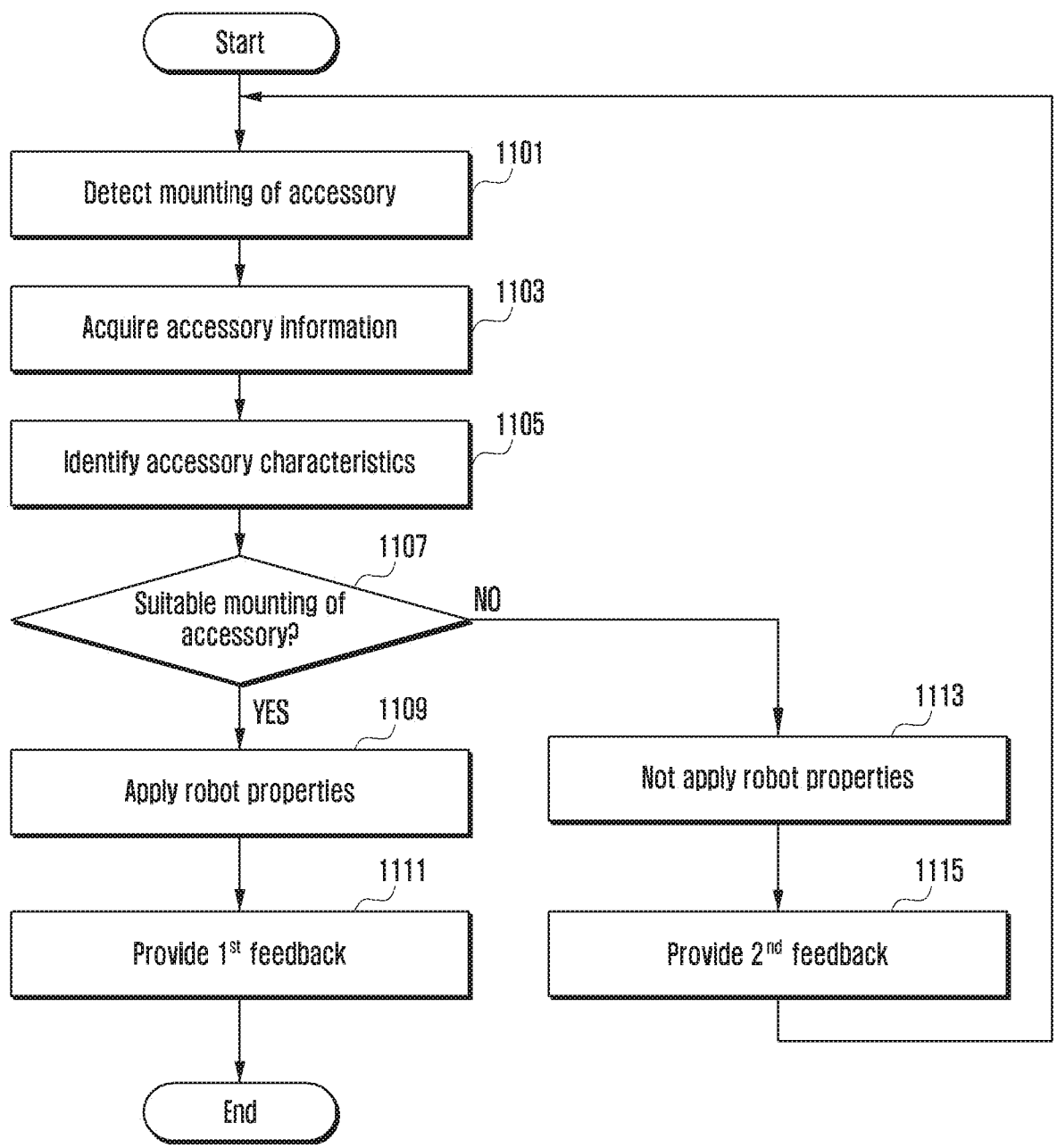
FIG. 11 is a flow diagram illustrating a method for operating a robot according to an embodiment of the disclosure.

FIG. 11 is a flow diagram illustrating a method for operating a robot according to an embodiment of the disclosure.

Referring to FIG. 11, at operation 1101, the processor 550 of the robot 500 may detect mounting of an accessory. In an embodiment, the robot 500 may be in a default operation state (i.e., a state where the robot 500 is operating according to default properties which have been set in advance) or in a particular operation state where the robot 500 is operating according to properties changed by the characteristics of previously mounted accessory(s). In an embodiment, the processor 550 may detect the mounting of the accessory, based on a change in signal (e.g., a magnetic field) between the sensor circuit 703 (e.g., Hall sensor) of the robot 500 and the sensor module 725 of the accessory.

According to an embodiment, the sensor module 725 may include a module for generating a signal for detecting the mounting position of the accessory 600 in the robot 500. For example, the sensor module 725 may include a magnetic object (e.g., a magnet or a rubber magnet) that affects current. In an embodiment, the sensor module 725 may operate as a mounting member. For example, when the sensor module 725 is implemented as a magnet (or rubber magnet), it may be magnetically attached to the mounting member (e.g., iron) provided at an accessory-mountable position on the housing of the robot 500.

When the mounting of the accessory is detected, the processor 550 may acquire accessory information from the mounted accessory at operation 1103. According to an embodiment, the processor 550 may acquire the accessory information by communicating with the communication module 723 of the accessory through the communication circuit 705 (e.g., circuit for contactless communication) established for communication (or wireless connection) with the accessory. For example, the contactless communication may be implemented with at least one contactless proximity communication technique such as NFC, RFID communication, or MST communication.

In an embodiment, the accessory 600 and the robot 500 may communicate with each other through any other wireless communication (e.g., Wi-Fi, Bluetooth communication) in addition to the contactless communication. In an embodiment, the communication module 723 of the accessory may be implemented with an NFC tag. For example, the accessory may input and store information about the accessory (e.g., an accessory unique identifier) in the NFC tag, and the processor 550 may read information stored in the NFC tag through the communication circuit 705. Acquiring the accessory information may include, for example, acquiring accessory information of the detected (or currently mounted) accessory and/or of the previously mounted accessory(s).

At operation 1105, the processor 550 may identify accessory characteristics. According to an embodiment, the processor 550 may identify an accessory type, the number of mounted accessories, and a position of the mounted accessory. In an embodiment, in response to the mounting of the accessory, the processor 550 may identify the accessory type (e.g., a tail of rabbit, tabula of dinosaur, etc.) from the acquired accessory information (e.g., a unique identifier), identify the number of mounted accessories from the acquired accessories, and identify the accessory mounting position by identifying the location of the sensor circuit 703 that detects the accessory.

At operation 1107, the processor 550 may determine whether the accessory is appropriately mounted. According to an embodiment, based on the acquired accessory information and information about the corresponding mounting position, the processor 550 may determine whether the accessory mounting position is suitable. Further, based on the accessory information of the detected (or currently mounted) accessory and information of the previously mounted accessory, the processor 550 may determine whether both accessories have the same type.

When it is determined at the operation 1107 that the accessory mounting position is suitable, at operation 1109, the processor 550 may apply the properties of the robot 500 based on the identified accessory characteristics. According to an embodiment, based on the identified accessory characteristics, the processor 550 may determine the properties of the robot 500 for providing a feedback corresponding to the characteristics of the accessory through the robot 500. In an embodiment, the processor 550 may determine the properties of the robot 500 as the characteristics of the accessory, for example, animal, dinosaur, plant, insect, occupation (e.g., police, doctor, scientist, firefighter, sports athlete), character (e.g., cartoon character, angel, demon), linked device function, or the like.

Then, at operation 1111, the processor 550 may provide a first feedback based on the properties of the robot 500. According to an embodiment, the processor 550 may control at least one component to output the feedback in accordance with the determined properties of the robot 500. For example, depending on the properties of the robot 500, the processor 550 may provide at least one feedback (e.g., a change in facial expression, a change in motion, a change in sound (or voice), lighting, and/or the like) to the user through an output module (e.g., the output module 707 in FIG. 7). The feedback(s) may be selected according to suitable components of the robot 500.

When it is determined at the operation 1107 that the accessory mounting position is not suitable, at operation 1113, the processor 550 may not apply the properties of the robot 500 based on the identified accessory characteristics. According to an embodiment, when the accessory mounting position is not proper, that is, when the accessory is mounted at a wrong position (e.g., when a tail accessory is mounted at an ear-mountable position), the processor 550 may provide a relevant feedback (e.g., an alert of mounting error). In an embodiment, when the type of the accessory is different from that of the previously mounted accessory (e.g., when a rabbit ear accessory is mounted after a bear tail accessory has been mounted), the processor 550 may provide a relevant feedback.

Then, at operation 1115, the processor 550 may provide a second feedback. According to an embodiment, the processor 550 may provide the second feedback informing a mounting error based on at least one of a visual element, an auditory element, or a tactile element.

Figure 12:
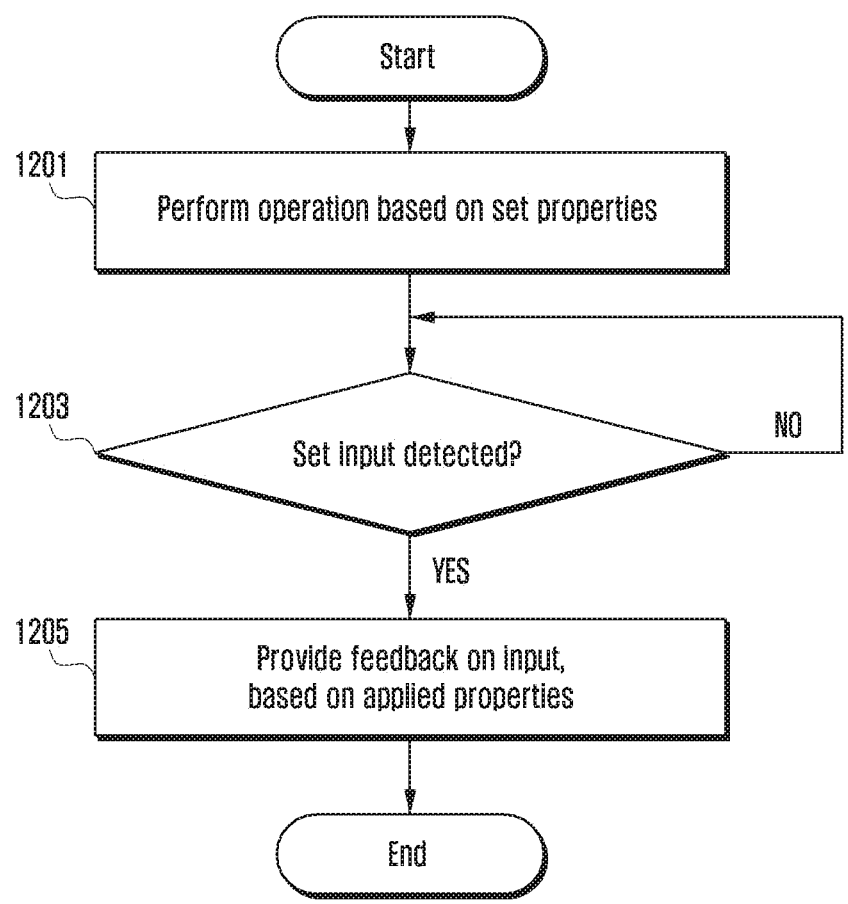
FIG. 12 is a flow diagram illustrating a method for operating a robot according to an embodiment of the disclosure.

FIG. 12 is a flow diagram illustrating a method for operating a robot according to an embodiment of the disclosure.

Referring to FIG. 12, at operation 1201, the processor 550 of the robot 500 may perform a particular operation of the robot 500 based on set properties. In an embodiment, the robot 500 may be in a default operation state (i.e., a state where the robot 500 is operating according to default properties which have been set in advance) or in a particular operation state where the robot 500 is operating according to properties changed by the characteristics of previously mounted accessory(s).

At operation 1203, the processor 550 may determine (or monitor) whether a set input is detected. According to an embodiment, the set input may include, for example, an external input or an internal input. The external input may include a user input (e.g., touch, hug, stroke, etc.) or an input device (e.g., a device power-on, a content execution, etc.) of a mounted accessory (e.g., an external device or a function-connected device). For example, the user input may include a user interaction such as pressing the body part (B) of the robot 500 or stroking the head part (A) of the robot 500. The internal input may include an input based on context awareness of the processor 550. For example, the processor 550 may recognize, as an input, a change in surrounding environments (e.g., a change in a time zone or a change in a place).

When no input is detected at the operation 1203, the processor 550 may return to the operation 1201.

When the set input is detected at the operation 1203, the processor 550 may provide a feedback corresponding to the detected input at operation 1205, based on applied properties. According to an embodiment, the processor 550 may provide a feedback based on the robot 500 and/or the accessory. For example, the processor 550 may provide at least one feedback (e.g., change in facial expression, body twisting, body bending, body shaking, change in sound or voice, change in color, lighting, etc.) to the user through the output module (e.g., the output module 707 in FIG. 7) of the robot 500. In another example, the processor 550 may provide at least one feedback (e.g., lighting, vibration, or color change, etc.) to the user through the mounted accessory.

Figure 13:
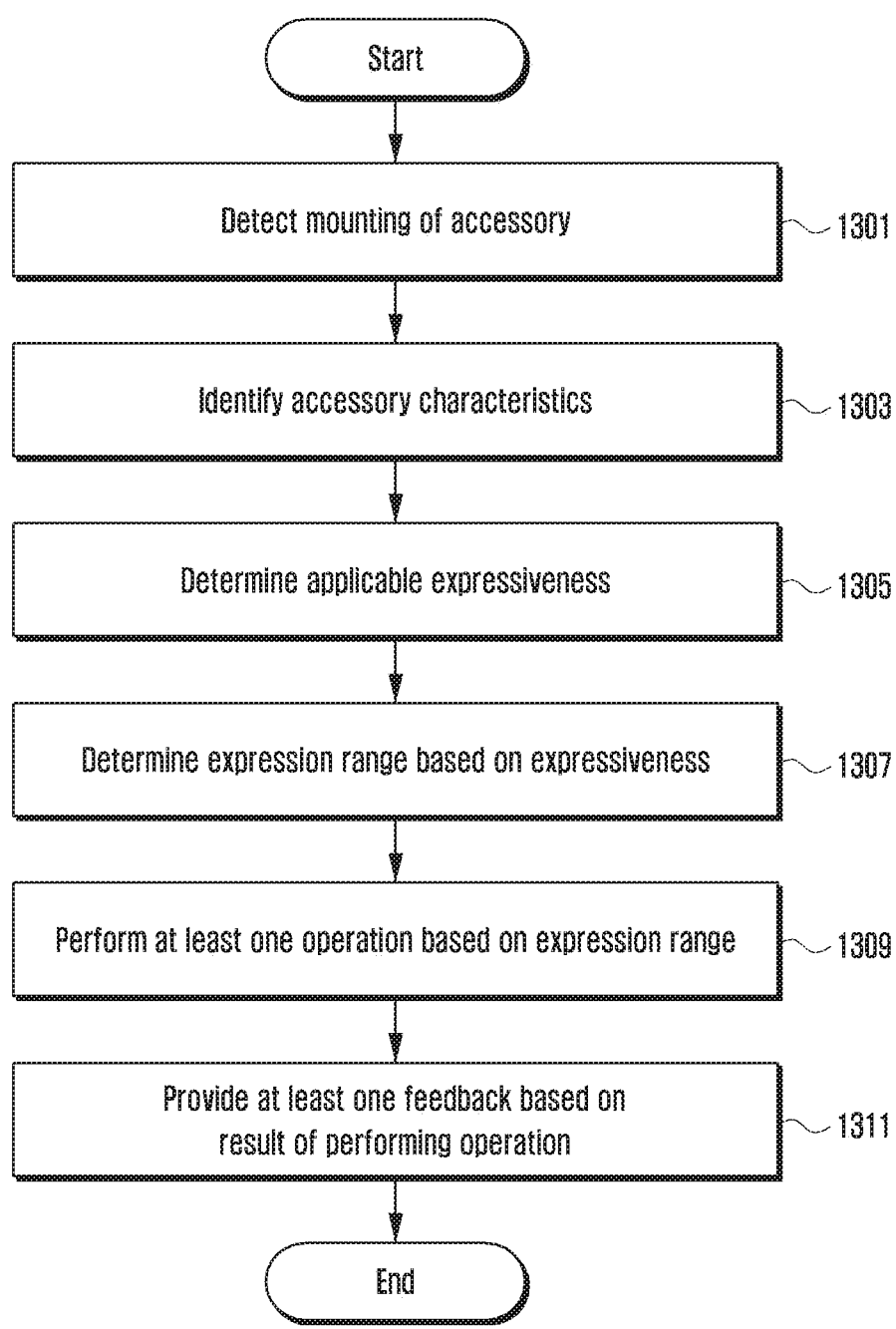
FIG. 13 is a flow diagram illustrating a method for operating a robot according to an embodiment of the disclosure.

FIG. 13 is a flow diagram illustrating a method for operating a robot according to an embodiment of the disclosure.

Referring to FIG. 13, at operation 1301, the processor 550 of the robot 500 may detect mounting of an accessory. In an embodiment, the robot 500 may be in a default operation state (i.e., a state where the robot 500 is operating according to default properties which have been set in advance) or in a particular operation state where the robot 500 is operating according to properties changed by the characteristics of previously mounted accessory(s). In an embodiment, the processor 550 may detect the mounting of the accessory, based on a change in signal (e.g., a magnetic field) between the sensor circuit 703 (e.g., Hall sensor) of the robot 500 and the sensor module 725 of the accessory.

At operation 1303, the processor 550 may identify accessory characteristics. According to an embodiment, the processor 550 may identify an accessory type, the number of mounted accessories, and a position of the mounted accessory.

At operation 1305, the processor 550 may determine applicable expressiveness based on the mounted accessory (e.g., additional expressive capabilities, functions, or service levels by the further mounting (or stage change) of the accessory). According to an embodiment, in case of the accessory of the first category, the processor 550 may check whether there are additionally operable functions, additionally changeable facial expressions and/or voices, additional events, or additional personalities, depending on the further mounted accessory(s).

At operation 1307, the processor 550 may determine an expression range based on the determined expressiveness. According to an embodiment, the processor 550 may determine further particular actions or functions applicable through the robot 500 according to the determined expressiveness or service level.

At operation 1309, the processor 550 may perform at least one operation based on the determined expression range. According to an embodiment, the processor 550 may control components (e.g., the sensor circuit, the communication circuit, the speaker, the output device, etc.) corresponding to the further applicable actions or functions in accordance with the expressiveness and also control the output module 707 for outputting the corresponding stage of the accessory characteristics. For example, when an additional function is a lighting function, the processor 550 may recognize a user input (e.g., touch), illumination, or set (or received) notification to perform a lighting control. In another example, when an addition function is a certain event, the processor 550 may perform playback of event-related content, apply (or change) a color (or property) corresponding to the event, or control an event-related motion to express event features. In still another example, in order to execute a function interoperable with the accessory (e.g., a function-connected device), the processor 550 may perform interactions with the accessory, perform synchronization for interworking with content, or recognize a user input (e.g., touch) on the robot 500 or the accessory.

At operation 1311, the processor 550 may provide at least one feedback based on a result of performing operations. For example, the processor 550 may provide a lighting feedback (e.g., applying a color, a blinking effect, etc.), a mood lighting mode, a lighting feedback in response to a notification (e.g., a change in color and/or blink pattern according to notification information such as a phone or message). In another example, the processor 550 may provide an additional event-related feedback (e.g., a change of voice tone according to applying personality). In still another example, the processor 550 may provide a feedback by adding or extending a function based on interworking with the accessory, or provide a feedback corresponding to a user interaction with the accessory.

Figure 14:
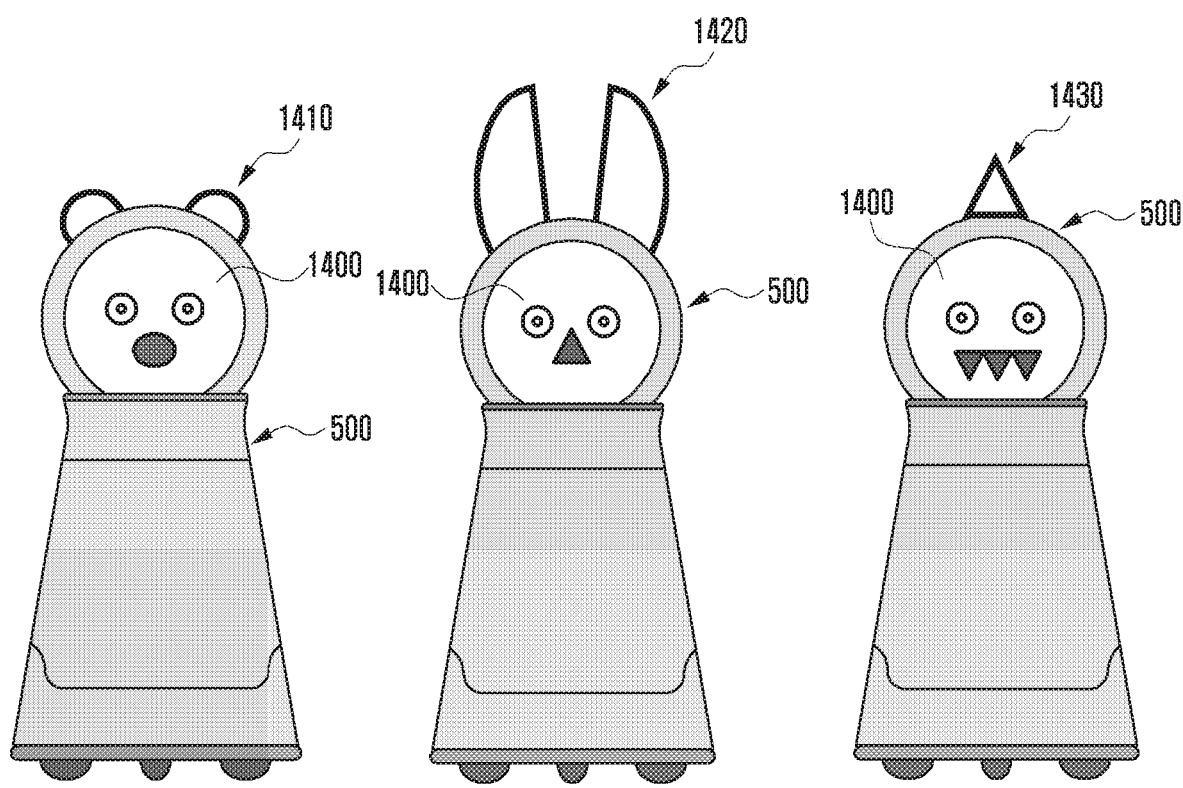
FIG. 14 is a diagram illustrating examples of an accessory mounted on a robot according to an embodiment of the disclosure.

FIG. 14 is a diagram illustrating examples of an accessory mounted on a robot according to an embodiment of the disclosure.

Referring to FIG. 14, it shows three examples in which at least one accessory of the first category (i.e., character type) as described above in Tables 1, 2 and 3 is mounted on the robot 500.

Referring to FIG. 14, the accessories of the first category may include character-type accessories that represent user-friendly characters such as, for example, animal, dinosaur, plant, insect, occupation (or role, e.g., police, doctor, scientist, firefighter, sports athlete), cartoon character, game character, angel, demon, and the like. For example, FIG. 14 shows a first accessory 1410 expressing the characteristics of a bear, a second accessory 1420 expressing the characteristics of a rabbit, and a third accessory 1430 expressing the characteristics of a dinosaur. Although FIG. 14 shows ear-type accessories expressing the respective characteristics, other type accessories such as arms, a tail, or a horn may be used for expressing the corresponding accessory characteristics.

According to an embodiment, when the characteristics of the accessory of the first category is applied, a default facial expression of the robot 500 provided through a display device 1400 of the robot 500 may be changed to a facial expression corresponding to the applied accessory characteristics. For example, when the first accessory 1410 is mounted, the default facial expression of the robot 500 may be changed to a facial expression of a bear corresponding to the characteristics of the first accessory 1410. When the second accessory 1420 is mounted, the default facial expression of the robot 500 may be changed to a facial expression of a rabbit corresponding to the characteristics of the second accessory 1420. When the third accessory 1430 is mounted, the default facial expression of the robot 500 may be changed to a facial expression of a dinosaur corresponding to the characteristics of the third accessory 1430.

In addition, although not shown, when the accessory is mounted, a sound (e.g., voice) corresponding to the characteristics of the accessory may be also changed together with a facial expression corresponding to the characteristics of the accessory.

According to an embodiment, two or more accessories having different characteristics (e.g., a first character accessory and a second character accessory) may be mounted in combination. In this case, for example, the robot 500 may apply such different characteristics of the accessories in the order of priority corresponding to the order of mounting accessories. In another example, the robot 500 may apply such different characteristics of the accessories in the order of priority depending on mounting regions (e.g., applying first a facial expression according to the characteristics of the accessory mounted on the head part (A)).

According to an embodiment, different-type accessories may be mounted on the robot 500 in combination. In this case, for example, the processor 550 may apply a facial expression according to the characteristics of one accessory mounted on the head part (A), and also apply a motion according to the characteristics of another accessory mounted on the body part (B). In another example, when different-type accessories are mounted together in the same region (e.g., the head part (A) or the body part (B)), the processor 550 may preferentially apply the characteristics of the accessory firstly mounted on that region. The priority of applying the characteristics may be set by the user.

Figure 15:
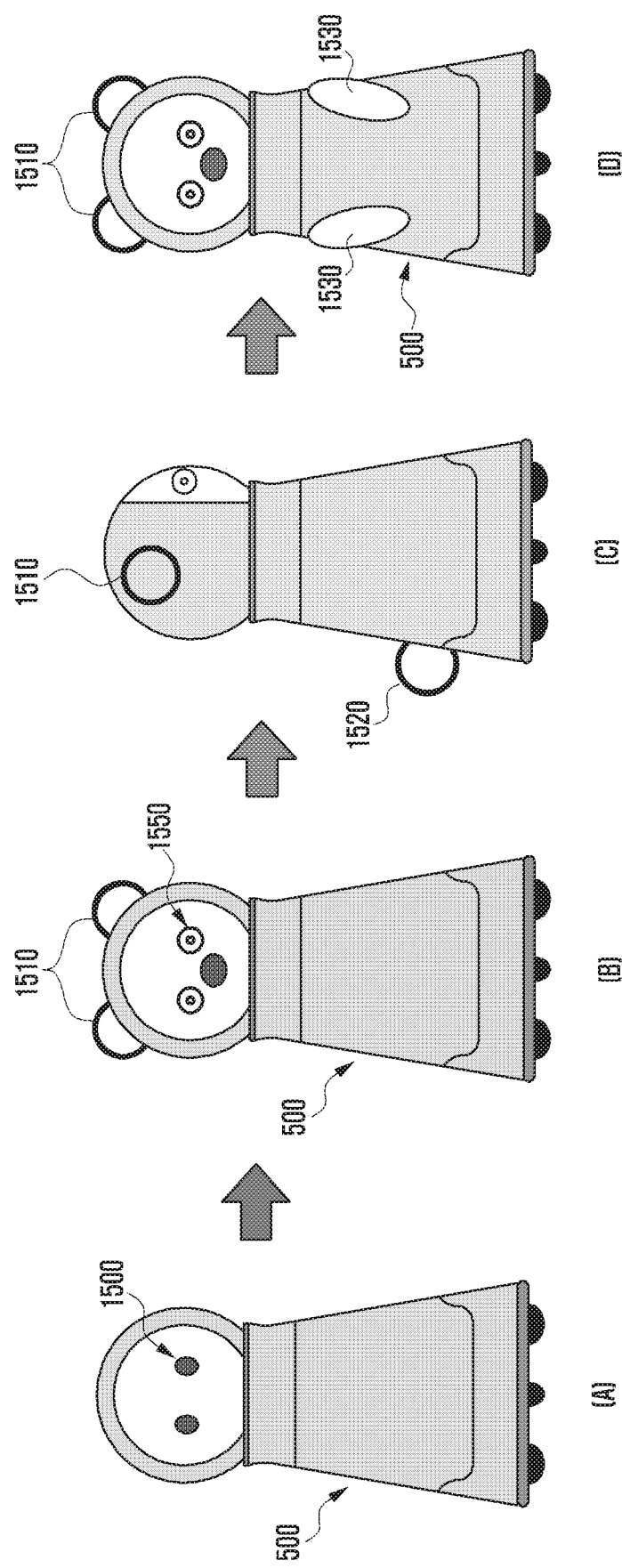
FIG. 15 is a diagram illustrating an example of an accessory mounted on a robot and a related operation according to an embodiment of the disclosure.

FIG. 15 is a diagram illustrating an example of an accessory mounted on a robot and a related operation according to an embodiment of the disclosure.

Referring to FIG. 15, FIG. 15 shows examples of a change in expression stage by stage depending on the number of accessories mounted on the robot 500.

In an embodiment, the characteristics of accessories may be differentially provided stage by stage (e.g., first, second, and third stages) and differently applied according to the categories of the accessories (e.g., first, second, and third categories). For example, the accessories of the first category may be classified into the first, second, and third stages according to the mounting number, and the accessories of the second or third category may be classified into the first and second stages according to the mounting number. This classification is exemplary only.

In FIG. 15, example (A) shows a default state of the robot 500. In the default state, the robot 500 may be expressed according to default properties thereof (e.g., a default facial expression 1500 and a default sound).

Example (B) shows that a first accessory 1510 (e.g., ears) having the characteristics of a bear is mounted on the head part (A) of the robot 500. As shown, when the first accessory 1510 is mounted, the default facial expression 1500 of the robot 500 may be changed to a facial expression 1550 corresponding to the characteristics of a bear. In addition, a certain sound corresponding to the characteristics of a bear may be outputted. According to an embodiment, when a single accessory (e.g., the first accessory 1510) is mounted (i.e., first stage), this accessory may be applied to change some properties (e.g., facial expressions, sounds, etc.) of the robot 500 at the minimum level. That is, the default properties of the robot 500 may be changed according to a low degree of completion of the accessory characteristics (e.g., a neutral expression or happy expression and a related sound).

Example (C) shows that a second accessory 1520 (e.g., a tail) having the characteristics of a bear is mounted on the body part (B) of the robot 500 after the first accessory 1510 (e.g., ears) having the characteristics of a bear is mounted. As shown, when the second accessory 1520 is further mounted, a specific motion corresponding to the characteristics of a bear may be provided together with a relevant sound. According to an embodiment, when two or more (smaller than N) accessories (e.g., the first and second accessories 1510 and 1520) are mounted (i.e., second stage), these accessories may be applied to change much more properties (e.g., facial expressions, sounds, motions, lighting, etc.) of the robot 500 at the intermediate level. That is, the default properties and previously changed properties of the robot 500 may be changed according to a middle degree of completion of the accessory characteristics.

Example (D) shows that a third accessory 1530 (e.g., arms) having the characteristics of a bear is mounted on the body part (B) of the robot 500 after the first and second accessories 1510 and 1520 (e.g., ears and a tail) having the characteristics of a bear are mounted. As shown, when the third accessory 1530 is further mounted, that is, when all accessories for expressing the characteristics of a bear are mounted, full expressions may be provided. According to an embodiment, when all mountable accessories (e.g., the first, second and third accessories 1510, 1520 and 1530) are mounted (i.e., third stage), these accessories may be applied to change whole properties (e.g., facial expressions, sounds, motions, lighting, UX features, skin color/patterns, personality, etc.) of the robot 500 at the maximum level. That is, the default properties and previously changed properties of the robot 500 may be changed according to a high degree of completion of the accessory characteristics.

Figure 16:
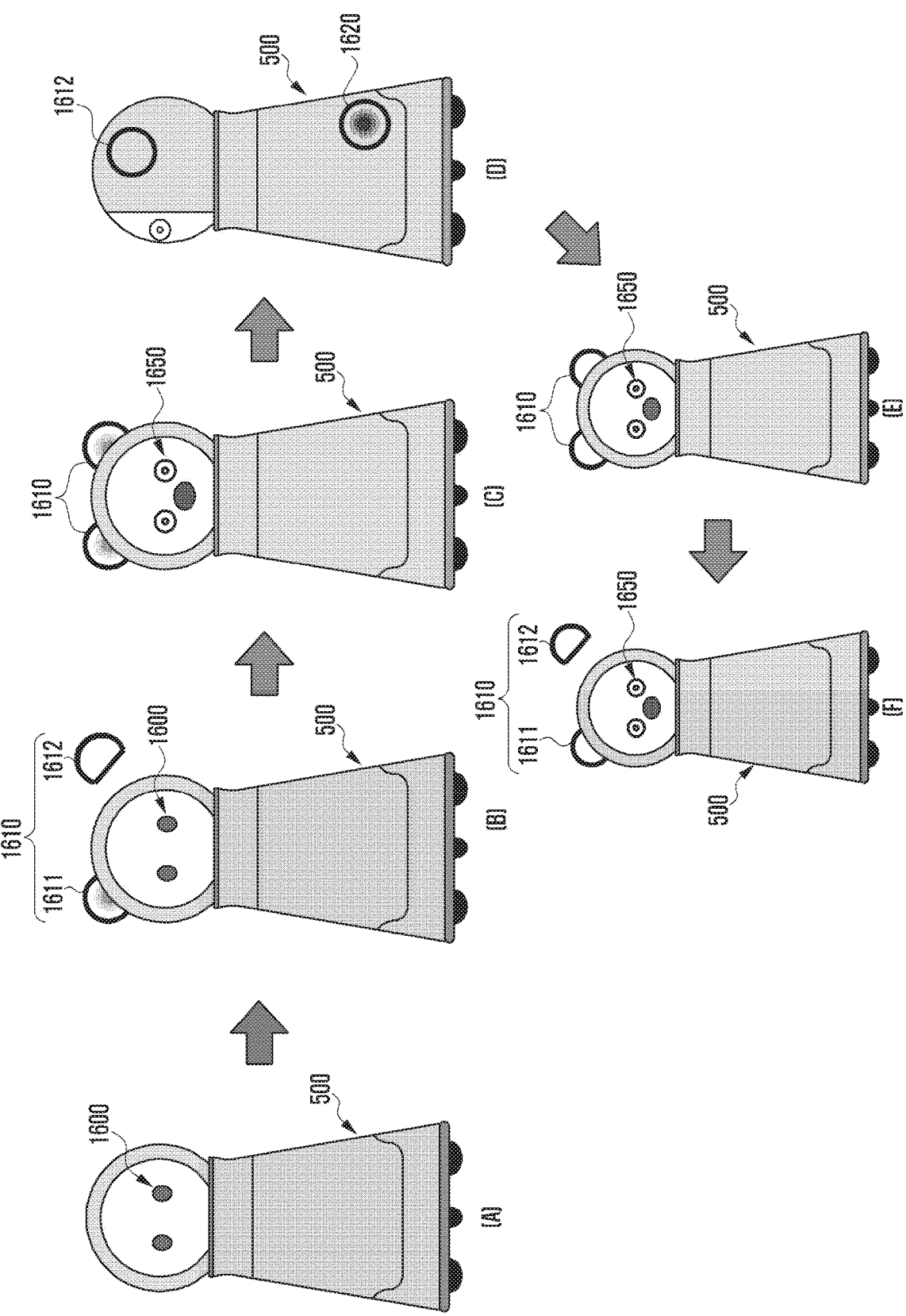
FIG. 16 is a diagram illustrating an example of an accessory mounted on a robot and a related operation according to an embodiment of the disclosure.

FIG. 16 is a diagram illustrating an example of an accessory mounted on a robot and a related operation according to an embodiment of the disclosure.

Referring to FIG. 16, FIG. 16 shows examples of a change in expression stage by stage when respective accessories are mounted on or detached from the robot 500.

In FIG. 16, example (A) shows a default state of the robot 500. In the default state, the robot 500 may be expressed according to default properties thereof (e.g., a default facial expression 1600 and a default sound).

Example (B) shows that a pair of first accessories 1610 (e.g., a right ear accessory 1611 and a left ear accessory 1612) having specific characteristics is being mounted on the head part (A) of the robot 500. As shown, while the first accessories 1610 are being mounted on the robot 500, no feedback is provided (e.g., the default facial expression 1600 of the robot 500 is maintained). When one (e.g., the right ear accessory 1611) of the pair of the first accessories 1610 is completely mounted, a predetermined feedback (e.g., lighting through the right ear accessory 1611) may be provided. However, in case of the pair of the first accessories 1610, the default properties (e.g., the default facial expression 1600 and the default sound) of the robot 500 may be maintained even if only one (e.g., the right ear accessory 1611) of both accessories is mounted.

Example (C) shows that the pair of the first accessories 1610 (e.g., the right ear accessory 1611 and the left ear accessory 1612) is completely mounted on the head part (A) of the robot 500. At this time, a predetermined feedback (e.g., lighting such as twinkle and related sound informing successful mounting) may be provided through the pair of the first accessories 1610. In addition, the default facial expression 1600 of the robot may be changed to a facial expression 1650 corresponding to the characteristics of the first accessories 1610, and also a related sound may be provided.

Example (D) shows that a second accessory 1620 (e.g., a tail accessory) is mounted on the body part (B) of the robot 500 after the first accessories 1610 are mounted. As shown, when the second accessory 1620 is further mounted, a specific motion corresponding to the characteristics of the second accessory 1620 may be provided. In addition, a predetermined feedback (e.g., lighting such as twinkle and/or vibration) may be provided through the second accessory 1620.

Example (E) shows that the second accessory 1620 (e.g., a tail accessory) is detached from the robot 500 after the first and second accessories 1610 and 1620 are mounted. At this time, a feedback associated with detachment (e.g., a motion of shaking a head from side to side, and/or a related sound) may be provided.

Example (F) shows that one (e.g., the left ear accessory 1612) of the pair of the first accessories 1610 (e.g., the right ear accessory 1611 and the left ear accessory 1612) is detached from the robot 500. At this time, the changed properties of the robot 500 (e.g., the changed facial expression 1650 and related sound) may be maintained. When the pair of the first accessories 1610 is completely detached, the changed properties of the robot 500 (e.g., the changed facial expression 1650 and related sound) may be return to the default properties (e.g., the default facial expression 1600 and the default sound) of the robot 500.

Figure 17:
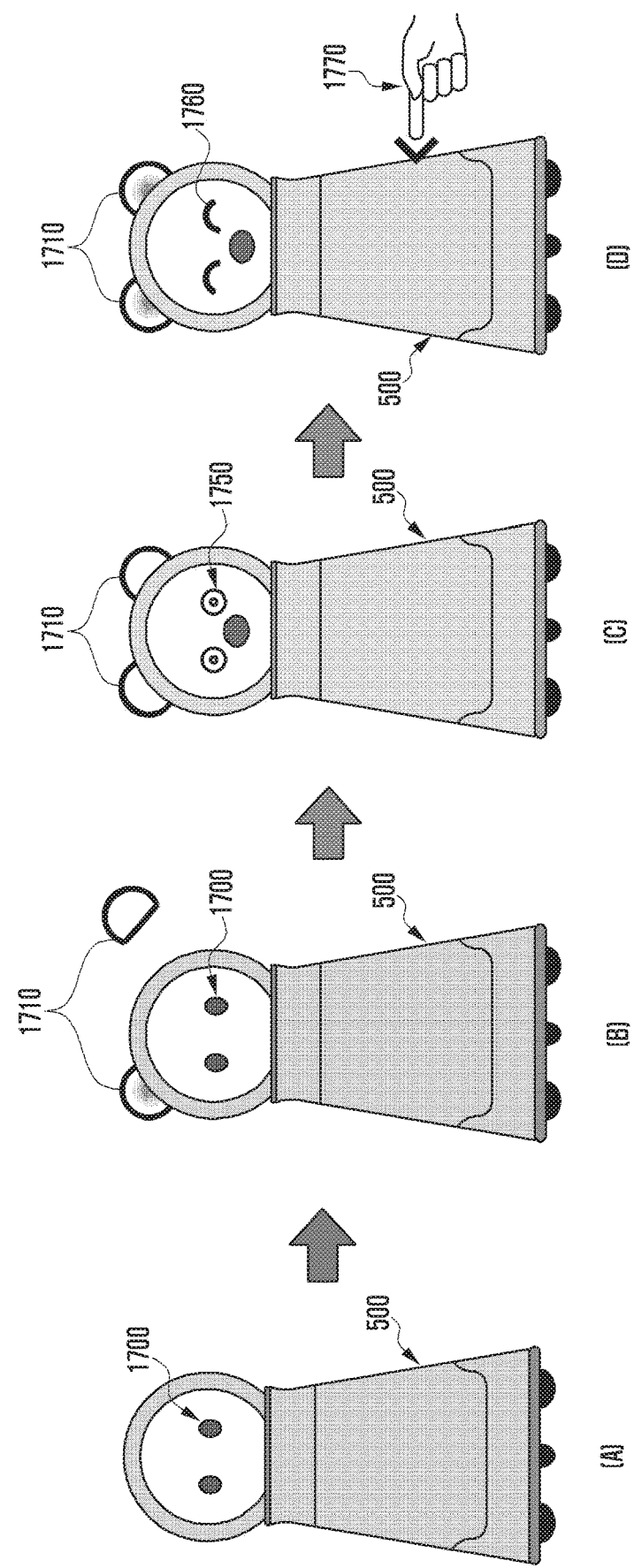
FIG. 17 is a diagram illustrating an operating example of a robot based on a mounted accessory according to an embodiment of the disclosure.

FIG. 17 is a diagram illustrating an operating example of a robot based on a mounted accessory according to an embodiment of the disclosure.

Referring to FIG. 17, FIG. 17 shows an example of providing a feedback according to an interaction with a user, based on the characteristics of the accessory mounted on the robot 500.

In FIG. 17, example (A) shows a default state of the robot 500. In the default state, the robot 500 may be expressed according to default properties thereof (e.g., a default facial expression 1700 and a default sound).

Examples (B) and (C) show that a pair of first accessories 1710 (e.g., a right ear accessory and a left ear accessory) having specific characteristics is being sequentially mounted on the head part (A) of the robot 500.

As shown in example (B), while the first accessories 1710 are being mounted on the robot 500, no feedback is provided (e.g., the default facial expression 1700 of the robot 500 is maintained). When one (e.g., the right ear accessory) of the pair of the first accessories 1710 is completely mounted, a predetermined feedback (e.g., lighting through the right ear accessory) may be provided. However, in case of the pair of the first accessories 1710, the default properties (e.g., the default facial expression 1700 and the default sound) of the robot 500 may be maintained even if only one (e.g., the right ear accessory) of both accessories is mounted.

Example (C) shows that the pair of the first accessories 1710 (e.g., the right ear accessory and the left ear accessory) is completely mounted on the head part (A) of the robot 500. At this time, a predetermined feedback (e.g., lighting and related sound informing successful mounting) may be provided through the first accessories 1710. In addition, the default facial expression 1700 of the robot may be changed to a facial expression 1750 corresponding to the characteristics of the first accessories 1710, and also a related sound may be provided.

Example (D) shows an interaction with the user. As shown, when a user input 1770 (e.g., a motion of sticking the body part (B)) is detected, a feedback corresponding to the user input 1770 may be provided. For example, the facial expression 1750 and sound being provided according to the characteristics of the first accessories 1710 may be changed to another facial expression 1760 and related sound in response to the user input 1770. In an embodiment, a change in facial expression may be provided according to a modeling rule (e.g., a face element (e.g., a bear face, a rabbit face, a cartoon character face, a dinosaur face) associated with a specific character assigned to the accessory) corresponding to the accessory characteristics.

Figure 18:
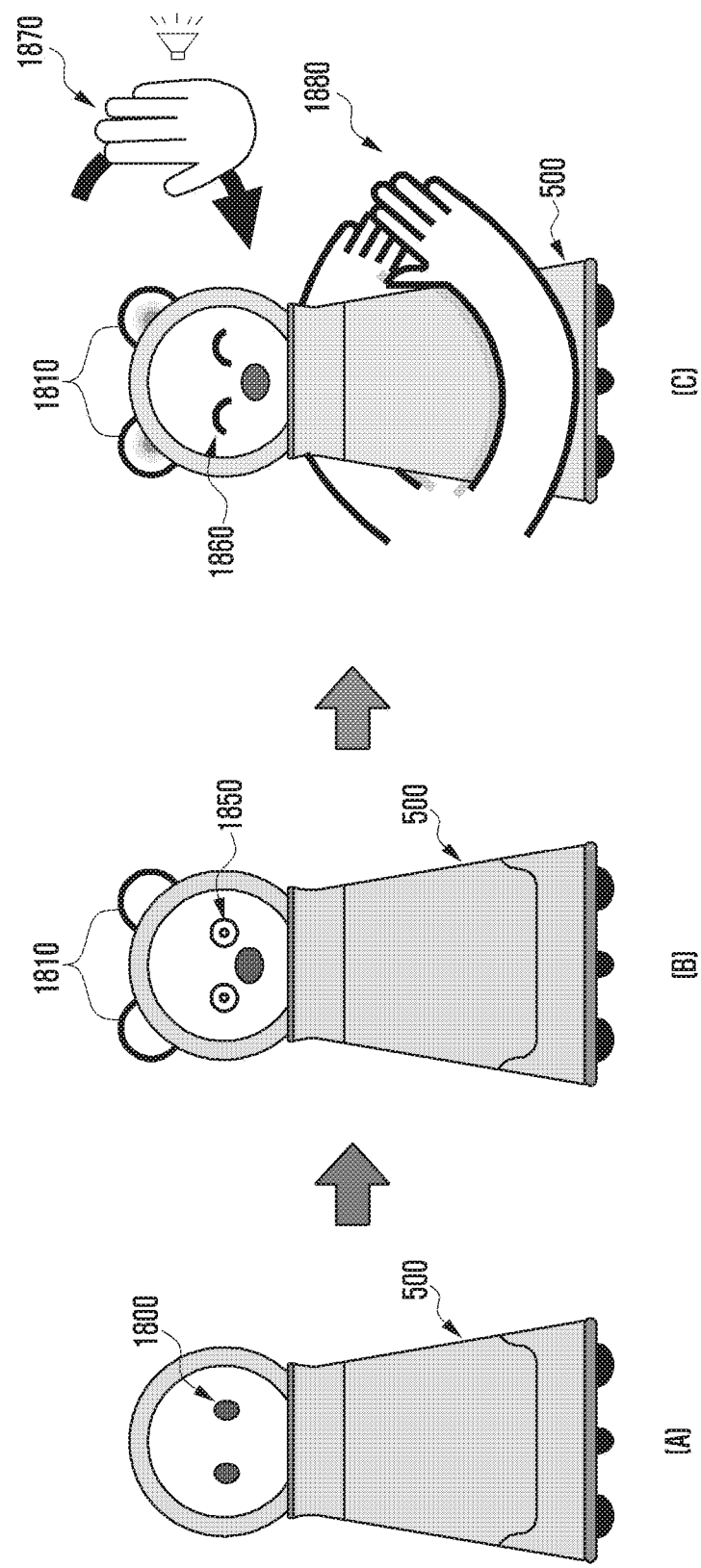
FIG. 18 is a diagram illustrating an operating example of a robot based on a mounted accessory according to an embodiment of the disclosure.

FIG. 18 is a diagram illustrating an operating example of a robot based on a mounted accessory according to an embodiment of the disclosure.

Referring to FIG. 18, FIG. 18 shows an example of providing a feedback according to an interaction with a user, based on the characteristics of the accessory mounted on the robot 500. Especially, FIG. 18 shows an example of providing a plurality of feedbacks such as haptic and sound feedbacks in response to user interactions.

In FIG. 18, example (A) shows a default state of the robot 500. In the default state, the robot 500 may be expressed according to default properties thereof (e.g., a default facial expression 1800 and a default sound).

Example (B) shows that a pair of first accessories 1810 (e.g., ear accessories) having specific characteristics are mounted on the head part (A) of the robot 500. As shown, the default facial expression 1800 of the robot 500 may be changed to a facial expression 1850 corresponding to the characteristics of the first accessories 1810, and also a related sound may be provided.

Example (C) shows an interaction with the user. As shown, when a first user input 1870 (e.g., a motion of stroking the head part (A)) and a second user input 1880 (e.g., a motion of hugging the body part (B)) are detected, a plurality of feedbacks corresponding to the first and second user inputs 1870 and 1880 may be provided. For example, the facial expression 1850 and sound being provided according to the characteristics of the first accessories 1810 may be changed to another facial expression 1860 and related sound in response to the first and second user inputs 1870 and 1880. In addition, the robot 500 may provide a haptic feedback and a sound feedback through the head part (A) in response to the first user input 1870 (e.g., stroke) and also provide a haptic feedback through the body part (B) in response to the second user input 1880 (e.g., hug). In an embodiment, a change in facial expression may be provided according to a modeling rule (e.g., a face element (e.g., a bear face, a rabbit face, a cartoon character face, a dinosaur face) associated with a specific character assigned to the accessory) corresponding to the accessory characteristics.

Figure 19:
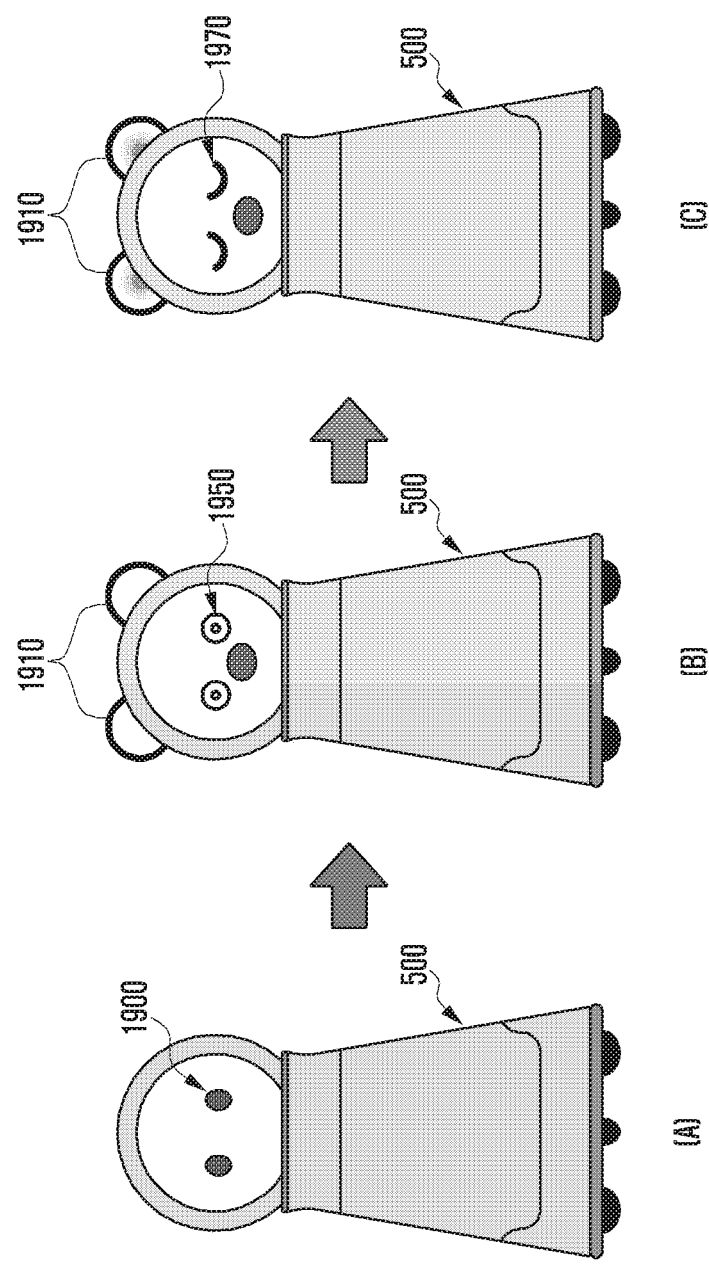
FIG. 19 is a diagram illustrating an operating example of a robot based on a mounted accessory according to an embodiment of the disclosure.

FIG. 19 is a diagram illustrating an operating example of a robot based on a mounted accessory according to an embodiment of the disclosure.

Referring to FIG. 19, FIG. 19 shows an example of providing a feedback through context awareness, based on the characteristics of the accessory mounted on the robot 500. That is, FIG. 19 shows an example of sensing a surrounding environment (or context awareness) and providing a corresponding feedback such as a lighting control.

In FIG. 19, example (A) shows a default state of the robot 500. In the default state, the robot 500 may be expressed according to default properties thereof (e.g., a default facial expression 1900 and a default sound).

Example (B) shows that first accessories 1910 having specific characteristics are mounted on the robot 500. As shown, the default facial expression 1900 of the robot 500 may be changed to a facial expression 1950 corresponding to the characteristics of the first accessories 1910, and also a related sound may be provided.

Example (C) shows an example of sensing a surrounding environment (or context awareness) and providing a corresponding feedback. For example, the robot 500 may sense the ambient illumination through the illumination sensor and determine whether the ambient illumination satisfies a predetermined condition (e.g., a given illumination level or less). If so, the robot 500 may provide a feedback of controlling a lighting function of the first accessory 1910 to express a sleep mode such as a mood light (e.g., yellow lighting) and also provide a sleeping facial expression 1970.

Figure 20:
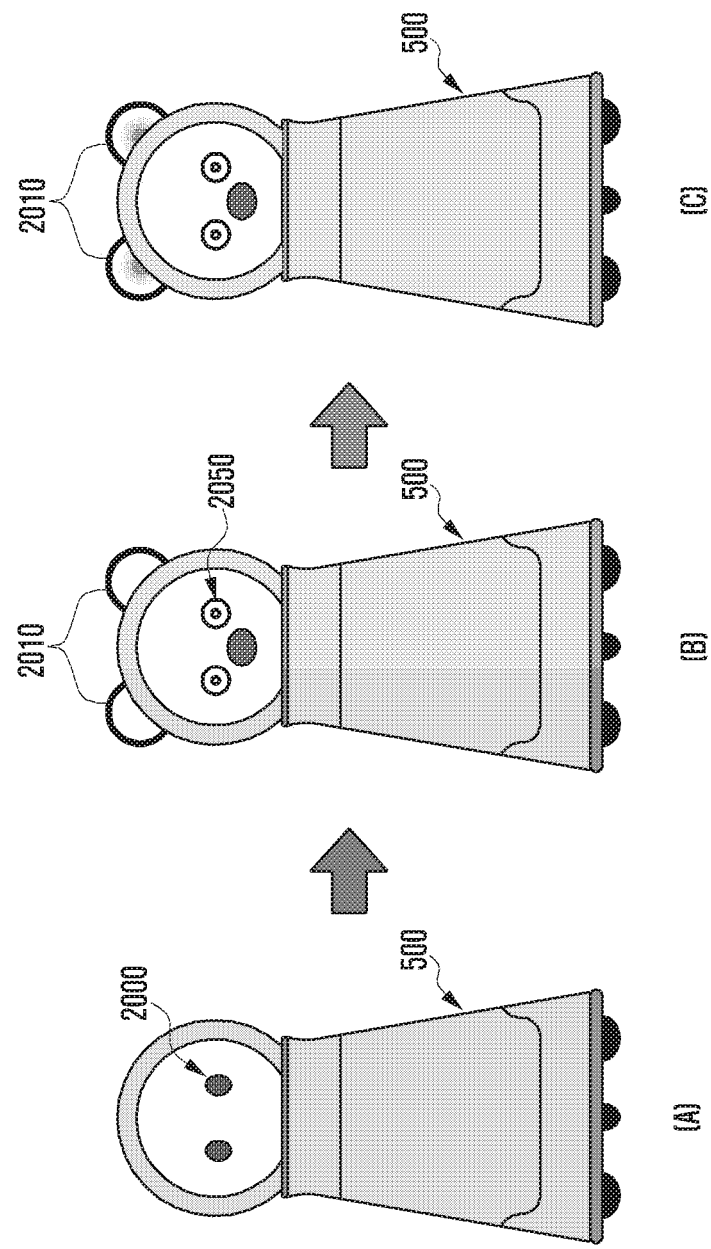
FIG. 20 is a diagram illustrating an operating example of a robot based on a mounted accessory according to an embodiment of the disclosure.

FIG. 20 is a diagram illustrating an operating example of a robot based on a mounted accessory according to an embodiment of the disclosure.

Referring to FIG. 20, FIG. 20 shows an example of providing a feedback through a recognized notification, based on the characteristics of the accessory mounted on the robot 500. That is, FIG. 20 shows an example of recognizing a notification (e.g., receiving a call or message) and providing a corresponding feedback such as a lighting control.

In FIG. 20, example (A) shows a default state of the robot 500. In the default state, the robot 500 may be expressed according to default properties thereof (e.g., a default facial expression 2000 and a default sound).

Example (B) shows that first accessories 2010 having specific characteristics are mounted on the robot 500. As shown, the default facial expression 2000 of the robot 500 may be changed to a facial expression 2050 corresponding to the characteristics of the first accessories 2010, and also a related sound may be provided.

Example (C) shows an example of recognizing a notification (e.g., receiving a call or message) and providing a corresponding feedback. For example, the robot 500 may provide a feedback of controlling a lighting function of the first accessory 2010 to express a notification through a color change (e.g., green lighting) of the first accessory 2010.

Figure 21:
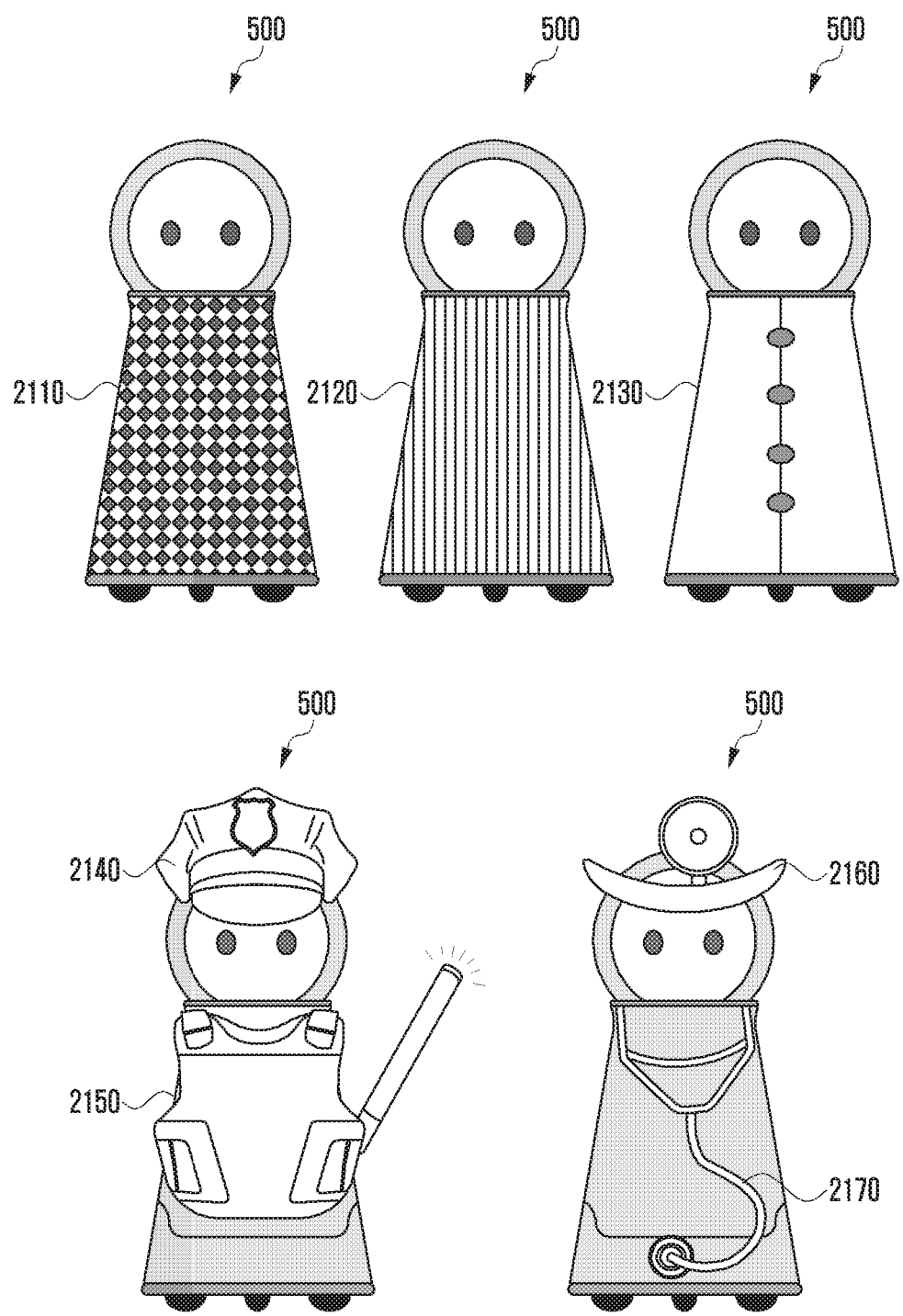
FIG. 21 is a diagram illustrating examples of an accessory mounted on a robot according to an embodiment of the disclosure.

FIG. 21 is a diagram illustrating examples of an accessory mounted on a robot according to an embodiment of the disclosure.

Specifically, FIG. 21 shows various examples in which at least one accessory of the second category (i.e., event type) as described above in Tables 1, 2 and 3 is mounted on the robot 500.

Referring to FIG. 21, the accessory(s) of the second category may include event-type accessories (e.g. hat, clothing, cloak, tie, necklace, glasses, stethoscope, etc.) associated with a particular event (e.g., Christmas, Halloween, birthday, country-specific costume, specific effect (e.g., color variation, pattern variation, material change), etc.) or accessories for convenience (e.g., cup holders, storage boxes, etc.). According to an embodiment, FIG. 21 shows a first accessory 2110 expressing the characteristics of a first dress, a second accessory 2120 expressing the characteristics of a second dress, a third accessory 2130 expressing the characteristics of a third dress, a fourth accessory 2140 (e.g. police cap) and a fifth accessory 2150 (e.g. police vest) expressing the characteristics of a first occupation (e.g. police), and a sixth accessory 2160 (e.g., medical headlamp) and a seventh accessory 2170 (e.g. stethoscope) expressing the characteristics of a second occupation (e.g., doctor).

When applying the characteristics of the accessory(s) of the second category, the default properties (e.g., the default facial expression and the default sound) of the robot 500 being provided through the display device 1400 of the robot 500 may be maintained, and also an event-specific facial expression and sound may be further provided in accordance with the characteristics of the mounted accessory. In addition, depending on the number of mounted accessories, a personality (or individuality) may be further applied to provide deepen event-related properties. For example, when the fourth and fifth accessories 2140 and 2150 expressing the characteristics of a police are mounted, the personality of the robot 500 may be changed to the personality of the police such as a strict facial expression and a strict voice tone.

Figure 22:
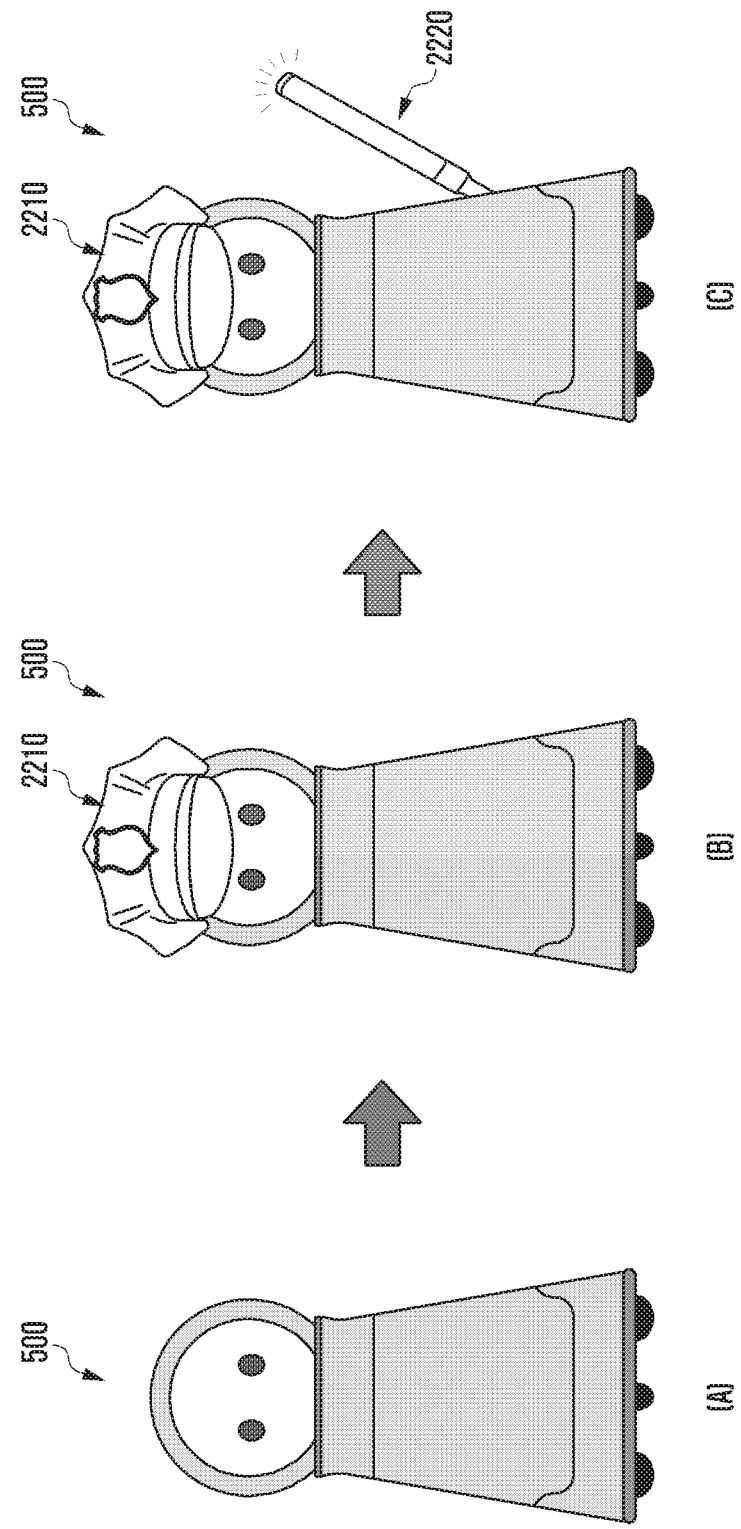
FIG. 22 is a diagram illustrating an example of an accessory mounted on a robot and a related operation according to an embodiment of the disclosure.

FIG. 22 is a diagram illustrating an example of an accessory mounted on a robot and a related operation according to an embodiment of the disclosure.

Referring to FIG. 22, FIG. 22 shows examples of a change in expression stage by stage depending on the number of accessories mounted on the robot 500.

In an embodiment, the characteristics of accessories may be differentially provided stage by stage (e.g., first, second, and third stages) and differently applied according to the categories of the accessories (e.g., first, second, and third categories).

In FIG. 22, example (A) shows a default state of the robot 500. In the default state, the robot 500 may be expressed according to default properties thereof (e.g., a default facial expression and a default sound).

Example (B) shows that a first accessory 2210 (e.g., a police cap) having the specific characteristics (e.g., the characteristics of a police) is mounted on the head part (A) of the robot 500. As shown, when the first accessory 2210 is mounted, a facial expression and sound corresponding to the characteristics of the police may be further provided. According to an embodiment, when the first accessory 2210 is mounted (i.e., first stage), the default properties of the robot 500 may be maintained, and an additional facial expression and sound may be further applied according to the characteristics of the first accessory 2210.

Example (C) shows that a second accessory 2220 (e.g., a police signal rod) having the characteristics of the police is mounted on the body part (B) of the robot 500 after the first accessory 2210 (e.g., a police cap) having the same police characteristics is mounted. As shown, when the second accessory 2220 is further mounted, a specific lighting effect (e.g., signal rod lighting) may be provided through the second accessory 2220 together with a relevant sound (e.g., siren). According to an embodiment, when the first and second accessories 2210 and 2220 are mounted together (i.e., second stage), these accessories may be applied to provide deepen event-related properties (e.g., facial expressions, sounds, motions, lighting, UX features, skin color/patterns, personality, etc.) of the robot 500. That is, in addition to the default properties of the robot 500 and previously added properties, deepen (or detailed) robot properties associated with the event of the accessory may be further provided.

Figure 23:
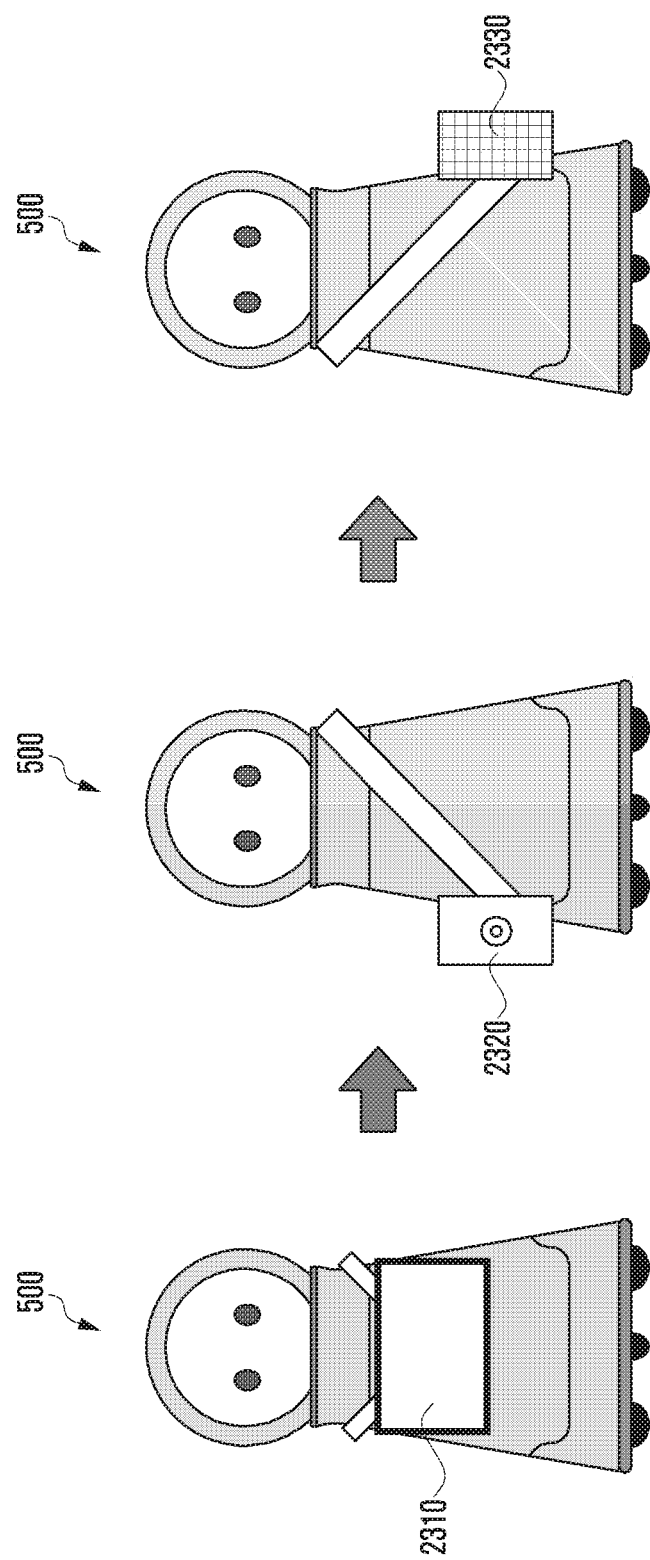
FIG. 23 is a diagram illustrating examples of an accessory mounted on a robot according to an embodiment of the disclosure.

FIG. 23 is a diagram illustrating examples of an accessory mounted on a robot according to embodiment of the disclosure.

Specifically, FIG. 23 shows various examples in which at least one accessory (e.g., an external device or a hardware device) of the third category (i.e., function-connected type) as described above in Tables 1, 2 and 3 is mounted on the robot 500.

Referring to FIG. 23, the accessory(s) of the third category may include function-connected accessories for extending the functionality of the robot 500 by combining (or functionally connecting) an external device (for providing specific content and/or service) such as a projector, a tablet PC, a speaker, an internet of thing (IoT) device, a lighting device, or a camera. According to an embodiment, when the accessory of the third category is mounted, this accessory may be applied to provide a connected function to the robot 500. That is, in addition to the default properties of the robot 500, a function of the accessory may be provided as an additional robot function. For example, if the mounted accessory is a projector, an image output function of the projector may be added to the robot 500. In an embodiment, when the accessory of the third category is mounted, the robot 500 may perform an interaction linked to the mounted accessory or a function of interworking with service content provided (or played) through the mounted accessory.

According to an embodiment, FIG. 23 shows that a first accessory 2310 having a first function, a second accessory 2320 having a second function, and a third accessory 2330 having a third function are mounted on the robot 500.

When the characteristics of the accessory of the third category are applied, the default properties (e.g., the default facial expression and the default sound) of the robot 500 may be maintained. In addition, a specific facial expression, sound, and/or function (or service) corresponding to the characteristics of the mounted accessory may be further provided.

For example, when the first accessory 2310 is a tablet PC, the robot 500 may perform a function of playing content (e.g., image or video) showing the properties of the robot 500. In another example, when the second accessory 2320 is a projector, the robot 500 may perform a function of projecting content (e.g., image or video) showing the properties of the robot 500. In still another example, when the third accessory 2320 is a speaker, the robot 500 may perform a role of disc jockey or perform a surround sound function. In yet another example, when the mounted accessory is a lighting device, the robot 500 may perform a function of a mood light. In further another example, when the mounted accessory is an IoT control device, the robot 500 may perform a controller for controlling IoT devices.

Figure 24:
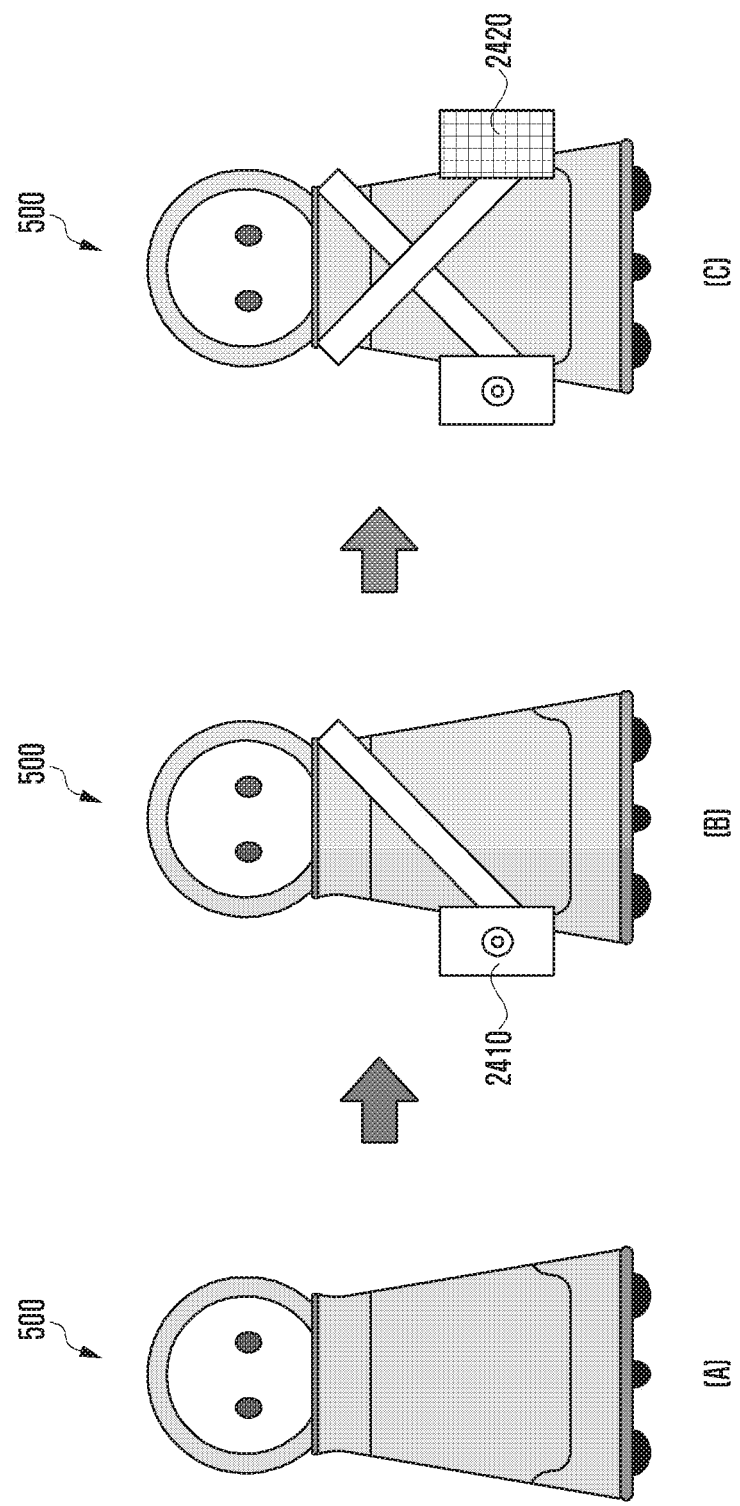
FIG. 24 is a diagram illustrating an example of an accessory mounted on a robot and a related operation according to an embodiment of the disclosure.

FIG. 24 is a diagram illustrating an example of an accessory mounted on a robot and a related operation according to an embodiment of the disclosure.

Referring to FIG. 24, FIG. 24 shows examples of a change in expression stage by stage depending on the number of accessories mounted on the robot 500.

In an embodiment, the characteristics of accessories may be differentially provided stage by stage (e.g., first, second, and third stages) and differently applied according to the categories of the accessories (e.g., first, second, and third categories).

When a single accessory of the third category is mounted (i.e., first stage), this accessory may be applied to provide a connected function to the robot 500. That is, in addition to the default properties of the robot 500, a function of the accessory may be provided as an additional robot function. For example, if the mounted accessory is a projector, an image output function of the projector may be added to the robot 500.

When two or more (equal to or smaller than N) accessories of the third category are mounted (i.e., second or third stage), these accessories may be applied to provide connected functions in combination or independently to the robot 500. That is, in addition to the default properties of the robot 500 and previously added functions, additional or extended functions of the accessories may be further provided. For example, in addition to the image output function of the projector, a content output function of a tablet PC and a function of outputting related information (e.g., motion, sound, gesture, reaction, etc.) synchronized with the content may be added to the robot 500.

In case of the second or third stage, the robot 500 may determine whether to apply connected functions of the mounted accessories in combination or independently, and thereby provide a relevant feedback.

In FIG. 24, example (A) shows a default state of the robot 500. In the default state, the robot 500 may be expressed according to default properties thereof (e.g., a default facial expression and a default sound).

Example (B) shows that a first accessory 2410 (e.g., a function-connected device such as a projector) having the specific characteristics (or function) is mounted on the body part (B) of the robot 500. As shown, when the first accessory 2410 is mounted, the robot 500 may interoperate with the first accessory 2410 to provide content playback and interaction. According to an embodiment, when the first accessory 2410 is mounted (i.e., first stage), the function of the first accessory 2410 may be combined, added, or extended. For example, the default properties of the robot 500 may be maintained, and the function of the first accessory 2410 (e.g., projecting content, being currently played by the robot, through the projector) may be further provided.

Example (C) shows that a second accessory 2420 (e.g., a speaker) is mounted on the body part (B) of the robot 500 after the first accessory 2410 (e.g., a projector) is mounted. As shown, when the second accessory 2420 is further mounted, the characteristics (or functions) of the first and second accessories 2410 and 2420 may be combined, interworked, or applied in extension.

In an embodiment, when the first and second accessories 2410 and 2420 are mounted together (i.e., second stage), the robot 500 may determine whether both accessories are applicable in combination. If so, the robot 500 may provide additional functions by combining a content playback function of the first accessory 2410 and a sound output function of the second accessory 2420.

Figure 25:
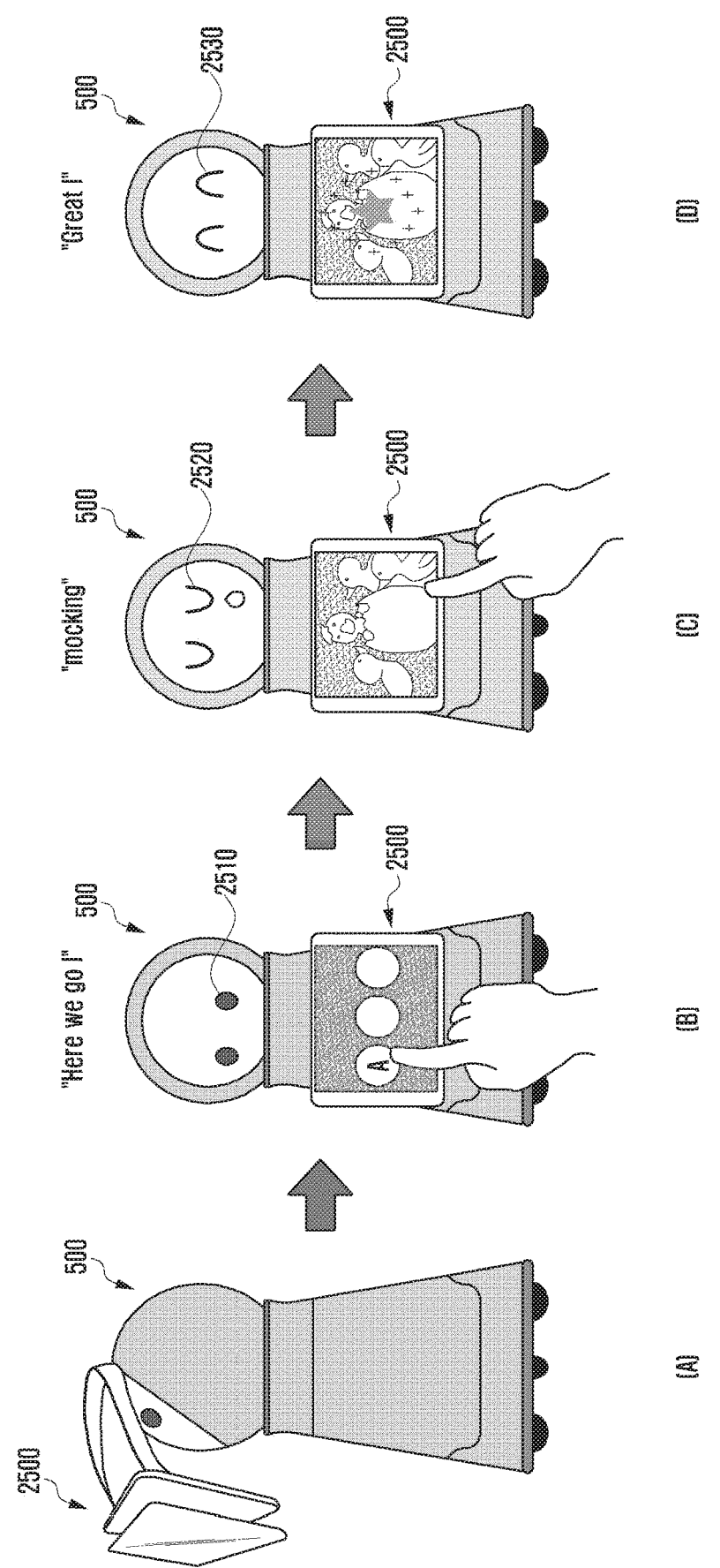
FIG. 25 is a diagram illustrating an example of an accessory mounted on a robot and a related operation according to an embodiment of the disclosure.

FIG. 25 is a diagram illustrating an example of an accessory mounted on a robot and a related operation according to an embodiment of the disclosure.

Referring to FIG. 25, FIG. 25 shows an example in which an accessory 2500 (e.g., a tablet) is mounted on the robot 500, and the robot 500 provides a feedback in response to a user input using the accessory 2500. In addition, FIG. 25 shows an example of interaction between the robot 500 and the accessory 2500.

Example (A) shows an example in which the accessory 2500 (e.g., a tablet) is mounted on the robot 500. When the accessory 2500 is completely mounted, the robot 500 may provide, as a feedback, a related sound (e.g., "Tablet is mounted!"). Also, the robot 500 may provide a specific motion (e.g., a vertical swing motion of the head part (A)) as a feedback in response to the mounting of the accessory 2500.

When the accessory 2500 is mounted, the robot 500 may perform an operation for interworking with the accessory 2500. Interworking between the robot 500 and the accessory 2500 may be based on communicating signals with each other, for example, mechanically, electrically, or in software.

When the accessory 2500 (e.g., a function-connected device) is mounted, the robot 500 may perform interactions with the accessory 2500 in order to execute a function interoperable with the accessory 2500, or perform synchronization for interworking with content played in the accessory 2500. For example, the robot 500 may provide a complex function by interlocking a function of the accessory 2500 with a function of the robot 500 (e.g., providing information (e.g., motion, sound, gesture, reaction, etc.) synchronized with content together with outputting the content at the tablet). The robot 500 may be in a state of interworking with the accessory 2500 and synchronized (e.g., time sync, audio sync, subtitle sync, etc.) with the content being played by the accessory 2500.

Example (B) shows that the user executes content (or an application, etc.) at the accessory 2500, and the robot 500 provides a feedback corresponding to a user input for executing the content at the accessory 2500. For example, the user may enter a user input (e.g., a tablet touch) for manipulating the accessory 2500 (e.g., playing content). Then, in response to the user input, the accessory 2500 may provide input information (e.g., touch location, content information, etc.) related to the user input to the robot 500. Then, based on the received input information, the robot 500 may recognize the user input and identify a position (or direction) corresponding to the user input. In a certain embodiment, the robot 500 may include a camera module (not shown) or may be equipped with an accessory having a camera function. In this case, using the camera module or the mounted accessory having the camera function, the robot 500 may recognize (or monitor) the user and provide a relevant feedback.

As shown in Example (B), the robot 500 may provide a relevant feedback in response to a user input entered into the accessory 2500. For example, the robot 500 may provide feedbacks such as a gaze change 2510 in a direction corresponding to the user input and a related sound ("Here we go!"). For example, the robot 500 may provide a feedback such as a glimpse of where the user has touched the accessory 2500.

Example (C) shows an example of providing a feedback corresponding to a user input while content is being executed through the accessory 2500. The user may enter a user input (e.g., a tablet touch) related to the content running through the accessory 2500. Then, in response to the user input, the accessory 2500 may provide input information (e.g., touch location, content information, etc.) related to the user input to the robot 500. As shown, the user may enter a user input for manipulating (e.g., selecting) the content (e.g., text, image, video, etc.) being played in the accessory 2500.

In an embodiment, when there is a user input through the accessory 2500, the robot 500 may provide a feedback related to an object corresponding to the user input. For example, the robot 500 may provide a feedback (e.g., a sound) corresponding to the object (e.g., the text of the caption (e.g., "mocking")) in response to the user input. Also, the robot 500 may provide a feedback of a facial expression change 2520 together with the sound feedback. For example, the robot 500 may read a caption of a place where the user touches through the accessory 2500.

Example (D) shows that the robot 500 interworking with the accessory 2500 performs real-time sensing (e.g., context awareness) for a surrounding environment or user's expression or reaction and provide a relevant feedback. For example, when the user reacts (e.g., read along a book, follow a dance, follow a song, etc.) to content being executed through the accessory 2500, the robot 500 may recognize the user's reaction and provide feedbacks such as a change in a facial expression 2530 and a related sound (e.g., "Great!"). In a certain embodiment, the robot 500 may use a camera or a mounted accessory having a camera function to perform the real-time sensing, and provide a feedback through image analysis.

In an embodiment, when the accessory 2500 (e.g., a function-connected device) is mounted on the robot 500, the robot 500 may respond to the progress of a content in the accessory 2500. For example, when the user is using the accessory 2500 (e.g., viewing video, or listening to audio), the robot 500 may provide an emotional response associated with the content of the accessory 2500 (e.g., a change in facial expression corresponding to a story or role of the content), provide a further action to the user (e.g., quiz, game, read along, etc.), or provide a response based on the emotional state of the user (e.g., child) getting bored (e.g., output a related sound (e.g., "Do you want to play something else?").

Figure 26:
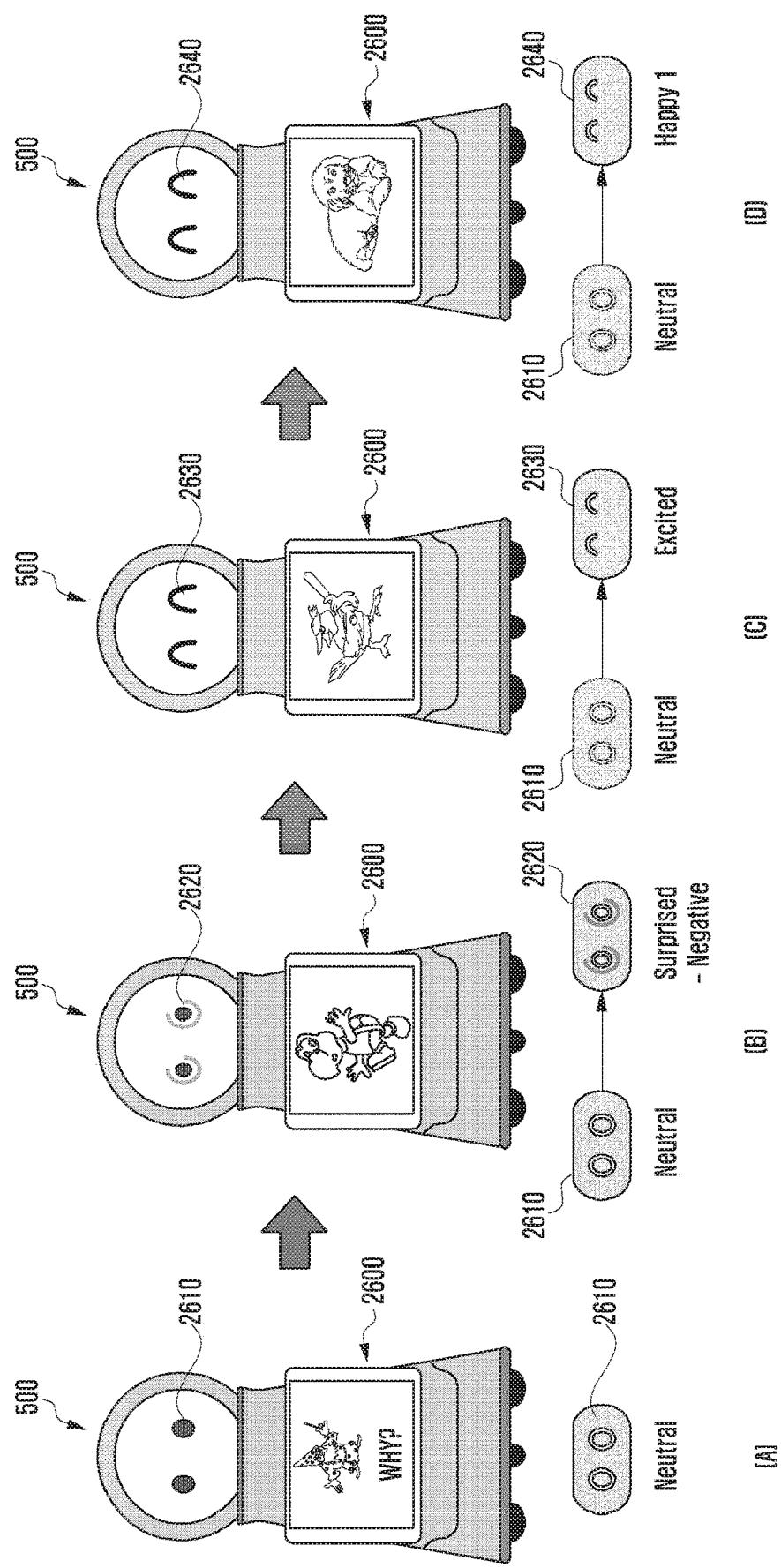
FIG. 26 is a diagram illustrating an example of an accessory mounted on a robot and a related operation according to an embodiment of the disclosure.

FIG. 26 is a diagram illustrating an example of an accessory mounted on a robot and a related operation according to an embodiment of the disclosure.

Referring to FIG. 26, FIG. 26 shows an example in which an accessory 2600 (e.g., a tablet) is mounted on the robot 500, and the robot 500 provides a feedback in response to a user input using the accessory 2600. In addition, FIG. 26 shows an example of an empathic response to a user's reaction to the content of the accessory 2600 through interworking between the robot 500 and the accessory 2600.

Example (A) shows that the accessory 2600 (e.g., a tablet) is mounted on the robot 500 and is in a state of waiting for content execution. When the accessory 2600 is completely mounted, the robot 500 may provide, as a feedback, a related sound (e.g., "Tablet is mounted!"). Also, when there is no content execution by the accessory 2600 after the accessory 2600 is mounted, the robot 500 may determine that the content execution is waiting, and thereby provide a feedback of a default facial expression 2610. When a user input is entered into the accessory 2600, the robot 500 may recognize an action of executing content by interacting with the accessory 2600.

Examples (B), (C), and (D) show that the user executes content (or an application, etc.) in the accessory 2600, and the robot 500 provides an empathic response to the executed content or a user's reaction. For example, the robot 500 may express an emotion linked to the learning content being executed in the accessory 2600 or provide an interactive learning experience with the user.

As shown in Examples (B), (C), and (D), the robot 500 may provide various feedback associated with an empathic response to the executed content or a user's reaction. For example, the robot 500 may perform real-time sensing (e.g., context awareness) for a surrounding environment or user's expression or reaction and thereby provide, as relevant feedback, changes in facial expressions 2620, 2630, and 2640 (e.g., a surprised or negative facial expression 2620, an excited facial expression 2630, a happy facial expression 2640, etc.) and their associated sounds.

In an embodiment, the facial expression change may refer to a change from the default (e.g., neutral) facial expression 2610 to the other facial expression 2620, 2630, or 2640 corresponding to each situation, or a change from one facial expression (e.g., the surprised facial expression 2620) according to the first response to another facial expression (e.g., the happy facial expression 2640) according to the second response. In a certain embodiment, the robot 500 may use a camera or a mounted accessory having a camera function to perform the real-time sensing, and provide a feedback through image analysis.

In an embodiment, when the accessory 2600 (e.g., a function-connected device) is mounted on the robot 500, the robot 500 may sense a reaction of the user (e.g., the child) using the content, and provide a feedback to empathize with the user's response. For example, the robot 500 may provide an empathic response (e.g., a laughing or crying sound) suitable for the content of the accessory 2600.

Figure 27:
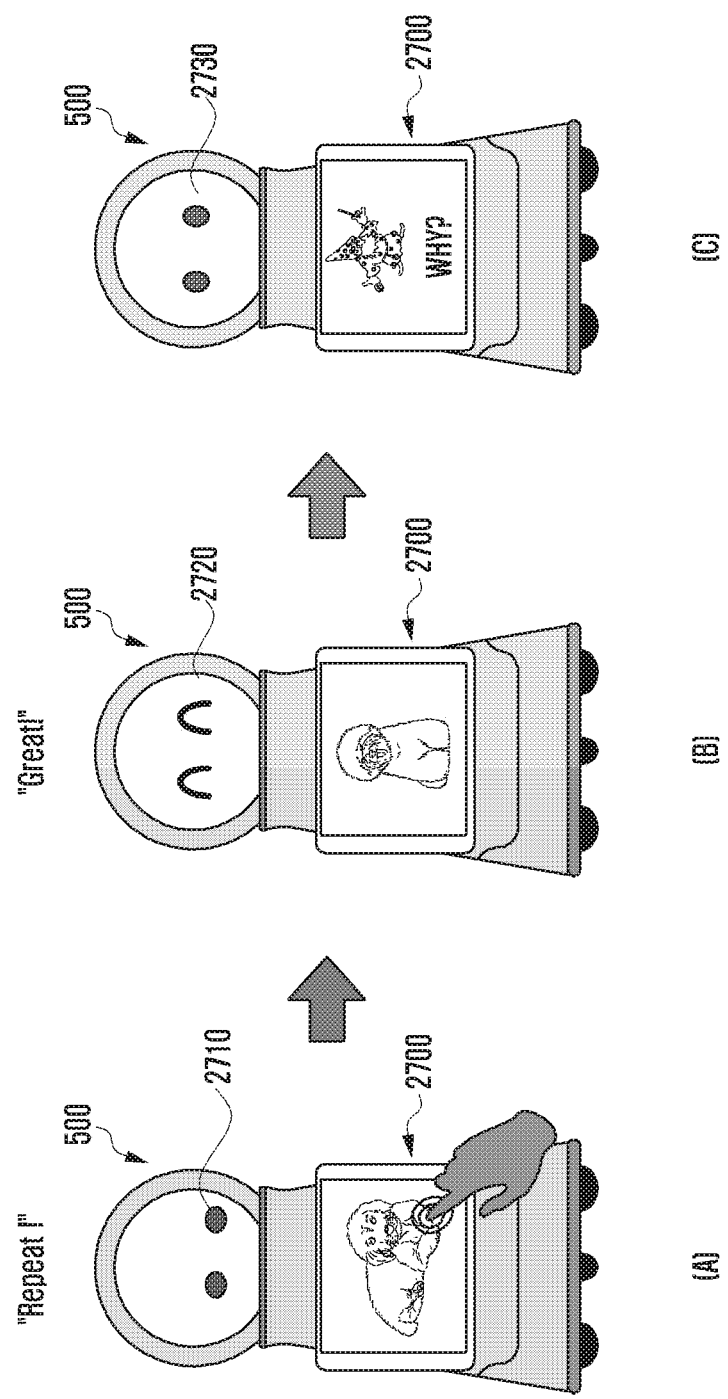
FIG. 27 is a diagram illustrating an example of an accessory mounted on a robot and a related operation according to an embodiment of the disclosure.

FIG. 27 is a diagram illustrating an example of an accessory mounted on a robot and a related operation according to an embodiment of the disclosure.

Referring to FIG. 27, FIG. 27 shows an example in which an accessory 2700 (e.g., a tablet) is mounted on the robot 500, and the robot 500 provides a feedback in response to a user input (e.g., touch or user reaction) using the accessory 2700.

Example (A) shows that the robot 500 provides a feedback corresponding to a user input entered into the accessory 2700 that is executing content. For example, the user may enter a user input (e.g., a tablet touch) into the accessory 2700, and the robot 500 may detect the user input through the accessory 2700. Then, the robot 500 may provide a related feedback in response to the user input. For example, the robot 500 may provide feedbacks such as a gaze change 2710 in a direction corresponding to the user input and a related sound ("Repeat!").

In an embodiment, the robot 500 may provide a gaze change in real time in response to a change in the user input (e.g., a drag direction of a touch-and-drag input) in the accessory 2700. For example, the robot 500 may provide a gaze of looking at a touch position in response to a user input of touching the accessory 2700 and then provide a real-time gaze change in response to a touch movement (e.g., dragging). As such, the robot 500 may provide consecutive feedback that responds immediately to user inputs in the accessory 2700.

Example (B) shows an example of providing feedback in response to content or a user input. For example, the accessory 2700 may perform a function such as stopping, playing, repeating, or terminating the content in response to a user input, and the robot 500 may provide feedback associated with a content-related control function in response to the user input. For example, when the content is repeatedly played, the robot 500 may provide feedback such as a changed facial expression 2720 (e.g., returning to the original gaze position of example (A) and a related sound (e.g., "Great!"). In an embodiment, when the gaze returns to the original position, the robot 500 may temporarily provide a certain facial expression (e.g., a happy facial expression 2720) for a given time (e.g., about 1 second), and then provide the default expression after the given time.

Example (C) shows that the accessory 2700 is mounted on the robot 500 and is in a state of waiting for content execution. When there is no content execution by the accessory 2700 after the accessory 2700 is mounted, the robot 500 may determine that the content execution is waiting, and thereby provide a feedback of a default facial expression 2730.

Figure 28:
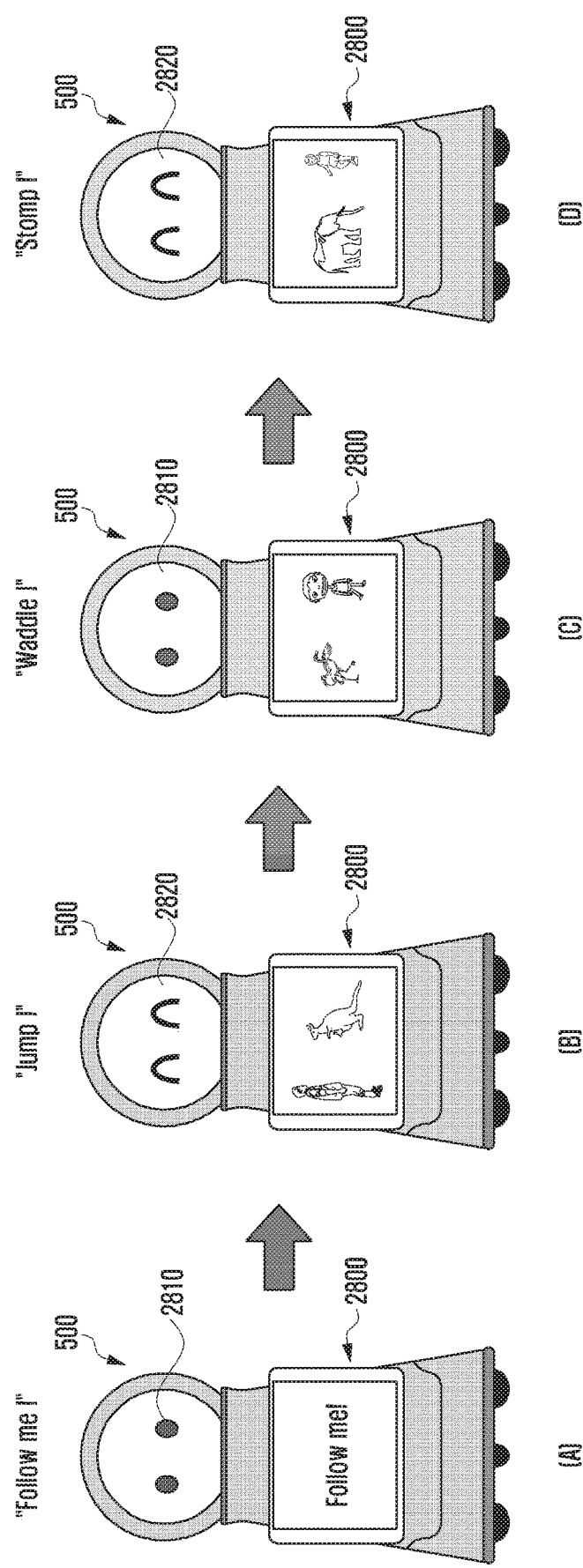
FIG. 28 is a diagram illustrating an example of an accessory mounted on a robot and a related operation according to an embodiment of the disclosure.

FIG. 28 is a diagram illustrating an example of an accessory mounted on a robot and a related operation according to an embodiment of the disclosure.

Referring to FIG. 28, FIG. 28 shows an example in which an accessory 2800 (e.g., a tablet) is mounted on the robot 500, and the robot 500 provides a feedback in response to a user input using the accessory 2800. In addition, FIG. 28 shows an example of an empathic response to a user's reaction to the content of the accessory 2800 through interworking between the robot 500 and the accessory 2800.

Example (A) shows that the accessory 2800 (e.g., a tablet) is mounted on the robot 500 and starts to execute content (e.g., an intro process). As shown, when the content is executed in response to a user input (e.g., a touch for playing the content) in the accessory 2800, the robot 500 may provide feedback such as a default facial expression 2810 and a related sound (e.g., "Follow me!").

Examples (B), (C), and (D) show that the robot 500 provides an empathic response to the content executed through the accessory 2800 or a reaction of the user using the content. For example, the robot 500 may express an emotion linked to body playing content being executed in the accessory 2800.

As shown in Examples (B), (C), and (D), the robot 500 may provide various feedbacks associated with an empathic response to the executed content or a user's reaction. For example, the robot 500 may perform real-time sensing (e.g., context awareness) for a surrounding environment or user's expression or reaction and thereby provide, as relevant feedback, changes in facial expressions 2810 and 2820 (e.g., a surprised or negative facial expression, an excited facial expression, a happy facial expression, etc.) and their associated sounds.

According to an embodiment, the robot 500 may provide a related sound in accordance with the progress of the content. For example, when the body playing content (e.g., dance) is played, a related sound such as "jump", "waddle", "stomp", "dance", "sing", or "swing" may be provided.

In an embodiment, the facial expression change may refer to a change from the default (e.g., neutral) facial expression 2810 to the other facial expression 2820 corresponding to each situation, or a change from one facial expression (e.g., the surprised facial expression) according to the first response to another facial expression (e.g., the happy facial expression) according to the second response. In a certain embodiment, the robot 500 may use a camera or a mounted accessory having a camera function to perform the real-time sensing, and provide feedback through image analysis.

In an embodiment, when the accessory 2800 (e.g., a function-connected device) is mounted on the robot 500, the robot 500 may sense a reaction of the user (e.g., the child) using the content, and provide feedback to empathize with the user's response. For example, the robot 500 may provide an empathic response (e.g., a laughing or crying sound) suitable for the content of the accessory 2800.

FIGS. 29 to 32 are diagrams illustrating examples of an accessory combination mounted on a robot and a related operation according to various embodiments of the disclosure.

Figure 29:
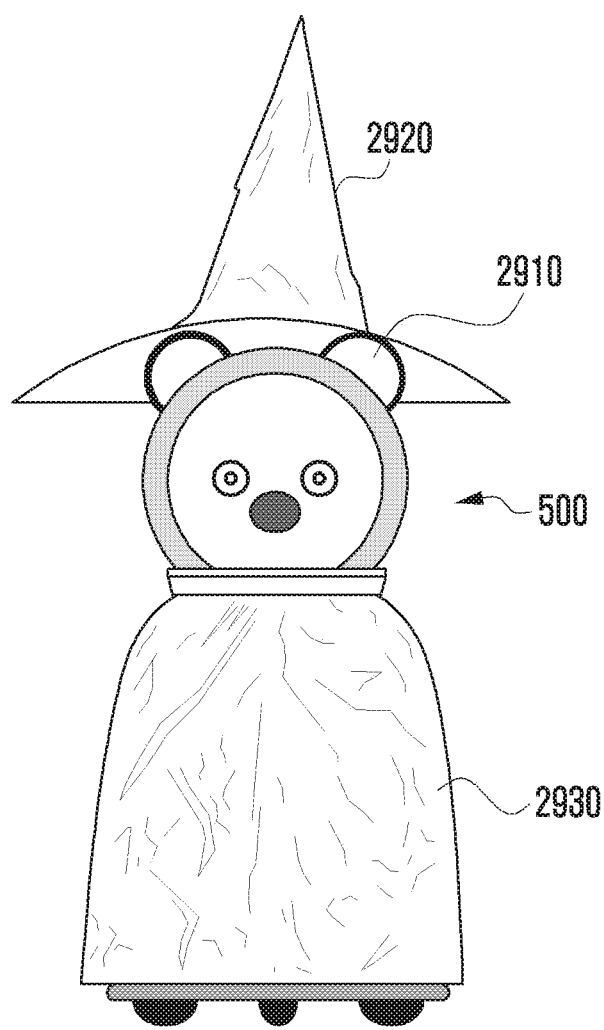
FIGS. 29, 30, 31, and 32 are diagrams illustrating examples of an accessory combination mounted on a robot and a related operation according to various embodiments of the disclosure.
Figure 32:
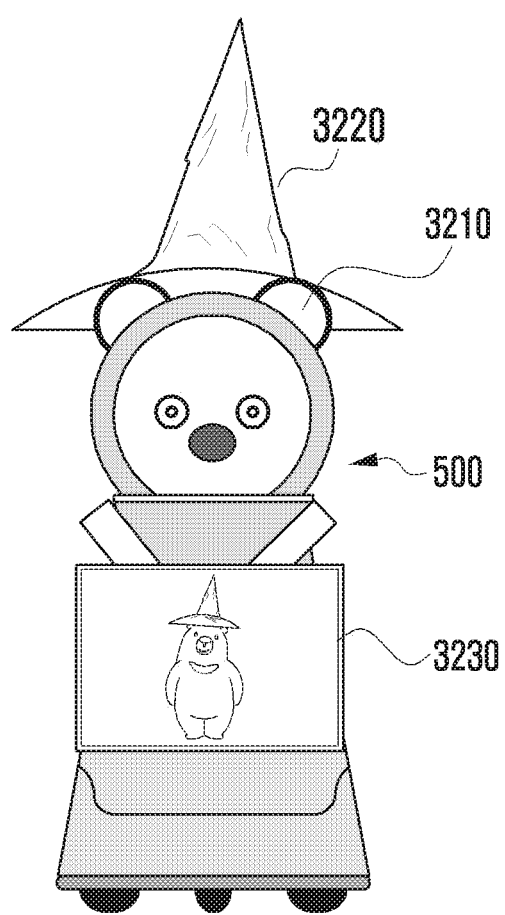

Referring to FIGS. 29, to 32, various combinations of accessories of different types (or characteristics) may be mounted on the robot 500. Then, the robot 500 may identify the characteristics corresponding to a combination of accessories and then provide feedback by applying functional properties corresponding to the identified characteristics.

Referring to FIG. 29, FIG. 29 shows an example in which a first accessory 2910 of the first category (e.g., character type), a second accessory 2920 of the second category (e.g., event type), and a third accessory 2930 of the second category are mounted in combination. In an embodiment, when the second and third accessories 2920 and 2930 are mounted in a state where the first accessory 2910 has been already mounted, the robot 500 may provide a facial expression and a sound of the characteristics (e.g., Halloween) of the second category, based on the characteristics (e.g., bear) of the first category. For example, when the second accessory 2920 of a Halloween party hat and the third accessory 2930 of a cloak are mounted after the first accessory 2910 of bear's ears has been mounted, a bear character may express specific sound, motion and facial expression associated with the Halloween event.

Figure 30:
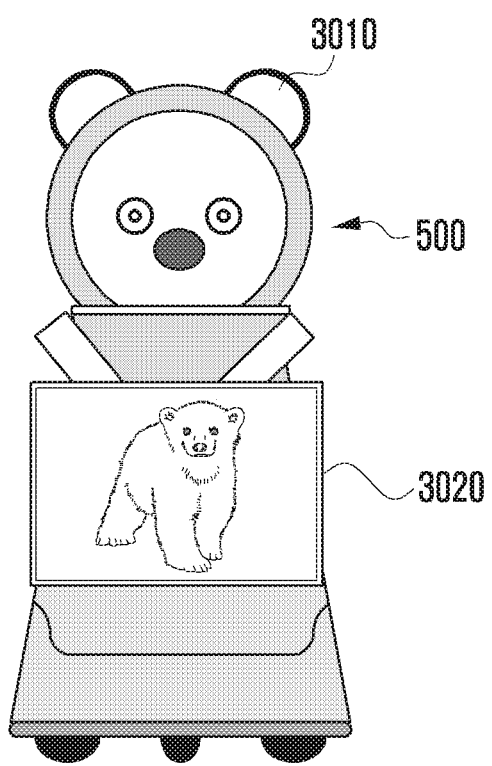

Referring to FIG. 30, FIG. 30 shows an example in which a first accessory 3010 of the first category (e.g., character type) and a second accessory 3020 (e.g., projector, tablet, etc.) of the third category (e.g., function-connected type) are mounted in combination. In an embodiment, when the second accessory 3020 is mounted in a state where the first accessory 3010 has been already mounted, the robot 500 may provide a function (e.g., video playback) through the second accessory 3020 by applying the characteristics (e.g., interworking, adding or extending a function of the second accessory 3020) of the third category, based on the characteristics (e.g., bear) of the first category. For example, when the second accessory 3020 of a tablet is mounted after the first accessory 3010 of bear's ears has been mounted, a video related to a bear character may be played in the tablet.

Figure 31:
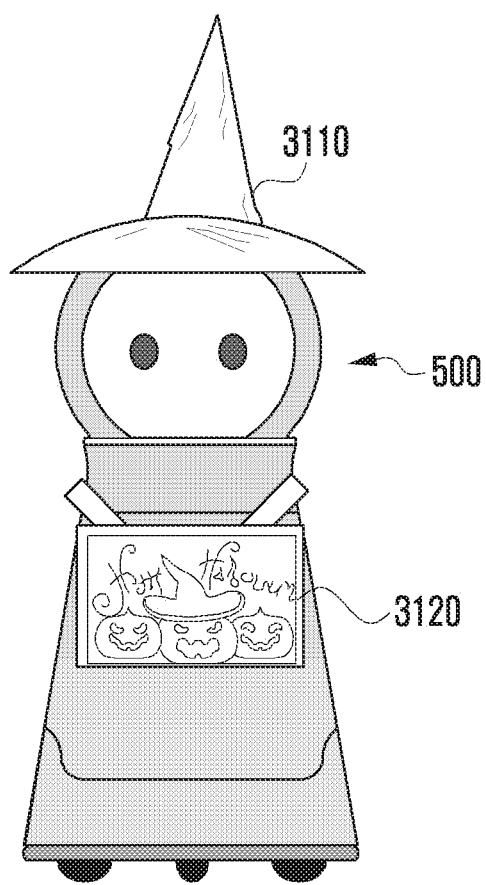

Referring to FIG. 31, FIG. 31 shows an example in which a first accessory 3110 of the second category (e.g., event type) and a second accessory 3120 of the third category (e.g., function-connected type) are mounted in combination. In an embodiment, when the second accessory 3120 is mounted in a state where the first accessory 3110 has been already mounted, the robot 500 may provide a function (e.g., video playback) through the second accessory 3120 by applying the characteristics (e.g., interworking, adding or extending a function of the second accessory 3120) of the third category, based on the characteristics (e.g., Halloween) of the second category. For example, when the second accessory 3120 of a tablet is mounted after the first accessory 3110 of a Halloween party hat has been mounted, a video related to Halloween may be played in the tablet.

Referring to FIG. 32, FIG. 32 shows an example in which a first accessory 3210 of the first category (e.g., character type), a second accessory 3220 of the second category (e.g., event type), and a third accessory 3230 of the third category (e.g., function-connected type) are mounted in combination. In an embodiment, when the third accessory 3230 is mounted in a state where the first and second accessories 3210 and 3220 have been already mounted, the robot 500 may provide a function (e.g., video playback) through the third accessory 3230 by applying the characteristics (e.g., Halloween) of the second category, based on the characteristics (e.g., bear) of the first category. For example, when the third accessory 3230 of a tablet is mounted after the first accessory 3210 of bear's ears 2920 and the second accessory 3220 of a Halloween party hat have been mounted, a video related to bear and Halloween may be played in the tablet.

According to various embodiments, the robot 500 may provide a feedback by considering environmental factors (e.g., a time, a time zone, a place, a location) in addition to the type of a mounted accessory, the number of mounted accessories, and the position of the mounted accessory.

In embodiments, depending on the time zone of mounting an accessory, the robot 500 may provide different feedback or functions.

In an embodiment, when the accessory is mounted during the daytime, the robot 500 may provide feedback based on functions available in the daytime. For example, when a bear accessory is mounted, the robot 500 may provide a sound of a size suitable for play. For example, when a tablet is mounted, the robot 500 may provide brightness suitable for viewing in the daytime, or may preferentially provide content for learning in the daytime. In an embodiment, when the accessory is mounted in the night time, the robot 500 may provide feedback based on functions available in the night time. For example, when a bear accessory is mounted, the robot 500 may provide a quiet sound suitable for night time or provide lighting adequate for the ambient light. For example, when a tablet is mounted, the robot 500 may provide brightness suitable for viewing at night time, or may preferentially provide good content before going to sleep at night.

In embodiments, depending on the place of mounting an accessory, the robot 500 may provide different feedback or functions.

In an embodiment, when the accessory is mounted in the living room, the robot 500 may provide functions available in the living room. For example, when a tablet is mounted, the robot 500 may provide content suitable for viewing with family and control the tablet to have brightness suitable for indoor use. In an embodiment, when the accessory is mounted in a child's room, the robot 500 may provide functions available in the child's room. For example, when a tablet is mounted, the robot 500 may first provide content suitable for viewing with a child and control the tablet to have brightness according to the surrounding brightness. In an embodiment, when the accessory is mounted outdoors, the robot 500 may first provide content viewable outdoors and control the brightness accordingly.

According to various embodiments of the disclosure, an operating method of an electronic device may include detecting mounting of at least one accessory; identifying accessory characteristics associated with the at least one accessory; determining properties of the electronic device associated with the at least one accessory, based on the accessory characteristics; changing the properties of the electronic device, based on the determined properties; and outputting at least one element of a visual element, an auditory element, or a tactile element associated with the at least one accessory, based on the changed properties.

According to various embodiments, the identifying accessory characteristics may include acquiring accessory information from the at least one accessory when the mounting of the at least one accessory is detected, and identifying the accessory characteristics, based on the accessory information.

According to various embodiments, the identifying accessory characteristics may include identifying the accessory characteristics, based on at least one of a type of accessory, the number of mounted accessories, or a mounting position of accessory, or a combination thereof.

According to various embodiments, the outputting at least one element may include identifying the number of mounted accessories, and providing a feedback by realizing an intention corresponding to the identified number of mounted accessories.

According to various embodiments, the determining properties of the electronic device may include determining the properties of the electronic device with different degrees of completion depending on the identified number of mounted accessories.

According to various embodiments, the identifying accessory characteristics may include classifying the accessory characteristics stage by stage depending on the identified number of mounted accessories.

According to various embodiments, the outputting at least one element may include determining a modeling rule corresponding to the type of accessory, and providing a feedback based on the modeling rule stage by stage depending on the identified number of mounted accessories.

According to various embodiments, the outputting at least one element may include providing a feedback associated with the mounting of the at least one accessory, based on the electronic device or the at least one accessory.

According to various embodiments, the outputting at least one element may include determining a modeling rule corresponding to the accessory characteristics, and providing a feedback as an immediate response to an interaction with a user, based on the modeling rule.

According to various embodiments, the identifying accessory characteristics may include identifying the accessory characteristic by using a learning model trained through an artificial intelligence algorithm.

According to various embodiments of the disclosure, a user may mount and use various accessories on the robot (or a robotic device or an electronic device), and may change various functional characteristics (e.g., UX features and/or functions) of the robot according to the type of accessory.

According to various embodiments of the disclosure, the robot may determine the characteristics of the accessory through a combination of a type of accessory, a mounting position, and/or the number of mounted accessories of the accessory, and may change and provide the functional characteristics of the robot according to the characteristics of the accessory.

According to various embodiments of the disclosure, the user may change the UX features (e.g., display theme, face, facial expression, sound (e.g., voice), motion (or behavior, appearance), haptic, lightning, and/or color) of the robot and/or the functionality of the robot for each the characteristics and stages of the accessory, rather than simply changing an external appearance of the robot by mounting a device or an accessory.

According to various embodiments of the disclosure, a specialized and differentiated service such as Family with Kids of a social robot may be provided to a user. According to various embodiments of the disclosure, when providing the functional characteristics of the robot according to the characteristics of the accessory, may provide an intelligent robot and intelligent service that may operate according to a situation (e.g., a time and/or a time zone) and/or a place (e.g., a location and/or a space) where the mounting of the accessory is made.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   at least one sensor circuit disposed in the housing and configured to detect mounting of at least one accessory;
   at least one communication circuit disposed in the housing and configured to communicate with the at least one accessory;
   a display device disposed in the housing and configured to display visual information associated with the at least one accessory;
   an output device configured to output auditory information associated with the at least one accessory; and
   at least one processor disposed in the housing and operatively connected to the sensor circuit, the communication circuit, the display device, and the output device,
   wherein the at least one processor is configured to:
   detect the mounting of the at least one accessory,
   identify a type of accessory, the number of mounted accessories, and a mounting position of the accessory when the mounting of the at least one accessory is detected,
   determine a modeling rule corresponding to the type of accessory,
   based on the modeling rule, change default properties of the electronic device to specified properties of the electronic device corresponding to the modeling rule,
   provide change in feedback based on the modeling rule stage by stage depending on the number of mounted accessories and the mounting position of the accessory, and
   when performing an interaction with the user based on a user input, output feedbacks corresponding to the user input step by step through a visual element, an auditory element, and a tactile element, based on the specified properties.

2. The electronic device of claim 1, wherein the at least one processor is further configured to:
acquire accessory information from the at least one accessory through the communication circuit when the mounting of the at least one accessory is detected through the communication circuit, and
identify the accessory characteristics, based on the accessory information.

3. The electronic device of claim 1, wherein the at least one processor is further configured to:
identify the number of mounted accessories, and
provide the feedback by realizing an intention corresponding to the identified number of mounted accessories.

4. The electronic device of claim 1, wherein the at least one processor is further configured to:
determine the properties of the electronic device with different degrees of completion depending on the identified number of mounted accessories.

5. The electronic device of claim 1, wherein the at least one processor is further configured to:
classify the accessory characteristics stage by stage depending on the identified number of mounted accessories.

6. The electronic device of claim 1, wherein the modeling rule is configured to:
designate a specific character assigned to the accessory, and
provide an output facial expression based on the specific character.

7. The electronic device of claim 6, wherein the modeling rule is further configured to provide a change in the facial expression stage by stage, depending on the number of mounted accessories.

8. The electronic device of claim 1,
wherein the at least one processor is further configured to determine a path rule corresponding to the type of accessory, and
wherein the path rule is configured to define a sequence of operations of an application corresponding to the type of accessory.

9. The electronic device of claim 1, wherein the at least one processor is further configured to:
provide the feedback associated with the mounting of the at least one accessory, based on the electronic device or the at least one accessory.

10. The electronic device of claim 1, wherein the at least one processor is further configured to:
determine a modeling rule corresponding to the accessory characteristics, and
provide the feedback as an immediate response to an interaction with a user, based on the modeling rule.

11. The electronic device of claim 1, wherein the at least one processor is further configured to:
identify the accessory characteristic by using a learning model trained through an artificial intelligence algorithm.

12. An operating method of an electronic device, the method comprising:
detecting mounting of at least one accessory;
identifying a type of accessory, the number of mounted accessories, and a mounting position of the accessory when the mounting of the at least one accessory is detected;
determining a modeling rule corresponding to the type of accessory;
based on the modeling rule, changing default properties of the electronic device to specified properties of the electronic device corresponding to the modeling rule;
providing change in feedback based on the modeling rule stage by stage depending on the number of mounted accessories and the mounting position of the accessory; and
when performing an interaction with the user based on a user input, outputting feedbacks corresponding to the user input step by step through a visual element, an auditory element, and a tactile element, based on the specified properties.

13. The method of claim 12, wherein the identifying of the accessory characteristics comprises:
acquiring accessory information from the at least one accessory when the mounting of the at least one accessory is detected; and
identifying the accessory characteristics, based on the accessory information.

14. The method of claim 12, wherein the outputting of the at least one element comprises:
identifying the number of mounted accessories; and
providing the feedback by realizing an intention corresponding to the identified number of mounted accessories, and
wherein the determining of the properties of the electronic device comprises determining the properties of the electronic device with different degrees of completion depending on the identified number of mounted accessories, and
wherein the identifying of the accessory characteristics comprises classifying the accessory characteristics stage by stage depending on the identified number of mounted accessories.

15. The method of claim 12, wherein the outputting of the at least one element comprises:
providing the feedback associated with the mounting of the at least one accessory, based on the electronic device or the at least one accessory.

16. The method of claim 12, wherein the outputting of the at least one element comprises:
providing the feedback as an immediate response to an interaction with a user, based on the electronic device or the at least one accessory.

* * * * *